United States Patent
Bathiche et al.

(10) Patent No.: US 12,374,142 B2
(45) Date of Patent: Jul. 29, 2025

(54) ADVANCED FORMATTING OF INK DATA USING SPATIAL INFORMATION AND SEMANTIC CONTEXT

(71) Applicant: Microsoft Technology Licensing, LLC, Redmond, WA (US)

(72) Inventors: Steven N. Bathiche, Bellevue, WA (US); Moshe R. Lutz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 17/851,237

(22) Filed: Jun. 28, 2022

(65) Prior Publication Data
US 2023/0419703 A1    Dec. 28, 2023

(51) Int. Cl.
*G06V 30/32* (2022.01)
*G06F 3/04883* (2022.01)
(Continued)

(52) U.S. Cl.
CPC ........ *G06V 30/347* (2022.01); *G06F 3/04883* (2013.01); *G06V 30/222* (2022.01); *G06V 30/2268* (2022.01)

(58) Field of Classification Search
CPC .............. G06F 40/171; G06F 3/04883; G06F 3/03545; G06F 3/04842; G06F 40/166; G06F 40/274; G06F 2203/04808; G06F 3/0485; G06F 16/80; G06F 16/93; G06F 3/0482; G06F 40/106; G06F 40/143; G06F 40/177; G06F 40/186; G06F 3/0233; G06F 40/123; G06F 40/169; G06F 40/232; G06F 40/30; G06F 3/041; G06F 40/103; G06F 40/109; G06F 16/00; G06F 3/038; G06F 3/0416; G06F 3/04817; G06F 40/279; G06V 30/347; G06V 30/32; G06V 30/387; G06V 30/1423; G06V 30/36;
(Continued)

(56) References Cited

U.S. PATENT DOCUMENTS

2013/0305146 A1* 11/2013 Hashiba ............. G06V 30/1423
                                                    715/255
2016/0179224 A1*  6/2016 Zhang ................... G06F 40/171
                                                    345/156
(Continued)

FOREIGN PATENT DOCUMENTS

CN    105930763 A  *  9/2016  ............... G06K 9/00

OTHER PUBLICATIONS

"DeepWriting: Making Digital Ink Editable via Deep Generative Modeling", Retrieved from: https://www.youtube.com/watch?v=NVF-1csvVvc, Jan. 25, 2018, 2 Pages.
(Continued)

*Primary Examiner* — Quan M Hua

(57) ABSTRACT

In some examples, systems and methods for formatting ink are provided. Ink stroke data may be received, letters may be identified from the ink stroke data, and spacing may be identified between the letters. A user command and semantic context may be received. An action may be determined based on the user command, the semantic context, and the spacing between the letters. Further, the action may be performed.

20 Claims, 30 Drawing Sheets

(51) Int. Cl.
*G06V 30/222* (2022.01)
*G06V 30/226* (2022.01)

(58) Field of Classification Search
CPC .. G06V 10/235; G06V 10/267; G06V 30/373; G06V 10/98; G06V 30/18076
See application file for complete search history.

(56) References Cited

U.S. PATENT DOCUMENTS

| | | |
|---|---|---|
| 2016/0179772 A1 | 6/2016 | Perrin et al. |
| 2017/0153806 A1* | 6/2017 | Rucine .................... G06F 3/017 |
| 2019/0026019 A1* | 1/2019 | Guiavarc'H .......... G06F 3/0487 |

OTHER PUBLICATIONS

Aksan, et al., "DeepWriting: Making Digital Ink Editable via Deep Generative Modeling", In Proceedings of the CHI Conference on Human Factors in Computing Systems, Apr. 21, 2018, pp. 1-14.
"Invitation to Pay Additional Fees Issued in PCT Application No. PCT/US23/022189", Mailed Date: Sep. 5, 2023, 10 Pages.
"International Search Report and Written Opinion issued in PCT Application No. PCT/US23/022189", Mailed Date: Oct. 26, 2023, 17 Pages.

* cited by examiner

ADVANCED FORMATTING OF INK DATA USING SPATIAL INFORMATION AND SEMANTIC CONTEXT

BACKGROUND

Some users of computing devices prefer to write on the computing devices using natural writing motions (e.g., via a stylus, finger, etc.). Existing inking application may enable users to provide ink stroke information to a computing device, corresponding to the user's writing motions. However, conventional inking applications may have limited functionality, as compared to text-editing applications. The limited functionality of inking applications can make them inefficient, and frustrating to edit, thereby decreasing productivity, among other detriments.

It is with respect to these and other general considerations that aspects of the present disclosure have been described. Also, although relatively specific problems have been discussed, it should be understood that the embodiments should not be limited to solving the specific problems identified in the background.

SUMMARY

Aspects of the present disclosure relate to systems, methods, and media for generating predicted ink stroke information. In some examples, the predicted ink stroke information is generated using ink-based semantics. In some examples, the predicted ink stroke information is generated using text-based semantics. Further, in some aspects according to the present disclosure, ink data can be formatted, such as spatial formatting and/or paragraph formatting, based on semantic context.

In some examples, a system for generating predicted ink strokes is provided. The system include a processor and memory storing instructions that, when executed by the at least one processor, causes the system to perform a set of operations. The set of operations includes receiving ink stroke data, inputting the ink stroke data into a first model, and receiving text data from the first model. The text data corresponds to the ink stroke data. The set of operations further includes inputting the text data and a semantic context into a second model, determining, from the second model, a predicted ink stroke, and generating an indication of the predicted ink stroke.

In some examples, the first model include a first trained machine-learning model, and the second model includes a second trained machine-learning model.

In some examples, the ink stroke data is automatically input into the first trained machine-learning model, as the ink stroke data is received.

In some examples, the second trained machine-learning model includes a natural language processor that is trained to recognize words from the ink stroke data.

In some examples, the second trained machine-learning model is trained to generate ink strokes based on ink writing samples. The ink writing samples are from a data set.

In some examples, the received ink stroke data includes a full stroke input. The full stroke input corresponds to one or more alphanumeric characters.

In some examples, the ink stroke data includes information corresponding to one or more of writing pressure, hand tilt, and penmanship cleanliness.

In some examples, a system for generating predicted ink strokes is provided. The system include a processor and memory storing instructions that, when executed by the at least one processor, causes the system to perform a set of operations. The set of operations includes receiving ink stroke data, inputting the ink stroke data into a model, and receiving text data from the model. The text data corresponds to the ink stroke data. The set of operations further includes determining, from the text data and a semantic context, a plurality of predicted ink strokes, and generating a plurality of indications corresponding to the plurality of predicted ink strokes.

In some examples, the model is a first model, and the determining of the plurality of predicted ink strokes is performed by a second model. The second model receives, as input, the text data and the semantic context.

In some examples, one of the plurality of indications that correspond to one of the predicted ink strokes is selected. The second model is updated based on the selected one of the plurality of indications.

In some examples, the second model includes a natural language processor that is trained to predict words, based on the ink stroke data.

In some examples, the second model is trained to generate ink strokes based on ink writing samples. The ink writing samples are received from a data set.

In some examples, the data set includes ink writing samples from a specific user, thereby training the second model to generate ink strokes corresponding to the specific user's handwriting.

In some examples, the second model include a text prediction model and a text-to-ink model.

In some examples, a method for generating predicted ink strokes is provided. The method includes receiving ink stroke data, inputting the ink stroke data into a first trained machine-learning model, and receiving text data from the first trained machine-learning model. The text data corresponds to the ink stroke data. The method further includes inputting the text data and a semantic context into a second trained machine-learning model, determining, from the second trained machine-learning model, a predicted text, inputting the predicted text into a third trained machine-learning model, determining, from the third trained machine-learning model, predicted ink stroke data corresponding to the predicted text, and displaying an indication of the predicted ink stroke data.

In some examples, the first trained machine-learning model is trained to convert ink to text, and the third trained machine-learning model is trained to convert text to ink.

In some examples, the second trained machine-learning model is trained to predict text.

In some examples a system for generating predicted ink strokes is provided. The system include at least one processor and memory storing instructions that, when executed by the at least one processor, causes the system to perform a set of operations. The set of operations includes receiving ink stroke data, inputting the ink stroke data and a semantic context into a model, determining, from the model, one or more predicted ink strokes, and generating an indication of the one or more predicted ink strokes.

In some examples, the model is a trained machine-learning model.

In some examples, the ink stroke data and the semantic context are automatically input into the trained machine-learning model, as the ink stroke data is received.

In some examples, the trained machine-learning model is a neural network that is trained based on ink writing samples. The ink writing samples are received from a data set.

In some examples, the received ink stroke data include a partial stroke input.

In some examples, the received ink stroke data includes one or more of letter spacing, sentence spacing, and writing orientation.

In some examples a system for generating predicted ink strokes is provided. The system include at least one processor and memory storing instructions that, when executed by the at least one processor, causes the system to perform a set of operations. The set of operations includes receiving ink stroke data, inputting the ink stroke data and a semantic context into a trained machine-learning model, determining, from the trained machine-learning model, a plurality of predicted ink strokes, and generating a plurality of indications that each correspond to a different predicted ink stroke from the plurality of predicted ink strokes.

In some examples, one of the plurality of indications that correspond to one of the predicted ink strokes is selected, and the trained model is updated, based on the selected one of the plurality of indications, the input ink stroke data, and the input semantic context.

In some examples, the one of the predicted ink strokes that corresponds to the selected one of the plurality of indications is displayed.

In some examples, the ink stroke data and the semantic context are automatically input into the trained machine-learning model, as the ink stroke data is received.

In some examples a method for generating predicted ink strokes is provided. The method includes receiving ink stroke data, inputting the ink stroke data and a semantic context into a model, determining, from the model, a predicted ink strokes, and generating an indication of the predicted ink strokes.

In some examples, a system for formatting ink is provided. The system includes a processor and memory storing instructions that, when executed by the at least one processor, causes the system to perform a set of operations. The set of operations include receiving ink stroke data, identifying letters from the ink stroke data, identifying spacing between the letters, receiving a user command and semantic context, determining an action based on the user command, the semantic context, and the spacing between the letters, and performing the action.

In some examples, the user command corresponds to selecting a location for new ink stroke data.

In some examples, the action includes changing spacing at the location for the new ink stroke data.

In some examples, the changing spacing includes increasing spacing between two letters that were identified from the ink stroke data.

In some examples, the user command corresponds to deleting ink stroke data.

In some examples, the action includes changing spacing at the location of the deleted ink stroke data.

In some examples, the changing spacing includes decreasing spacing between two letters that were identified from the ink stroke data.

In some examples, a system for formatting ink is provided. The system includes at least one processor and memory storing instructions that, when executed by the at least one processor, causes the system to perform a set of operations. The set of operations include receiving ink stroke data, identifying paragraphs from the ink stroke data, identifying spacing between the paragraphs, receiving a user command and semantic context, determining an action based on the user command, the semantic context, and the spacing between the paragraphs, and performing the action.

In some examples, the changing spacing includes increasing spacing between two paragraphs that were identified from the ink stroke data.

In some examples, the changing spacing includes decreasing spacing between two paragraphs that were identified from the ink stroke data.

In some examples, a method for formatting ink is provided. The method includes receiving ink stroke data. The ink stroke data is configured to be formatted on a document with one or more elements. The method further includes receiving a user command and semantic context, identifying the one or more elements, identifying spacing between the ink stroke data and the one or more elements, determining an action based on the user command, the spacing, and the semantic context, and performing the action.

In some examples, the one or more elements include a first location on the document, and the suer command corresponds to translating the one or more elements from the first location on the document to a second location on the document.

In some examples, the action includes reflowing the ink stroke data based on the translation of the one or more elements from the first location to the second location.

In some examples, the reflowing of the ink stroke data includes reflowing ink stroke data around each of the one or more elements, while preserving a logical flow of language corresponding to the ink stroke data, based on the semantic context.

In some examples, an indication of the action is displayed on a screen of a computing device.

In some examples, the user command is one of a keyboard input, a mouse input, a touchpad input, and a gesture input.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following FIGS.

DETAILED DESCRIPTION

Figure 1:
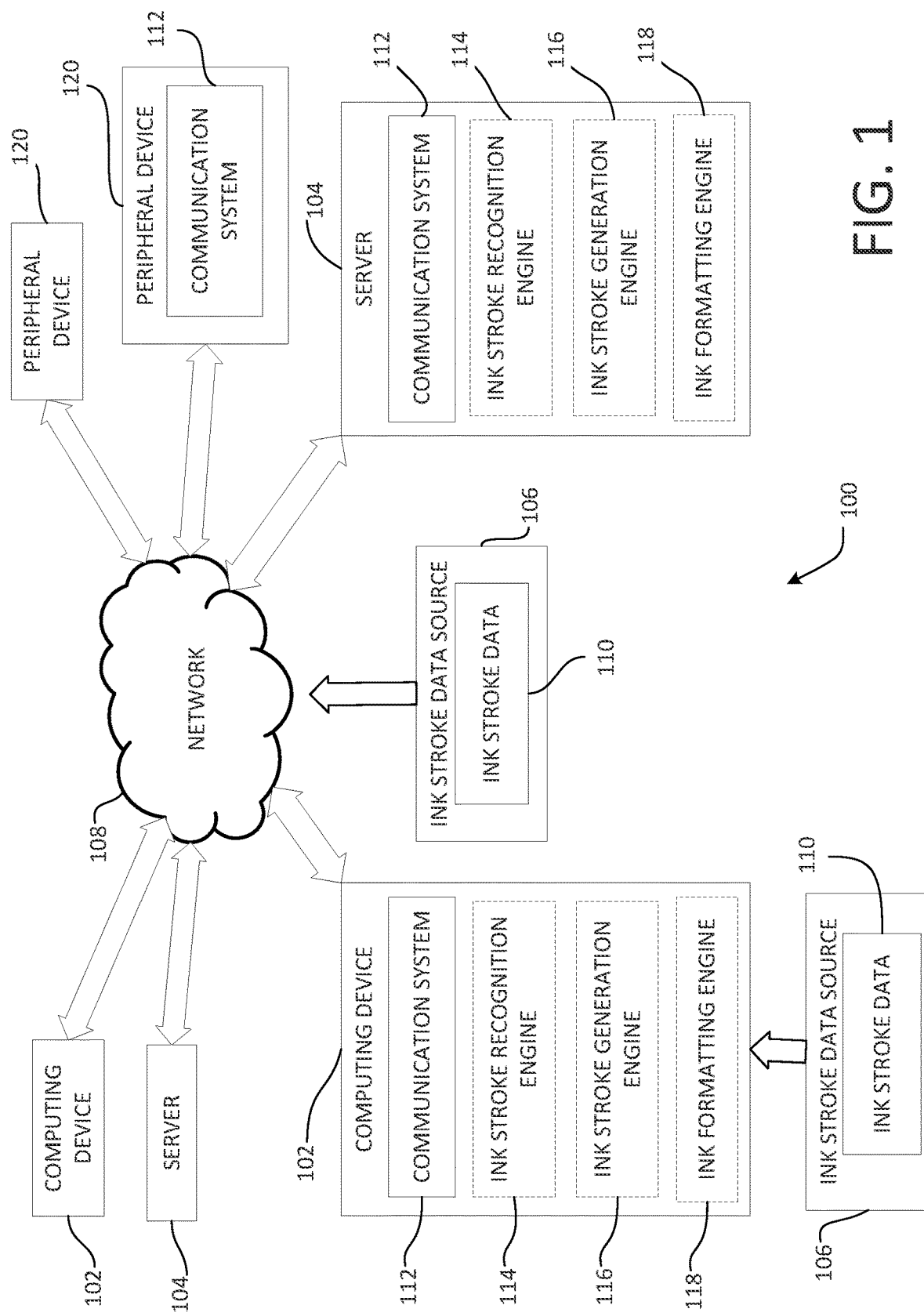
FIG. 1 illustrates an overview of an example system for generating predicted ink stroke information and/or formatting ink according to aspects described herein.

In the following Detailed Description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, some users prefer to write on computing devices using natural writing motions (e.g., via a stylus, a user's finger, a trackpad, etc.). Existing inking application may enable users to provide ink stroke information to a computing device, corresponding to the user's writing motions. However, conventional inking applications may have limited functionality, as compared to text-editing applications. The limited functionality of inking applications can make them inefficient, and frustrating to edit, thereby decreasing productivity, among other detriments.

Often, a user may exhibit similar writing styles, penmanship, or word choice tendencies when writing (e.g., taking notes, writing memos, writing papers, etc.). However, existing inking applications require a user to write out every stroke, word, and paragraph to record the thoughts that a user is trying to convey. Such a process can be slow, tedious, and monotonous. Existing text-editing applications may include suggested word mechanisms. However, the suggested word mechanisms of text-applications are not directly translatable to inking because they fail to consider the font of a user (e.g., penmanship, writing pressure, etc.) and the impact of that font on spacing (e.g., of letters, words, paragraphs, etc.). Accordingly, existing suggested word mechanisms are not useful in actually generating an indication of predicted ink strokes (e.g., the next location of a plurality of predicted ink stroke points, from an otherwise infinite number of potential points, and combinations thereof, that a user can choose to draw an ink stroke therealong).

Furthermore, when writing with an inking application that is being run on a computing device, a user may accidently forget a letter, or add an extra letter, or forget a word, or add an extra word. If such an error were to occur in a text editing application, then conventional methods could be used to adjust the spacing between words and letters. However, such conventional methods may not apply to inking applications. For example, a plurality of users may each have a different style or penmanship. Therefore, determining how much spacing needs to be added between a words or letters, to add another word or letter, may require further consideration than a simple text editing application.

Conventional inking applications may have further deficiencies. For example, if a user is writing a list on an inking application, conventional mechanisms may be unable to recognize that the user is writing a list, because there may be no "enter key" or "tab key" when writing in an inking application, as opposed to writing in a text-editor. Therefore, if elements (e.g., pictures, tables, diagrams, ink segments, etc.) are being moved around on a page, thereby requiring ink strokes to be reflowed on the page, conventional systems may be unable to detect whether a sentence should wrap to the beginning of the next line, or whether it should be the start of a new line (e.g., a new bullet point or indent on a list). Accordingly, there exists a need to reflow ink sentences around one or more elements, without disrupting a logical flow of the ink stroke data, and while maintaining the form (e.g., penmanship, angle of writing, etc.) of the ink strokes.

Aspects of the present disclosure may be beneficial to resolve some of the abovementioned deficiencies, frustrations, and inefficiencies. Further aspects of the present disclosure may provide additional advantages and benefits that will become apparent in light of the below discussion.

For example, aspects of the present disclosure may include receiving ink stroke data (e.g., based on a user writing on a computing device using, for example, a stylus, or their finger), inputting the ink stroke data into a first trained model (e.g., an ink-to-text model), receiving text data from the first trained model that corresponds to the ink stroke data, inputting the text data and a semantic context into a second trained model (e.g., a natural language processor, or predictive text model), determining, from the second trained model, a predicted text, inputting the predicted text into a third trained model (e.g., a text-to-ink model), determining from the third trained model, a predicted ink stroke corresponding to the predicted text, and displaying an indication of the predicted ink stroke (e.g., on a display screen of a computing device).

Generally, aspects of the present disclosure may relate to generating predicted ink strokes, that a user can select, via some gesture or other user-input, to increase productivity and efficiency when writing in an inking application. Furthermore, the inclusion of text-based semantic context in the process of generating predicted ink strokes provides improved accuracy in generating predicted ink strokes that may thereby increase productivity and efficiency for a user. In some examples, a plurality of ink strokes are predicted and generated. In such examples, the second model may be updated or trained, based on a user's selection of one of the plurality of predicted ink stroke. In this respect, models for generating predicted ink strokes according to aspects described herein may be pre-trained, however the models may further be trained (e.g., via reinforcement learning) to accommodate a specific user, as the specific user makes selections from the model's predicted ink strokes.

In further examples, aspects of the present disclosure may include receiving ink stroke data, inputting the ink stroke data and a semantic context into a trained model, determining, from the trained model, a predicted ink stroke, and generating an indication of the predicted ink stroke. Such examples may generate indications of predicted ink strokes, using ink-based semantics, and without converting ink stroke data to text, which may reduce processing time, thereby providing ink stroke predictions to a user relatively quickly.

The inclusion of ink-based semantic context in the process of generating predicted ink strokes provides improved accuracy in generating predicted ink strokes that may further increase productivity and efficiency for a user. In some examples, the ink-stroke data may include partial stroke data (e.g., a portion of a letter, a portion of a word written in cursive, etc.). The ability to generate predictions based off of partial stroke data, as opposed to text editors that may require full letters to generate predictions, allows for ink stroke predictions to constantly be generated, as a user is writing, thereby providing a fluid interface with a user to provide ink data and for systems disclosed herein to generate an indication of a predicted ink stroke, which a user may then select.

In still further examples, aspects of the present disclosure may include receiving ink stroke and receiving a user command to format ink. For example, spacing between letters, spacing between paragraphs, and spacing between elements may all be modified based on spatial information and semantic context in accordance with mechanisms disclosed herein.

FIG. 1 shows an example of a system 100 for generating predicted ink stroke information and/or formatting ink, in accordance with some aspects of the disclosed subject matter. The system 100 includes one or more computing devices 102, one or more servers 104, an ink stroke data source 106, and a communication network or network 108. The computing device 102 can receive ink stroke data 110 from the ink stroke data source 106, which may be, for example a stylus with which a user is writing, a computer-executed program that generates ink strokes, etc. Additionally, or alternatively, the network 108 can receive ink stroke data 110 from the ink stroke data source 106, which may be, for example a stylus with which a user is writing, a computer-executed program that generates ink strokes, etc.

Computing device 102 may include a communication system 112, an ink stroke recognition engine or component 114, an ink stroke generation engine or component 116, and an ink formatting engine or component 118. In some examples, computing device 102 can execute at least a portion of ink stroke recognition component 114 to recognize elements as being ink (i.e., corresponding to a user's handwriting), as opposed to text (i.e., a conventional computer-generated font). Further, in some examples, computing device 102 can execute at least a portion of ink stroke generation component 116 to generate one or more indicators corresponding to predicted ink strokes, based on the ink stroke data 110. Further, in some examples, computing device 102 can execute at least a portion of ink formatting engine 118 to break apart ink stroke data to accommodate the location of one or more elements, based on a semantic context of the ink stroke data 110.

Server 104 may include a communication system 112, an ink stroke recognition engine or component 114, an ink stroke generation engine or component 116, and an ink formatting engine or component 118. In some examples, server 104 can execute at least a portion of ink stroke recognition component 114 to recognize elements as being ink (i.e., corresponding to a user's handwriting), as opposed to text (i.e., a conventional computer-generated font). Further, in some examples, server 104 can execute at least a portion of ink stroke generation component 116 to generate one or more indicators corresponding to predicted ink strokes, based on the ink stroke data 110. Further, in some examples, server 104 can execute at least a portion of ink formatting engine 118 to break apart ink stroke data to accommodate the location of one or more elements, based on a semantic context of the ink stroke data 110.

Additionally, or alternatively, in some examples, computing device 102 can communicate data received from ink stroke data source 106 to the server 104 over a communication network 108, which can execute at least a portion of ink stroke recognition component 114, ink stroke generation component 116, and/or ink formatting component 118. In some examples, ink stroke recognition component 114 may execute one or more portions of methods/processes 1300, 1400, 1500, 1800, 2100, and/or 2300 described below in connection with FIGS. 13, 14, 15, 18, 21, and 23. Further, in some examples, ink stroke generation component 116 and/or ink formatting component 118 may execute one or more portions of methods/processes 1300, 1400, 1500, 1800, 2100, and/or 2300 described below in connection with FIGS. 13, 14, 15, 18, 21, and 23.

In some examples, computing device 102 and/or server 104 can be any suitable computing device or combination of devices, such as a desktop computer, a laptop computer, a smartphone, a tablet computer, a wearable computer, a server computer, a speakerphone, a virtual machine being executed by a physical computing device, etc. Further, in some examples, there may be a plurality of computing device 102 and/or a plurality of servers 104.

In some examples, the system 100 may further include one or more peripheral devices 120. The peripheral devices 120 may be, for example, a trackpad, a mouse, a stylus, a smart pen, or any other I/O device that may be used by a user to perform natural writing motions or otherwise generate ink stroke data. The peripheral device 120 may include a communication system 112, such that the peripheral device 120 may be in communication with, for example, the computing device 102, and/or the server 104.

While the illustrated example system 100 shows two computing devices 102, two servers 104, and two peripheral devices 120, it should be recognized that systems in accordance with aspects of the present disclosure may include any number of computing devices 102, servers 104, and/or peripheral devices 120. Further, the number of ink stroke data sources 106 may be greater than, equal to, or less than the number of computing devices, servers, and/or peripheral devices, such as in instances where a plurality of people are writing on a computing device (e.g., with a stylus, trackpad, mouse, smart pen, their finger, etc.).

In some examples, ink stroke data source 106 can be any suitable source of ink stroke data (e.g., data generated from a computing device, data provided by a user, etc.). In a more particular example, ink stroke data source 106 can include memory storing ink stroke data (e.g., local memory of computing device 102, local memory of server 104, cloud storage, portable memory connected to computing device 102, portable memory connected to server 104, etc.).

In another more particular example, ink stroke data source 106 can include an application configured to generate ink stroke data. For example, ink stroke data source 106 can include an inking application that collects a plurality of ink stroke data points from a user, based on motions that a user makes with a stylus, finger, or other object. As another example, the ink stroke data source 106 can include an ink stroke generation application being executed by computing device 102, server 104, and/or any other suitable computing device. In some examples, ink stroke data source 106 can be local to computing device 102. Additionally, or alternatively, ink stroke data source 106 can be remote from computing device 102 and can communicate ink stroke data 110 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
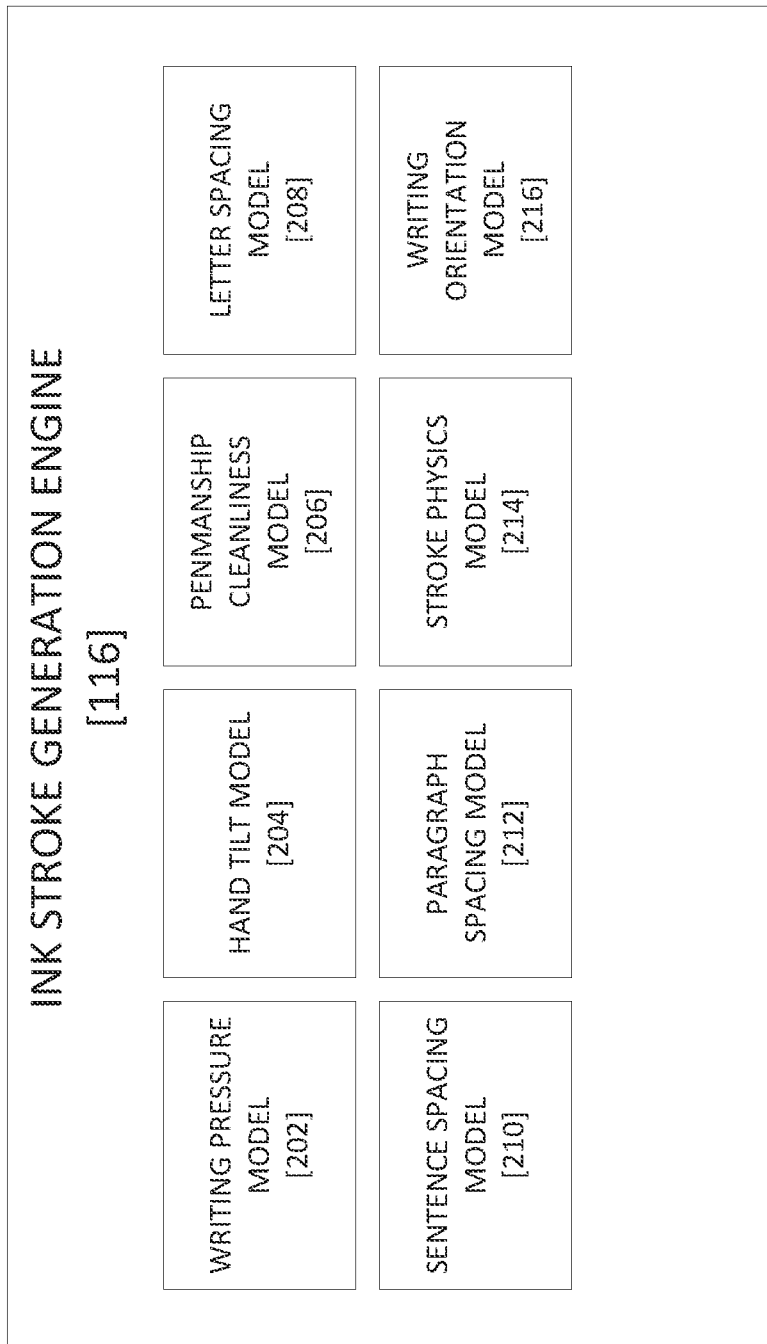
FIG. 2 illustrates a detailed schematic view of the ink stroke generation engine of FIG. 1.

FIG. 2 illustrates a detailed schematic view of the ink stroke generation component 116 of FIG. 1. The ink stroke generation component 116 includes a plurality of components or engines that contribute to the generation of ink strokes and/or indications corresponding to the generation of ink strokes. For example, the ink stroke generation component 116 can include a writing pressure model or component 202, a hand tilt model or component 204, a penmanship cleanliness model or component 206, a letter spacing model or component 208, a sentence spacing model or component 210, a paragraph spacing model or component 212, a stroke physics model or component 214, and a writing orientation model or component 216. The plurality of components of the ink stroke generation component 116 may store information that is parsed from ink stroke data (e.g., ink stroke data 110). Any ink stroke data that may correspond to biometric data of a user is collected with the user's permission (e.g., after the user has been prompted to provide, and subsequently provided, permission to systems disclosed herein to collect the biometric data).

The writing pressure component 202 may contain (e.g., stored in a memory location corresponding to the ink stroke generation component 116), and/or generate an indication of a pressure with which a user is writing ink. For example, a stylus, smart pen, or other writing device may contain grips that detect a pressure with which a user is pushing down on the writing device. Additionally, or alternatively, a screen, touchpad, or other user-interface may detect a pressure with which a user is writing on the user-interface. Such a pressure may impact the thickness of ink strokes that are generated. Accordingly, when predicting ink strokes, mechanisms disclosed herein may seek to replicate the pressure of ink strokes that have already been received (e.g., via the ink stroke data 110).

The hand tilt component 204 may contain (e.g., stored in a memory location corresponding to the ink stroke generation component 116), and/or generate an indication of an angle with which a user is writing ink. For example, a stylus, smart pen, or other writing device may contain a gyroscope that detects a tilt of the writing device with which a user writing. Additionally, or alternatively, a screen, touchpad, or other user-interface may detect an angle at which a user is writing on the user-interface. A user's hand tilt may impact a gradient thickness of a user's ink strokes, as the ink strokes are generated. Such a hand tilt may further impact the orientation of letters, numbers, or other symbols that are being drawn. Accordingly, when predicting ink strokes, mechanisms disclosed herein may seek to replicate an impact that a user's hand tilt had on ink strokes that have already been received (e.g., via the ink stroke data 110).

The penmanship cleanliness component 206 may contain (e.g., stored in a memory location corresponding to the ink stroke generation component 116), and/or generate an indication of penmanship cleanliness with which a user is writing ink. For example, some users may have good or cleanly penmanship, whereas other users may have poor or messy penmanship. A user with cleanly penmanship may have ink strokes that are generally rounded or straight, where appropriate, to relatively align with aspects of letters, numbers, or symbols that are generated by a text editor. On the other hand, a user with poor penmanship may have ink strokes that deviate from aspects of letters, numbers, or symbols that are generated by a text editor (e.g., due to shakiness when writing, exaggerated ink strokes in one or more directions, excessive curvature of ink strokes, mismatching curved lines with straights lines, etc.). Accordingly, when predicting ink strokes, mechanisms disclosed herein may seek to replicate the penmanship cleanliness of ink strokes that have already been received (e.g., via the ink stroke data 110).

In some examples, the penmanship cleanliness component 206 may include a machine learning model that is trained to estimate penmanship cleanliness. For example, the machine learning model may be trained based on a dataset of writing samples that are assigned corresponding penmanship cleanliness scores. In this respect, penmanship cleanliness may be estimated using mechanisms described herein. Further, a user's ink that is received by mechanisms described herein may be processed (e.g., modified or otherwise adapted) to improve (e.g., increase) the estimated penmanship cleanliness. In some examples, ink strokes may be beautified such that ink stroke data points are moved to create straighter or rounder ink strokes, where appropriate, to relatively align with aspects of letters, numbers, or symbols that are generated by a text editor. Alternatively, in some examples, Further, a user's ink that is received by mechanisms described herein may be processed (e.g., modified or otherwise adapted) to worsen (e.g., decrease) the estimated penmanship cleanliness, such that ink stroke data points are moved to create less straight or less round ink strokes, where appropriate, to relatively misalign with aspects of letters, numbers, or symbols that are generated by a text editor.

The letter spacing component 208 may contain (e.g., stored in a memory location corresponding to the ink stroke generation component 116), and/or generate an indication of spacing between letters that a user is inking (e.g., writing, not in a text-editor). For example, some users may write letters relatively close together, whereas other users may write letters relatively far apart. Further, some users may write specific letters relatively close together (e.g., "P" may be written relatively close to "a", as shown in FIG. 3B), and other specific letters relatively far apart (e.g., "n" may be relatively far from "t", as shown in FIG. 3B). Accordingly, when predicting ink strokes, mechanisms disclosed herein may seek to replicate the letter spacing tendencies of a user, based on ink strokes that have already been received (e.g., via the ink stroke data 110).

Letter spacing component 208 may further contain (e.g., stored in a memory location corresponding to the ink stroke generation component 116), and/or generate an indication of spacing between words that a user is inking, by recognizing spacing between a last letter of a first word, and a first letter of a second word, wherein the first word precedes the second word. It should be recognized that when words are written in cursive, there may only be spaces between words, and not between letters, due to cursive formatting. Accordingly, when predicting ink strokes, mechanisms disclosed herein may seek to replicate the letter spacing tendencies of a user, between words, based on ink strokes that have already been received (e.g., via the ink stroke data 110).

The sentence spacing component 210 may contain (e.g., stored in a memory location corresponding to the ink stroke generation component 116), and/or generate an indication of spacing between sentences that a user is inking (e.g., writing, not in a text-editor). For example, some users may include relatively large spaces after the end of a sentence (as dictated by a period, exclamation mark, question mark, etc.), whereas other users may include relatively small spaces after the end of a sentence. Accordingly, when predicting ink strokes, mechanisms disclosed herein may seek to replicate the sentence spacing tendencies of a user, based on ink strokes that have already been received (e.g., via the ink stroke data 110).

The paragraph spacing component 212 may contain (e.g., stored in a memory location corresponding to the ink stroke generation component 116), and/or generate an indication of spacing between paragraphs that a user is inking (e.g., writing, not in a text-editor). For example, some users may include relatively large spaces between paragraphs (e.g., one or more sentences), whereas other users may include relatively small spaces between paragraphs (e.g., one or more sentences). Accordingly, when predicting ink strokes, mechanisms disclosed herein may seek to replicate the paragraph tendencies of a user, based on ink strokes that have already been received (e.g., via the ink stroke data 110).

The stroke physics component 214 may contain (e.g., stored in a memory location corresponding to the ink stroke generation component 116), and/or generate an indication of physics (e.g., velocity, acceleration, etc.) with which a user is inking (e.g., writing, not in a text editor). For example, a user may ink letters, numbers, or symbols at a velocity. Accordingly ink stroke data points may be collected at the velocity. Further, a user may have a tendency to accelerate the rate at which they ink letters, numbers, or symbols during different periods of inking (e.g., at the beginning of a sentence, near the send of a sentence, at the beginning of a paragraph, near the end of a paragraph, etc.). Accordingly, the rate at which ink stroke data points are received may accelerate. Therefore, when predicting ink strokes, mechanisms disclosed herein may seek to generate indications of predicted ink strokes at the same velocity at which ink stroke data points are being received. Further, mechanisms disclosed herein may accelerate a rate at which indications of predicted ink strokes are generated, based on the acceleration of a user's inking (as determined based on a collection of ink stroke data, such as ink stroke data 110). In this respect, mechanisms disclosed herein may predict an appropriate timing to generate predicted ink strokes, based on stored data or trained models (e.g., machine learning models) corresponding to the physics (e.g., velocity, acceleration, etc.) with which a user inks.

The orientation component 212 may contain (e.g., stored in a memory location corresponding to the ink stroke generation component 116), and/or generate an indication of an orientation at which a user is inking (e.g., writing, not in a text-editor), relative to a surface (e.g., a display screen, a touchpad, a page, etc.). For example, some users may orient a surface at an angle from themselves when they are inking. Accordingly, the users may ink across the surface at an angle (e.g., an upward angle across a page, a downward angle across a page, etc.). When predicting ink strokes, mechanisms disclosed herein may seek to replicate the orientation at which a user is inking, such that indications of predicted ink strokes maintain the orientation of previously inked strokes, based on ink strokes that have already been received (e.g., via the ink stroke data 110).

Figure 3A:
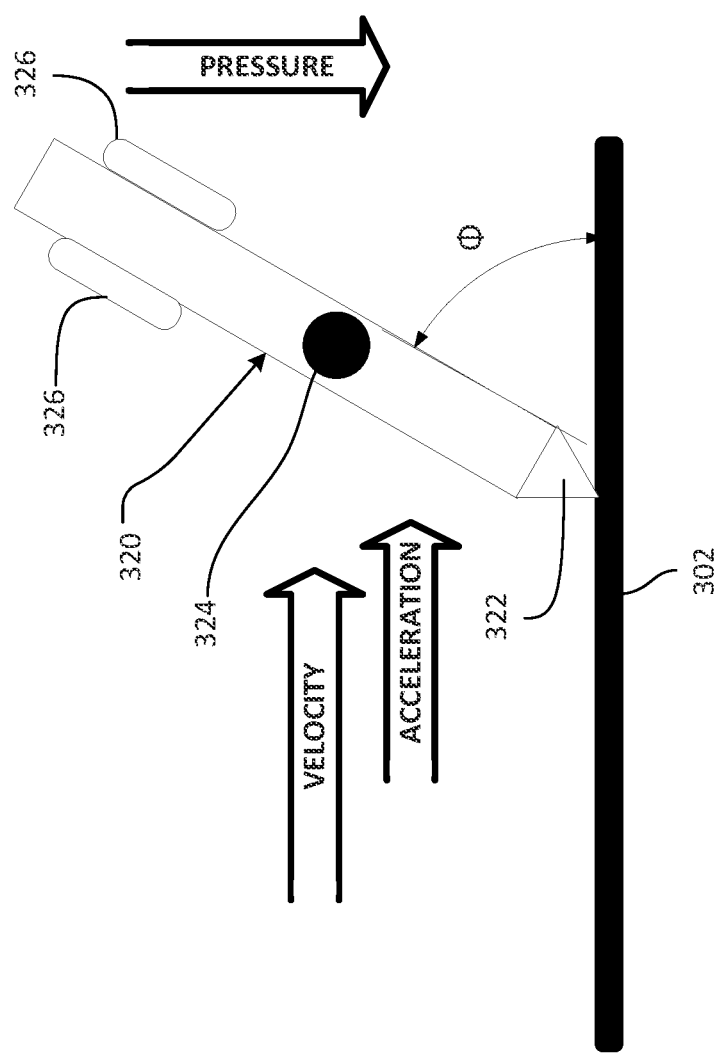
FIG. 3A illustrates a writing device in combination with a computing device, according to aspects described herein.
Figure 3B:
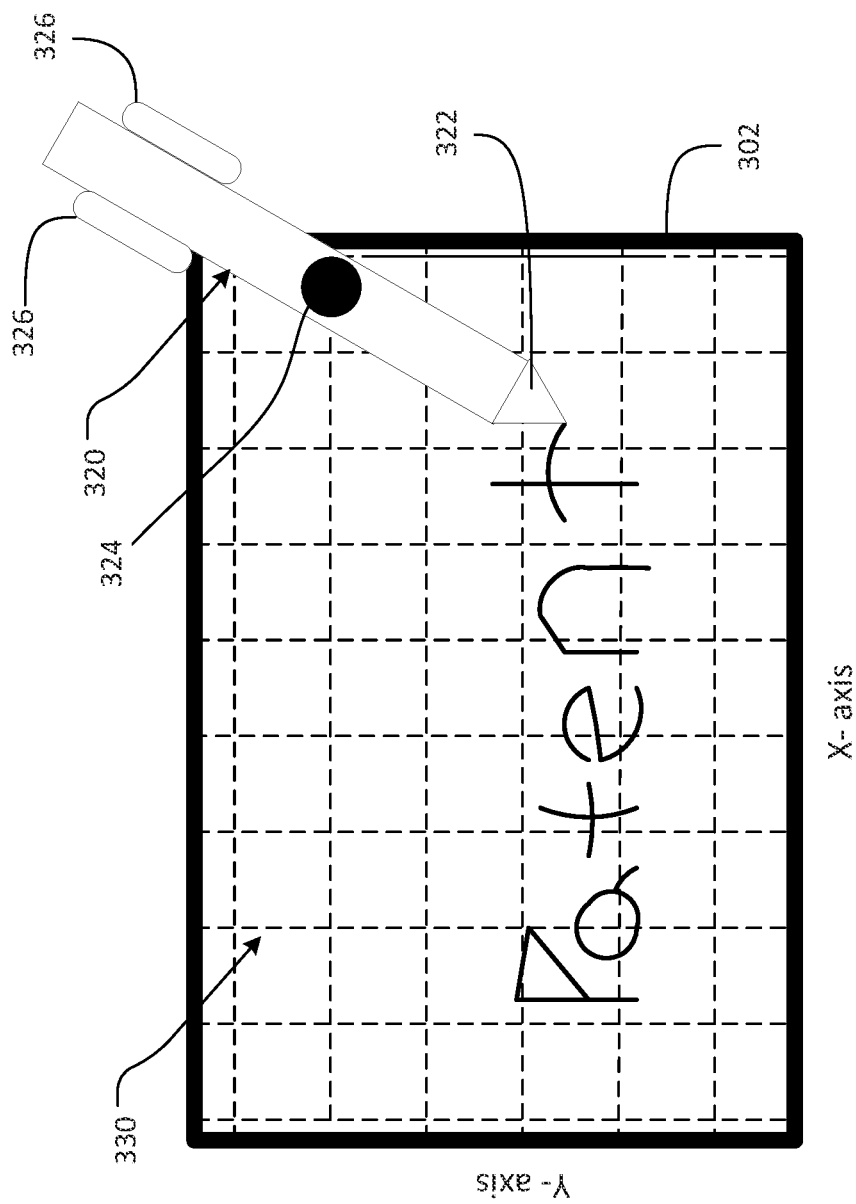
FIG. 3B illustrates a writing device in combination with a computing device, according to aspects described herein.

FIG. 3A illustrates a peripheral or writing device 320 in combination with a computing device 302, according to aspects described herein. The computing device 302 may be similar to the computing device 102, discussed earlier herein with respect to FIG. 1. Further, the peripheral device 320 may be similar to the peripheral device 120, discussed earlier herein with respect to FIG. 1.

The writing device 320 can include a plurality of components to improve data collection corresponding to a user's ink strokes. For example, the writing device 320 can include a tip 322. The tip 322 may be a capacitive or passive tip that is made of a conductive material, and the tip 322 may be configured for use with a touch screen (e.g., a touch screen of the computing device 302). Additionally, or alternatively, the writing device 320 may be a digital or active device that communicates with a computing device, such as computing device 302. In examples where the writing device 320 is a digital device, it may include components of conventional computing devices, as should be recognized by those of ordinary skill in the art (e.g., processor, memory, communication system, etc.).

The writing device 320 may include one or more sensors. For example, the writing device 320 may include an inertial measurement unit (IMU) 324. The intertial measurement unit 324 may include a gyroscope (e.g., to provide a measure of angular rate), an accelerometer (e.g., to provide a measure of force/acceleration), and/or a magnetometer (e.g., to provide a measure of a magnetic field). The IMU 324 may collect ink stroke data (e.g., ink stroke data 110) that is used by aspects of the ink stroke recognition engine and/or ink stroke generation engine to recognize ink strokes and/or generate predicted ink strokes. For example the IMU 324 may contain (e.g., stored in a memory location of the writing device 320), and/or generate an indication of an angle 1 at which a user is inking. The angle 1 may correspond to a hand tilt angle of a user who is inking with the writing device 320. The angle 1 at which the user is inking may be measured with respect to a surface of the computing device 302.

The writing device 320 may further include one or more pressure sensors 326. The pressure sensors 326 may be disposed along a grip portion of a body of the writing device 320. The pressure sensors 326 may be positioned such that a user grips the pressure sensors 324 when performing a write action with the writing device 320. The pressure sensors 326 may generate an indication of a pressure with which a user is gripping the writing device 320 when inking. The indication of the pressure with which a user is gripping, based on the pressure sensors 326, may be the ink stroke generation engine 116 (e.g., specifically, by the writing pressure model 202, discussed earlier herein) to generate indications of predicted ink strokes.

The writing device 320 may collect and/or generate data corresponding to physics of inking actions being performed by a user. For example, the writing device 320 may collect data corresponding to a velocity at which a user generates ink stroke points on the computing device 302 (e.g., based indications stored or generated by the IMU). Additionally, and/or alternatively, the combination of the writing device 320 and the computing device 302 may allow the computing device 302 to collect data corresponding to the physics of inking actions being performed by a user. The velocity may be based on a rate at which ink stroke data points are received by the computing device 302 (e.g., based on the tip 322 of the writing device 320).

Further, the writing device 320 may collect data corresponding to an acceleration at which a user generates ink stroke points on the computing device 302 (e.g., based indications stored or generated by the IMU). Additionally, and/or alternatively, the combination of the writing device 320 and the computing device 302 may allow the computing device 302 to collect data corresponding to the physics of inking actions being performed by a user. The acceleration may be based on a rate at which ink stroke data points are received by the computing device 302 (e.g., based on the tip 322 of the writing device 320).

Additional, and/or alternative sensors that may be incorporated with mechanisms disclosed herein may be recognized by those of ordinary skill in the art. For example, the writing device 320 may further include a twist sensor that detects rotation about a longitudinal axis of the pen (e.g., as defined from the tip 322 to a laterally opposed end of the writing device 320, such as where an eraser may be located). Additionally, or alternatively, the writing device 320 and/or a computing device, such as computing device 302 may include a camera that could be used to monitor a user's hand (e.g., the motion thereof, such as when they write) and/or a user's face, with permission, to determine correlations between facial expressions of a user and ink stroke data that is received. For example, if a user is determined to be angry (e.g., based on recognition of facial cues), then it may be predicted that a user may write faster, with increased pressure on a device, and/or with relatively worse penmanship. Alternatively, if a user is determined to be calm (e.g., based on recognition of facial cues), then it may be determined that a user may write slower, with decreased pressure on a device, and/or with relatively improved penmanship.

FIG. 3B illustrates the writing device 320 in combination with the computing device 302, in another orientation, according to aspects described herein. In the example of FIG. 3B, a user is writing across the computing device 302, when the computing device 302 is in a landscape view. The computing device 302 (and/or specifically, a display screen thereof) defines a coordinate plane 330. The coordinate plane 330 includes an X-axis, and a Y-axis. Coordinates within the coordinate plane can be represented in a matrix. Additionally, or alternatively, coordinates within the coordinate plane can be represented in pixels.

As a user is inking on a computing device 302, such as, for example, by writing with the writing device 320 on a display screen of the computing device 302, ink stroke data points may be received, corresponding to coordinate points on the coordinate plane 330. In this respect, a user may select points, from all potential points on the coordinate plane 330, at which to indicate an ink stroke is passing therethrough. Subsequently, mechanisms disclosed herein may generate an indication of the ink stroke, based on points selected by the user on the coordinate plane 330. Furthermore, ink strokes may be predicted, using mechanisms described herein, based on coordinate locations at which existing ink strokes data points have already been received, on the coordinate plane 330. For example, letter spacing (e.g., based on the letter spacing model 208), sentence spacing (e.g., based on the sentence spacing model 210), and paragraph spacing (e.g., based on the paragraph spacing model 212) may each be based on coordinate locations at which ink stroke points are received (e.g., on the coordinate plane 330), such that a spacing between such ink strokes can be determined, and such that subsequent processing (e.g., generating an indication of predicted ink strokes) can occur, based on the determination.

Figure 3C:
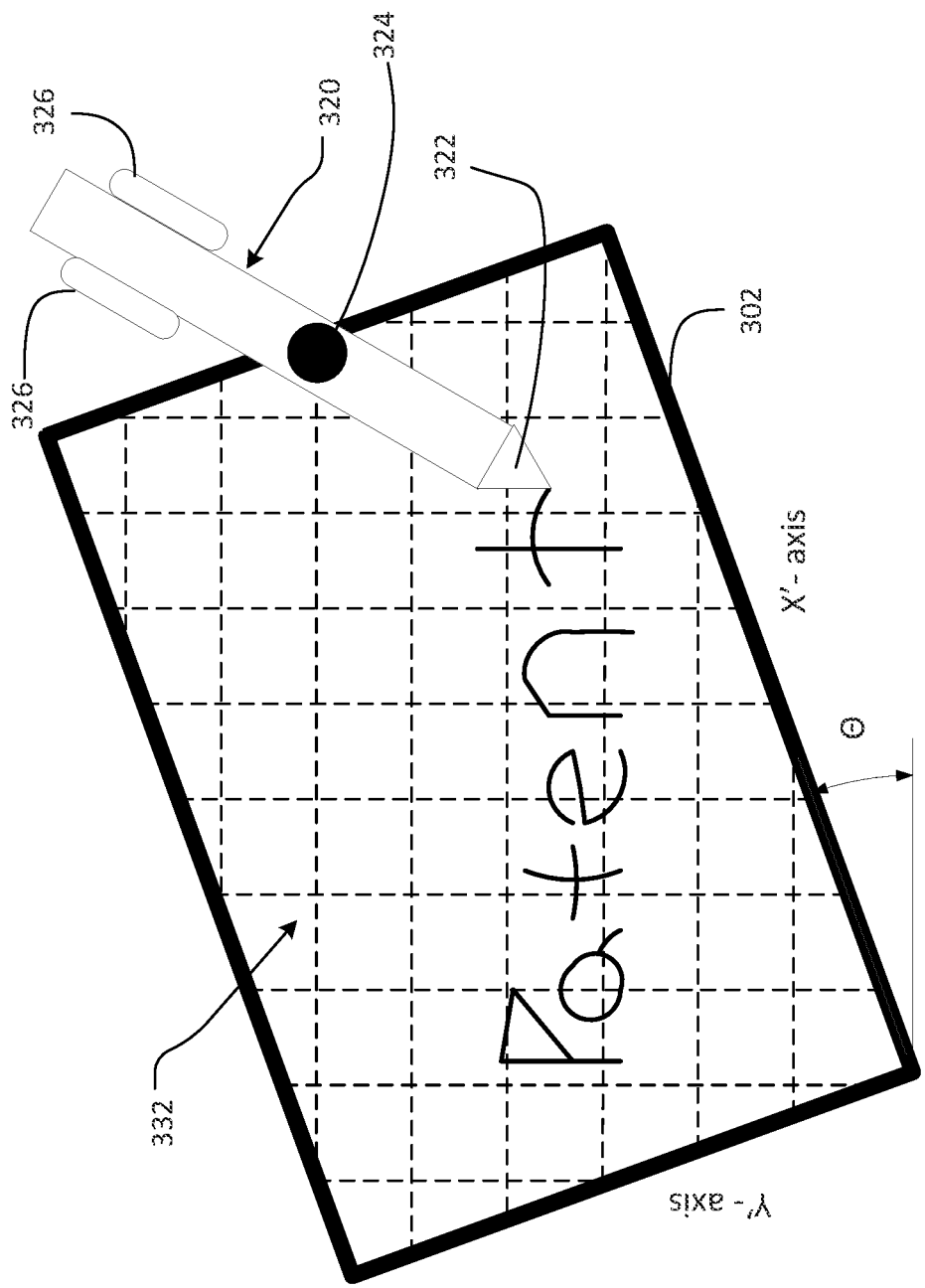
FIG. 3C illustrates a writing device in combination with a computing device, according to aspects described herein.

FIG. 3C illustrates the writing device 320 in combination with the computing device 302, in another orientation, according to aspects described herein. In the example of FIG. 3C, a user is writing across the computing device 302, when the computing device 302 is rotated (e.g., rotated upward, about a corner of the computing device 302) from a landscape view at an angle θ. The computing device 302 (and/or specifically, a display screen thereof) may define the coordinate plane 330, as discussed with respect to FIG. 3C. However, when the computing device 302 is rotated, the coordinate plane 330 may be a first coordinate plane, and the computing device 302 may further define a second coordinate plane 332. The second coordinate plane 332 includes an X'-axis, and a Y'-axis.

As a user is inking on a computing device 302, such as, for example, by writing with the writing device 320 on a display screen of the computing device 302, ink stroke data points may be received, corresponding to coordinate points on the second coordinate plane 332. In this respect, a user may select points, from all potential points on the second coordinate plane 332, at which to indicate an ink stroke is passing therethrough. Subsequently, mechanisms disclosed herein may generate an indication of the ink stroke, based on points selected by the user on the second coordinate plane 332. Furthermore, ink strokes may be predicted, using mechanisms described herein, based on coordinate locations at which existing ink strokes data points have already been received, on the second coordinate plane 332. For example, letter spacing (e.g., based on the letter spacing model 208), sentence spacing (e.g., based on the sentence spacing model 210), and paragraph spacing (e.g., based on the paragraph spacing model 212) may each be based on coordinate locations at which ink stroke points are received (e.g., on the coordinate plane 330), such that a spacing between such ink strokes can be determined, and such that subsequent processing (e.g., generating an indication of predicted ink strokes) can occur, based on the determination.

In some examples, matrix transformations may occur to transfer ink stroke data points between the first coordinate plane 330 and the second coordinate plane 332. For example, if a tablet computing device is lying flat on a table, and the user rotates the tablet on the table, the user may desire for an ink displayed on the tablet to still be facing them, since they are the ones writing. Alternatively, if a user is writing across a tablet that is rotated at the angle θ, with respect to themselves, then mechanisms disclosed herein may transform collected ink stroke data or coordinate points from the second coordinate plane 332 to the first coordinate plane 330 to determine predicted ink strokes, which may then transformed back to the second coordinate plane 332. Matrix transformations may be performed using conventional methods known to those of ordinary skill in the art. Furthermore, while the illustrated examples of FIGS. 3B and 3C, and corresponding descriptions, are shown and described to include 2-dimensional coordinate planes, it is contemplated that ink stroke data can be provided in a 3-dimensional coordinate plane, such as a virtual, or augmented reality environment.

Figure 4:
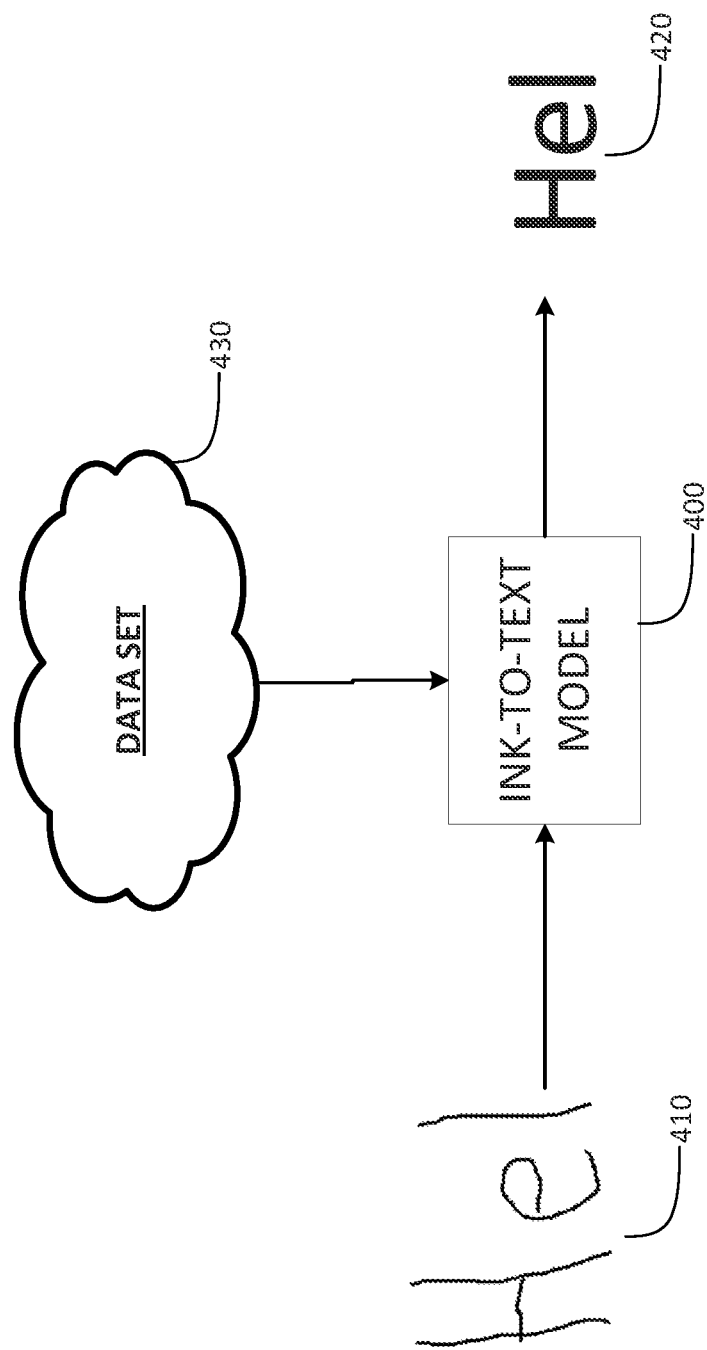
FIG. 4 illustrates an example model for converting text to ink, according to aspects described herein.

FIG. 4 illustrates an example model 400 for converting ink to text, according to aspects described herein. The model 400 may receive ink stroke data 410. The ink stroke data 410 may be similar to ink stroke data 110 described earlier herein with respect to FIG. 1. The model 400 may determine text data 420 that corresponds to the ink stroke data 410. For example, the model 400 may be trained based on a data set 430. The data set 430 may include a plurality of pairings of ink stroke data (e.g., inked letters, words, sentences, etc.) and corresponding text data (e.g., letters, words, sentences, etc. that are generated by a text-editor). In some examples, the ink stroke data 110 may be cursive, and the data set 430 may include a plurality of pairings of cursive ink stroke data and corresponding text data, such that the model 400 is trained to convert ink stroke data that is cursive to corresponding text data. Generally, the model 400 can convert ink stroke data to text data, such that further processing can be preformed on the text data.

Figure 5:
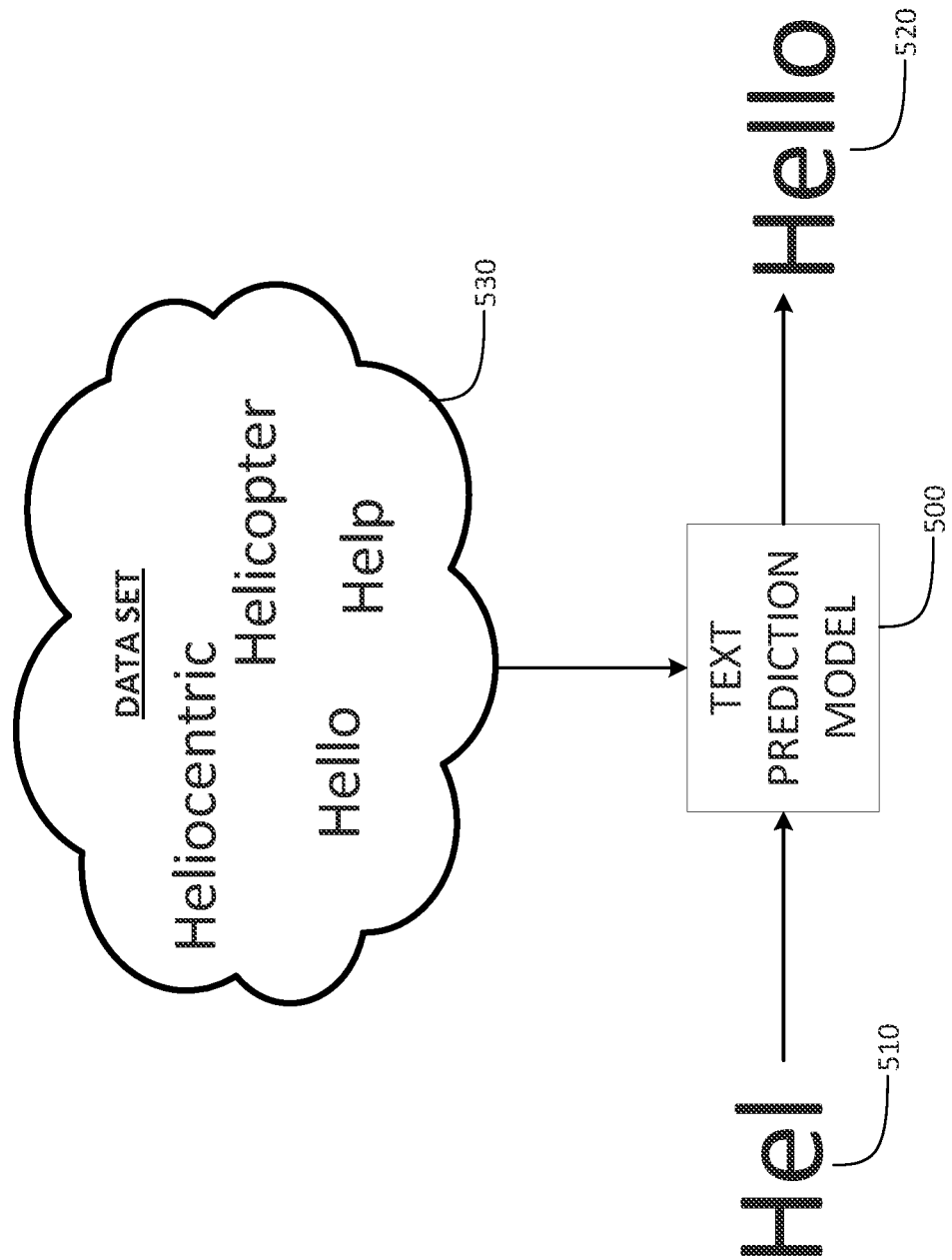
FIG. 5 illustrates an example model for predicting ink, from text, according to aspects described herein.

FIG. 5 illustrates an example model 500 for predicting text, from text, according to aspects described herein. The model 500 may receive text data 510 (e.g., the text data 420 output by the model 400). The text data may be one or more letters, one or more words, one or more sentences, etc. The model 500 may determine predicted text data 520 (e.g., words, phrases, sentences, etc.) that corresponds to the text data 510. The text data 510 may form a portion of the predicted text data 520. The model 500 may be trained based on a data set 530. For example, the model 500 may be a machine-learning model, and/or a natural language processor that is trained to predicted text data, based on semantic context. For example, the data set 530 may be the Internet, and the model 500 may be trained to predict text based on learning that was performed on as much as all of the text on the Internet. Additionally, or alternatively, the data set 530 may be a data set of text data that is paired with predicted text data, as may be compiled, for example, by one or more users. In some examples, the model 500 receives a semantic context that impacts the predicted text data 520 that is output from the model 500. Generally, the model 500 can predict text data (e.g., words, phrases, sentences, etc.) based on received text data that forms a part of the predicted text data. In some examples, the predicted text data may be based on the received text data, as well as a semantic context of the received text data (e.g., text data 510).

Figure 6:
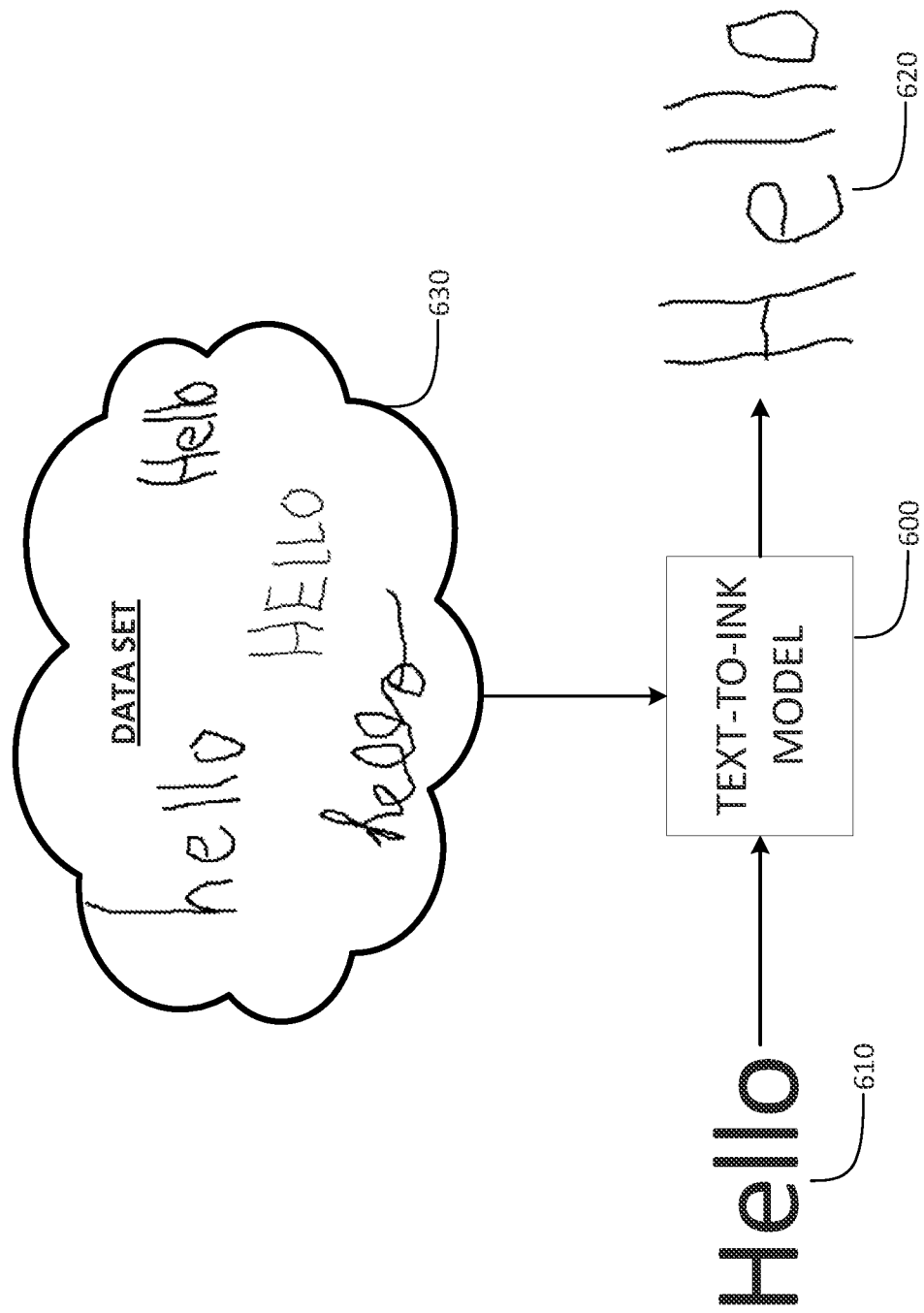
FIG. 6 illustrates an example model for converting text to ink, according to aspects described herein.

FIG. 6 illustrates an example model 600 for converting text to ink, according to aspects described herein. The model 600 may receive text data 610 (e.g., text data 520 output from model 500). The model 600 may determine predicted ink stroke data 620 that corresponds to the text data 610. For example, the model 600 may be trained based on a data set 630. The data set 630 may include a plurality of pairings of ink stroke data (e.g., inked letters, words, sentences, etc.) and corresponding text data (e.g., letters, words, sentences, etc. that are generated by a text-editor). In some examples, the predicted ink stroke data 610 may be cursive, and the data set 630 may include a plurality of pairings of cursive ink stroke data and corresponding text data, such that the model 600 is trained to convert text data to predicted ink stroke data that is cursive. The ink stroke data 620 may be generated based on the data set 630, as well as a plurality of additional factors, such as those discussed earlier herein, with respect to the ink stroke generation engine of FIGS. 1 and 2. For example, the model 600 may include one or more components of the ink stroke generation engine 116 to generate predicted ink stroke data 620 (e.g., writing pressure model 202, hand tilt model 204, penmanship cleanliness model 206, letter spacing model 208, sentence spacing model 210, paragraph spacing model 212, stroke physics model 214, and/or writing orientation model 216). Generally, the model 600 can convert text data to predicted ink stroke data, such that a user can receive an indication of predicted ink strokes.

Figure 7:
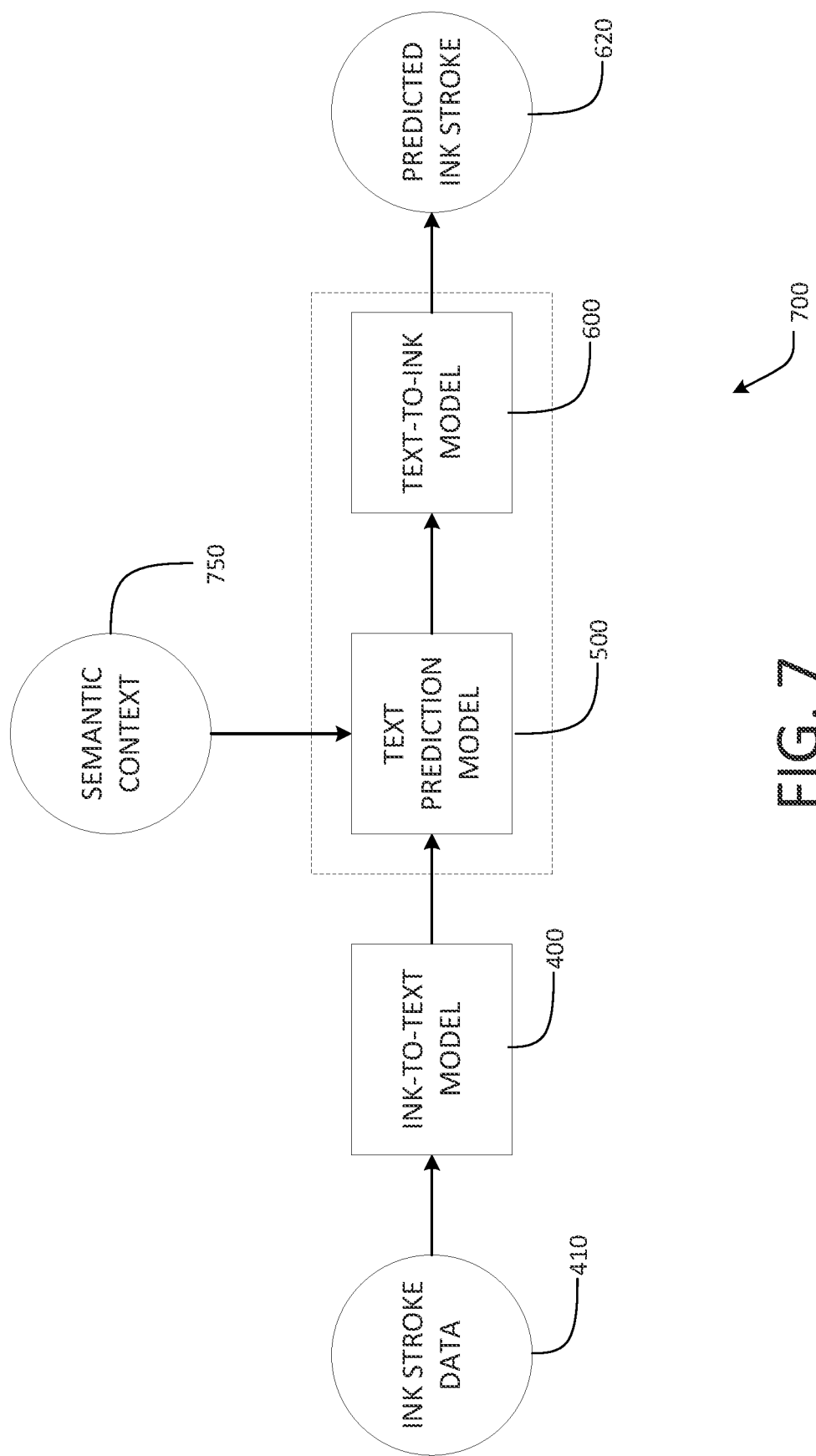
FIG. 7 illustrates a functional diagram for generating a predicted ink stroke, according to aspects described herein.

FIG. 7 illustrates an example flow 700 of generating a predicted ink stroke, according to aspects described herein. The flow 700 begins with ink stroke data 410. The ink stroke data 410 may be similar to ink stroke data 110. For example, the ink stroke data 410 may be received from an ink stroke data source (e.g., ink stroke data source 106), which may be, for example a stylus with which a user is writing, a trackpad on which a user is writing, a computer-executed program that generates ink strokes, etc.

The ink stroke data 410 may be received by the ink-to-text model 400. In some examples, the ink stroke data 410 may be transmitted to the ink-to-text model 400. Alternatively, in some examples, the ink stroke data 410 may be obtained by the ink-to-text model 400. As discussed earlier herein, the ink-to-text model 400 may convert ink stroke data to text data.

Text data that is output from the ink-to-test model may be received by the text prediction model 500. The text prediction model 500 may further receive a semantic context 750. The semantic context 750 may correspond to the ink stroke data 410 to provide an indication of meaning attributed to words, partial-words, or phrases due to content, form, style, or origin of the words, partial-words, or phrases, rather than, or in addition to, the customary linguistic definition of the word. Additionally, or alternatively, the semantic context 750 may provide further meaning to the ink stroke data 410, independent of the ink stroke data 410, such as meaning that is input from a user, and/or meaning that is learned from previous text predictions performed in accordance with mechanisms described herein. The text prediction model 500 may generate a predicted word, phrase, or sentences, based on the output of the ink-to-text model 400 and the semantic context 750.

The text-to-ink model 600 may receive the predicted text from the text prediction model 500. The text-to-ink model 600 may then convert the predicted text to one or more predicted ink strokes 620. For example, the text-to-ink model 600 may generate an indication of one or more predicted ink strokes 620. The text-to-ink model 600 may include one or more components of the ink stroke generation engine 116 to generate predicted ink stroke data 620 (e.g., writing pressure model 202, hand tilt model 204, penmanship cleanliness model 206, letter spacing model 208, sentence spacing model 210, paragraph spacing model 212, stroke physics model 214, and/or writing orientation model 216).

In some examples, the ink-to-text model 400 may be a first model, and the text prediction model 500 and the text-to-ink model 600 may form a second model. Alternatively, in some examples, the ink-to-text model 400 and text prediction model 500 may form a first model, and the text-to-ink model 600 may be a second model. Alternatively, in some examples, the ink-to-text model 400 may be a first model, the text prediction model 500 may be a second model, and the text-to-ink model 600 may be a third model.

Generally, the flow 700 outlines mechanisms in which ink stroke data 410 and semantic context 750 are received to generate an indication of one or more predicted ink strokes, from an otherwise infinite number of possible ink strokes, using text-based semantics. Further, mechanisms disclosed herein provide the benefit of being able to generate predicted ink strokes, using text-based semantics, corresponding to a user's own writing style (e.g., writing pressure, hand tilt, penmanship cleanliness, letter spacing, sentence spacing, paragraph spacing, etc.).

Figure 8:
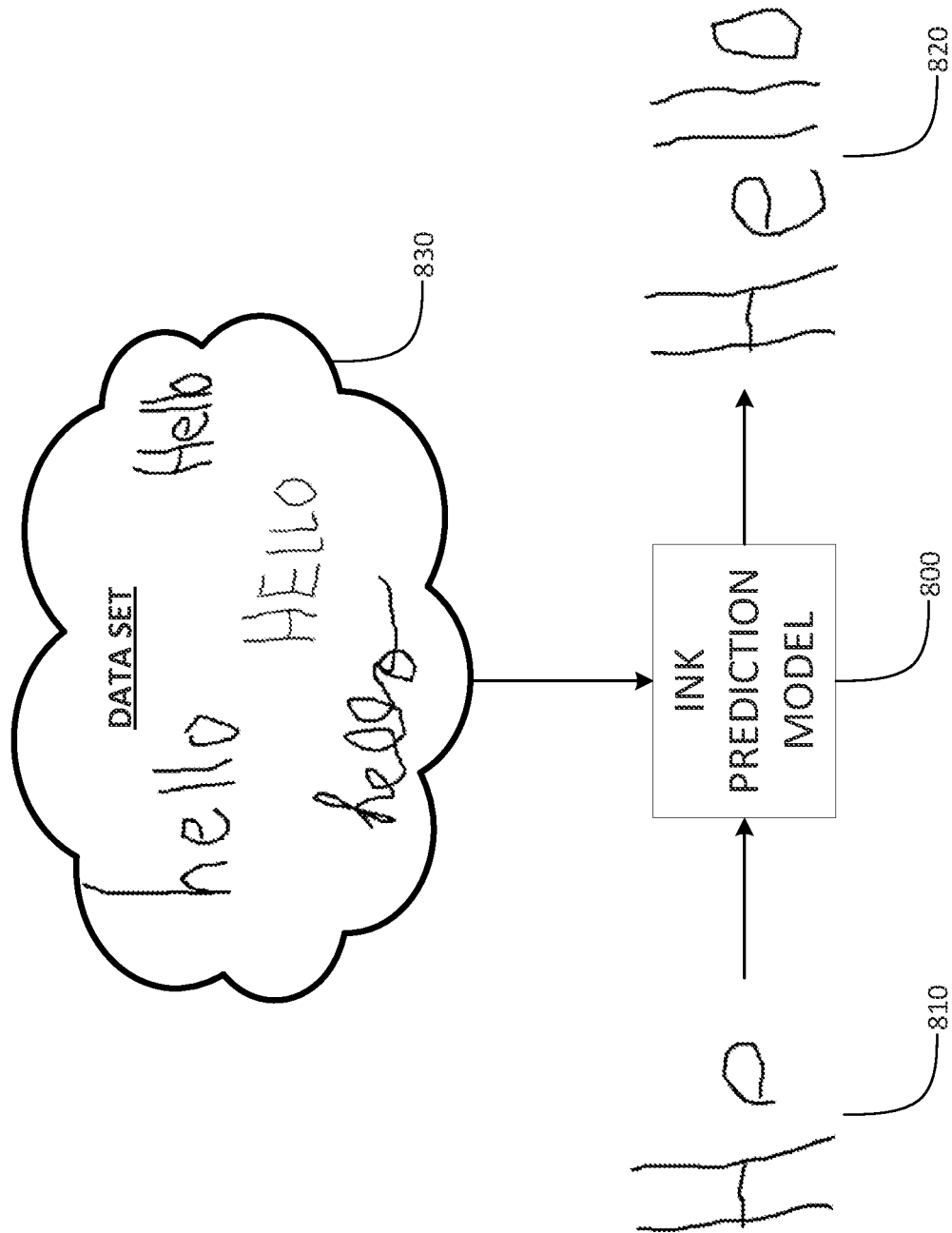
FIG. 8 illustrates an example model for generating predicted ink, from received ink stroke data, according to aspects described herein.

FIG. 8 illustrate an example model 800 for generating predicted ink, from received ink stroke data, according to aspects described herein. The model 800 may receive ink stroke data 810. Ink stroke data 810 may be similar to ink stroke data 110 discussed earlier herein. For example, the ink stroke data 410 may be received from an ink stroke data source (e.g., ink stroke data source 106), which may be, for example a stylus with which a user is writing, a trackpad on which a user is writing, a computer-executed program that generates ink strokes, etc.

The model 800 may determine predicted ink stroke data 820 that corresponds to the received ink stroke data 810. For example, the model 800 may be trained based on a data set 830. The data set 830 may include a plurality of pairings of ink stroke data (e.g., inked letters, words, sentences, partial-letters, partial-words, partial-sentences, etc.) and corresponding predicted ink stroke data (e.g., inked words, phrases, sentences, etc.).

In some examples, the received ink stroke data 810 may be cursive, and the data set 630 may include a plurality of pairings of cursive ink stroke data and corresponding predicted cursive ink stroke data, such that the model 800 is trained to predict cursive ink stroke data (e.g., predicted ink stroke data 820) from received ink stroke data that is cursive. It will be recognized by those of ordinary skill in the art that cursive ink strokes may be relatively more complex to predict than non-cursive (e.g., print) ink strokes, due to unique tendencies of cursive ink strokes that correspond to respective persons. Such unique tendencies are accounted for using mechanisms described herein, such as via the components discussed with respect to FIG. 2.

Furthermore, in some examples, the received ink stroke data 810 may include partial-stroke data. For example, referring to the received ink stroke data 810 of FIG. 8, the received ink stroke data 810 includes a partial-stroke after the letter "h". The partial-stroke is predicted to be the letter "e" in the predicted ink stroke data 820. However, mechanisms that merely convert ink to text, and predicted text to ink, such as mechanisms described earlier herein, with respect to flow 700, may be unable to properly execute determinations of partial-strokes. For example, the partial stroke of ink stroke data 810 could be interpreted to not be a valid alphanumeric character. Alternatively, the partial stroke may be interpreted to be any one of a plurality of different alphanumeric characters, such as, for example, an "O", or a "P", or a "B", or an "e". However, the ink prediction model 800 may be trained to appropriately determine which alphanumeric character is being inked, such that the predicted ink stroke data 820 can be generated. Additionally, or alternatively, those of ordinary skill in the art should recognize that cursive letters are often inked using a single ink stroke. Therefore, mechanisms disclosed herein for determining predicted ink stroke data from partial strokes, may be similarly applied to cursive words that have been partially inked, and therefore may be, and/or include, partial stroke data.

The ink stroke data 820 may be generated based on the data set 830, as well as a plurality of additional factors, such as those discussed earlier herein, with respect to the ink stroke generation engine of FIGS. 1 and 2. For example, the model 800 may include one or more components of the ink stroke generation engine 116 to generate predicted ink stroke data 820 (e.g., writing pressure model 202, hand tilt model 204, penmanship cleanliness model 206, letter spacing model 208, sentence spacing model 210, paragraph spacing model 212, stroke physics model 214, and/or writing orientation model 216).

In some examples, the model 800 may further receive semantic context related to the received ink stroke data 810. The semantic context may correspond to the ink stroke data 810 to provide an indication of meaning attributed to words, partial-words, or phrases due to content, form, style, or origin of the words, partial-words, or phrases, rather than, or in addition to, the customary linguistic definition of the word. Additionally, or alternatively, the semantic context may provide further meaning to the ink stroke data 810, independent of the ink stroke data 810, such as meaning that is input from a user, and/or meaning that is learned from previous ink stroke data predictions performed in accordance with mechanisms described herein. The ink prediction model 800 may generate predicted ink stroke data (e.g., words, phrases, and/or sentences), based on the received ink stroke data 810, as well as, in some examples, the semantic context. Generally, the model 800 can generate one or more indications of predicted ink stroke data that correspond to received ink stroke data, using ink-based semantics (i.e., not text-based semantics).

Figure 9:
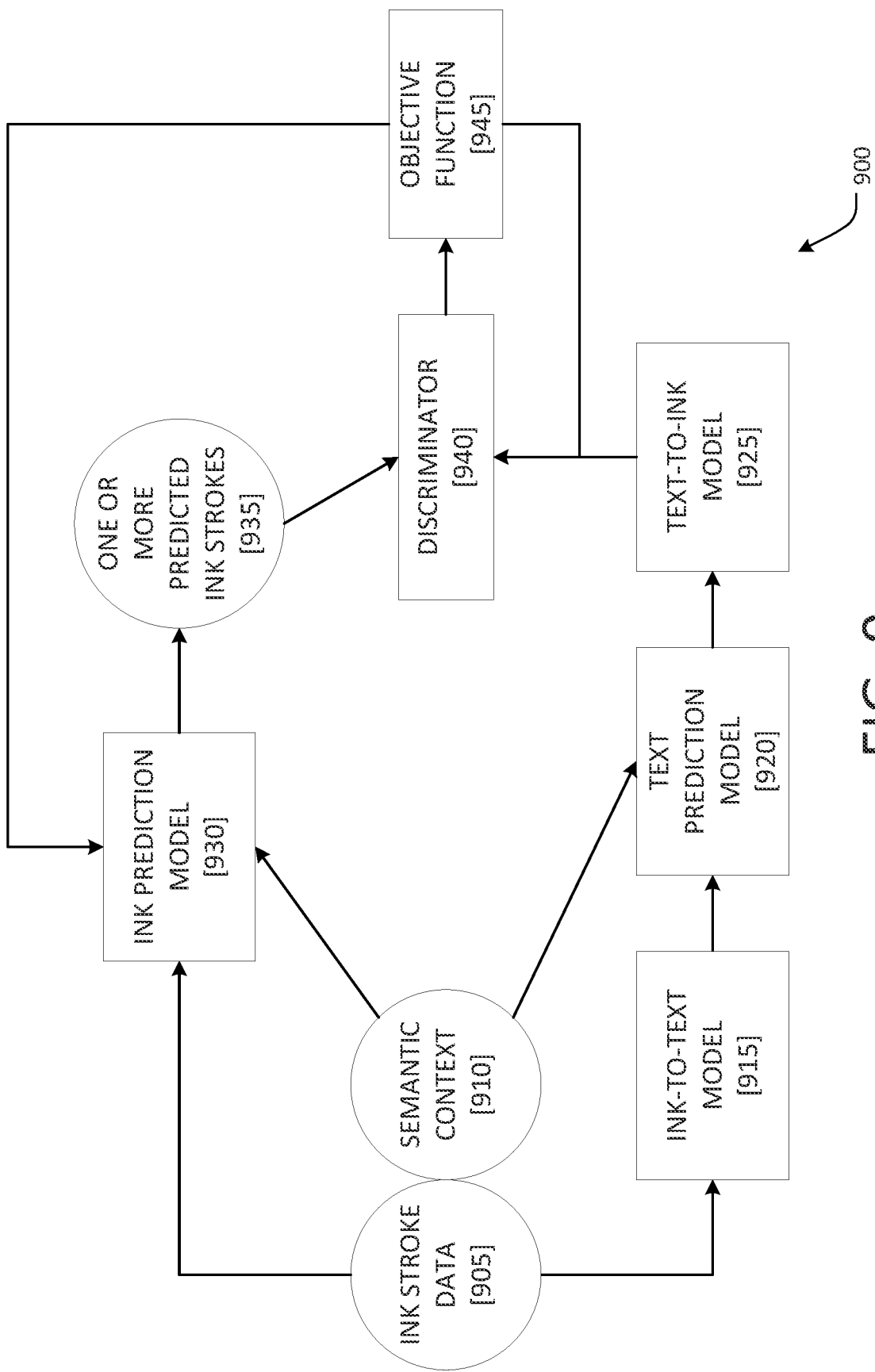
FIG. 9 illustrates an example flow for training an ink prediction model to generate an indication of predicted ink stroke data based on received ink stroke data and a semantic context.

FIG. 9 illustrates an example flow 900 for training an ink prediction model 930 to generate an indication of predicted ink stroke data 935, based on received ink stroke data 905 and a semantic context 910. The ink stroke data 905 may be similar to the ink stroke data 110 discussed earlier herein. Further, the semantic context 910 may be similar to the semantic context 750 discussed earlier herein.

In some embodiments, the ink prediction model 930 can include one or more neural networks, such as a U-Net convolutional neural network. In some embodiments, the ink prediction model 930 can include a pix2pix model. In some embodiments, the ink prediction model 930 can be a generative adversarial network (GAN). In some embodiments, the ink prediction model 930 can include a neural network that can receive the ink stroke data 905 and the semantic context 910 and output one or more predicted ink strokes. For example, the ink prediction model 930 may output a plurality of predicted ink strokes, wherein the predicted ink strokes are ranked or sorted by which most probably match that which would be inked by a user (e.g., if a user writes "he" and intends to write "hello", then "hello" may be ranked relatively higher on a list of predicted ink strokes, than, for example, "helicopter"). Alternatively, the ink prediction model 930 may output only the highest ranked (e.g., most probable) predicted ink stroke (e.g., if a user writes "he" and ink stroke data corresponding to "hello" is the most highest ranked output, then the ink stroke data corresponding to "hello" will be output).

In some examples, the ink prediction model 930 can include a plurality of neural networks that are each trained to output a specific aspect of a predicted ink stroke. For example, a first neural network may output a predicted ink stroke that takes into account writing pressure (e.g., as discussed earlier herein with respect to writing pressure model 202), and/or hand tilt (e.g., as discussed earlier herein with respect to hand tilt model 204), and/or penmanship cleanliness (e.g., as discussed earlier herein with respect to penmanship cleanliness model 206), and/or letter spacing (e.g., as discussed earlier herein with respect to letter spacing model 208), and/or sentence spacing (e.g., as discussed earlier herein with respect to sentence spacing model 210), and/or paragraph spacing (e.g., as discussed earlier herein with respect to paragraph spacing model 212), and/or stroke physics (e.g., as discussed earlier herein with respect to stroke physics model 214), and/or writing orientation model (e.g., as discussed earlier herein with respect to writing orientation model 216). The flow 900 can include combining one or more of the outputs from the plurality of neural networks into a single indication of one or more predicted ink strokes.

The ink prediction model 930, which predicts ink stroke data that is based on received ink stroke data and semantic context, can be trained based on an ink-to-text model 915, a text prediction model 920, and a text-to-ink model 925. The ink-to-text model 915, the text prediction model 920, and the text-to-ink model 925 may be similar to the ink-to-text model 400, the text prediction model 500, and the text-to-ink model 600, respectively, discussed with respect to flow 700. Generally, the ink prediction model 930, which is based on ink-semantics, may be trained based on one or more ink prediction models (e.g., model 915, model 920, and model 925) that are based on text-semantics.

The flow 900 can include providing the one or more predicted ink strokes 935, and one or more predicted ink strokes from the text-to-ink model 925 to a discriminator 940 that can predict whether or not the one or more predicted ink strokes 935 is real (e.g., accurate, with respect to the output of the text-to-ink model 925), or generated by the ink prediction model 930. In some embodiments, the ink prediction model 930 can output a matrix or pixel compilation of predicted ink stroke data points (such as discussed earlier herein with respect to FIGS. 3A-3C), and the location of the ink stroke data points can be compared to the output from the text-to-ink model 925.

In some embodiments, the discriminator 940 can receive the one or more predicted ink strokes 935 and output a label ranging from 0 to 1, with 0 indicating that the one or more predicted ink strokes are generated by the ink prediction model 930, and 1 indicating that the one or more predicted ink strokes are real (e.g., relatively accurate in comparison to the output from the text-to-ink model 925). In some embodiments, the discriminator 940 can be a PatchGAN discriminator.

The flow 900 can include an objective function value calculation 945. The objective function value calculation 925 can include calculating an objective function value based on labels output by the discriminator 940 and/or by other metrics calculated based on the inks stroke data 905, the semantic context 910, the one or more predicted ink strokes 935, and the output of the text-to-ink model 925. The objective function value can capture multiple loss functions (e.g., a weighted sum of multiple loss functions). In this way, the objective function value can act as a total loss value for the ink prediction model 930 and the discriminator 940.

A number of different suitable objective functions can be used to calculate the objective function value. For example, a distance can be calculated between each data point or pixel of the one or more predicted ink strokes 935, as compared to the output of the text-to-ink model 925. Each of the distances can be summed together, averaged (e.g., standard average, mean squared average, weighted average, etc.), or otherwise arithmetically evaluated to determine a value indicative of error between the one or more predicted ink strokes 935, as compared to the output of the text-to-ink model 925. The ink prediction model 930 and/or the discriminator 940 may be updated based on the objective function 945, such that an accuracy of the one or more predicted ink strokes 935 improves relative to the output of the text-to-ink model.

The flow 900 can include receiving a plurality of sets of ink stroke data 905 and corresponding semantic context 910 to iteratively train the ink prediction model 930, using the text-based models 915, 920, and 925.

Figure 10:
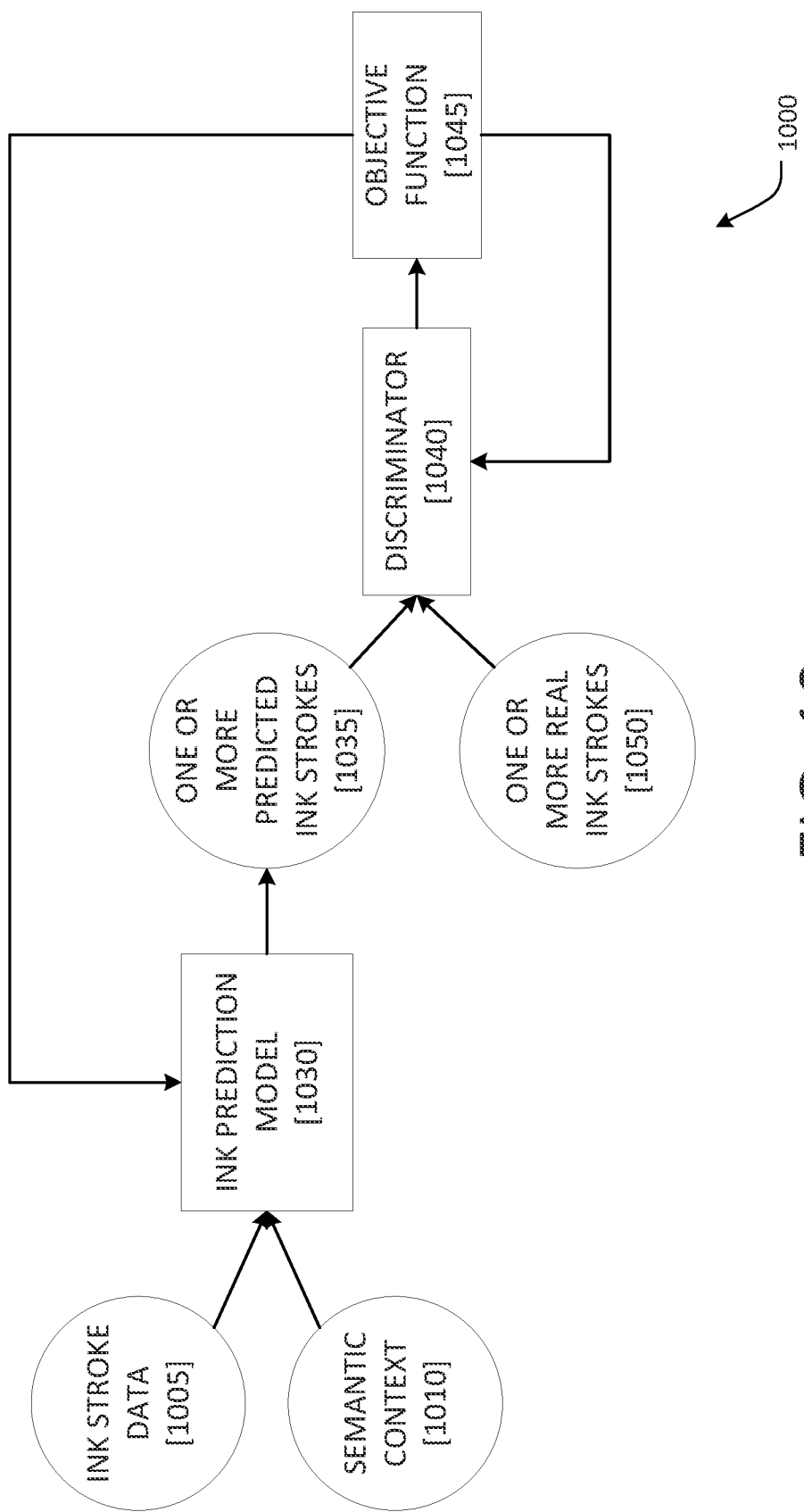
FIG. 10 illustrates an example flow for training an ink prediction model to generate an indication of predicted ink stroke data based on received ink stroke data and a semantic context.

FIG. 10 illustrates an example flow 1000 for training an ink prediction model (e.g., the ink prediction model 800) to generate an indication of predicted ink stroke data 1035, based on received ink stroke data 1005 and a semantic context 1010. The ink stroke data 1005 may be similar to the ink stroke data 110 discussed earlier herein. Further, the semantic context 910 may be similar to the semantic context 750 discussed earlier herein.

In some embodiments, the ink prediction model 1030 can include one or more neural networks, such as a U-Net convolutional neural network. In some embodiments, the ink prediction model 1030 can include a pix2pix model. In some embodiments, the ink prediction model 1030 can be a generative adversarial network (GAN). In some embodiments, the generator can include a neural network that can receive the ink stroke data 1005 and the semantic context 1010 and output one or more predicted ink strokes (e.g., the one or more predicted ink strokes 1035). For example, the ink prediction model 1030 may output a plurality of predicted ink strokes, wherein the predicted ink strokes are ranked or sorted by which predicted ink strokes most probably match that which would be inked by a user (e.g., if a user writes "he" and intends to write "hello", then "hello" may be ranked relatively higher on a list of predicted ink strokes, than, for example, "helicopter"). Alternatively, the ink prediction model 1030 may output only the highest ranked (e.g., most probable) predicted ink stroke (e.g., if a user writes "he" and ink stroke data corresponding to "hello" is the most highest ranked output, then the ink stroke data corresponding to "hello" will be output).

In some examples, the ink prediction model 1030 can include a plurality of neural networks that are each trained to output a specific aspect of a predicted ink stroke. For example, a first neural network may output a predicted ink stroke that takes into account writing pressure (e.g., as discussed earlier herein with respect to writing pressure model 202), and/or hand tilt (e.g., as discussed earlier herein with respect to hand tilt model 204), and/or penmanship cleanliness (e.g., as discussed earlier herein with respect to penmanship cleanliness model 206), and/or letter spacing (e.g., as discussed earlier herein with respect to letter spacing model 208), and/or sentence spacing (e.g., as discussed earlier herein with respect to sentence spacing model 210), and/or paragraph spacing (e.g., as discussed earlier herein with respect to paragraph spacing model 212), and/or stroke physics (e.g., as discussed earlier herein with respect to stroke physics model 214), and/or writing orientation model (e.g., as discussed earlier herein with respect to writing orientation model 216). The flow 1000 can include combining one or more of the outputs from the plurality of neural networks into a single indication of one or more predicted ink strokes.

The ink prediction model 1030, which predicts ink stroke data that is based on received ink stroke data and semantic context, can be trained based on one or more real ink strokes 1050. For example, the one or more real ink strokes 1050 may be one or more real ink strokes that are compiled in a training set of data, and that correspond to the ink stroke data 1005 and semantic context 1010, which are received by the ink prediction model 1030. The one or more real ink strokes may be letters, sentences, or phrases inked by a user, which correspond to the one or more predicted ink strokes 1035 that the ink prediction model 1030 generates. Generally, the ink prediction model 1030, which is based on ink-semantics, may be trained based on one or more ink real ink strokes that are compiled, and/or stored, for example, in a training set of data.

The flow 1000 can include providing the one or more predicted ink strokes 1035, and the corresponding one or more real ink strokes 1050 to a discriminator 1040 that can predict whether or not the one or more predicted ink strokes 1035 are real (e.g., accurate, with respect one or more real ink strokes 1050), or generated by the ink prediction model 1030. In some embodiments, the ink prediction model 1030 can output a matrix or pixel compilation of predicted ink stroke data points (such as discussed earlier herein with respect to FIGS. 3A-3C), and the location of the ink stroke data points can be compared to the one or more real ink strokes 1050.

In some embodiments, the discriminator 1040 can receive the one or more predicted ink strokes 1035 and output a label ranging from 0 to 1, with 0 indicating that the one or more predicted ink strokes are generated by the ink prediction model 1030, and 1 indicating that the one or more predicted ink strokes are real (e.g., relatively accurate in comparison to the one or more real ink strokes 1050). In some embodiments, the discriminator 1040 can be a PatchGAN discriminator.

The flow 1000 can include an objective function value calculation 1045. The objective function value calculation 1045 can include calculating an objective function value based on labels output by the discriminator 1040 and/or by other metrics calculated based on the inks stroke data 1005, the semantic context 1010, the one or more predicted ink strokes 1035, and the one or more real ink strokes 1050. The objective function value can capture multiple loss functions (e.g., a weighted sum of multiple loss functions). In this way, the objective function value can act as a total loss value for the ink prediction model 1030 and the discriminator 1040.

A number of different suitable objective functions can be used to calculate the objective function value. For example, a distance can be calculated between each data point or pixel of the one or more predicted ink strokes 1035, as compared to the one or more real ink strokes 1050. Each of the distances can be summed together, averaged (e.g., standard average, mean squared average, weighted average, etc.), or otherwise arithmetically evaluated to determine a value indicative of error between the one or more predicted ink strokes 1035, as compared to the one or more real ink strokes 1050. The ink prediction model 1030 and/or the discriminator 1040 may be updated based on the objective function 1045, such that an accuracy of the one or more predicted ink strokes 1035 improves relative to the one or more real ink strokes 1050.

The flow 1000 can include receiving a plurality of sets of ink stroke data 1005 and corresponding semantic context 1010 to iteratively train the ink prediction model 1030, using the one or more real ink strokes 1050.

Figure 11:
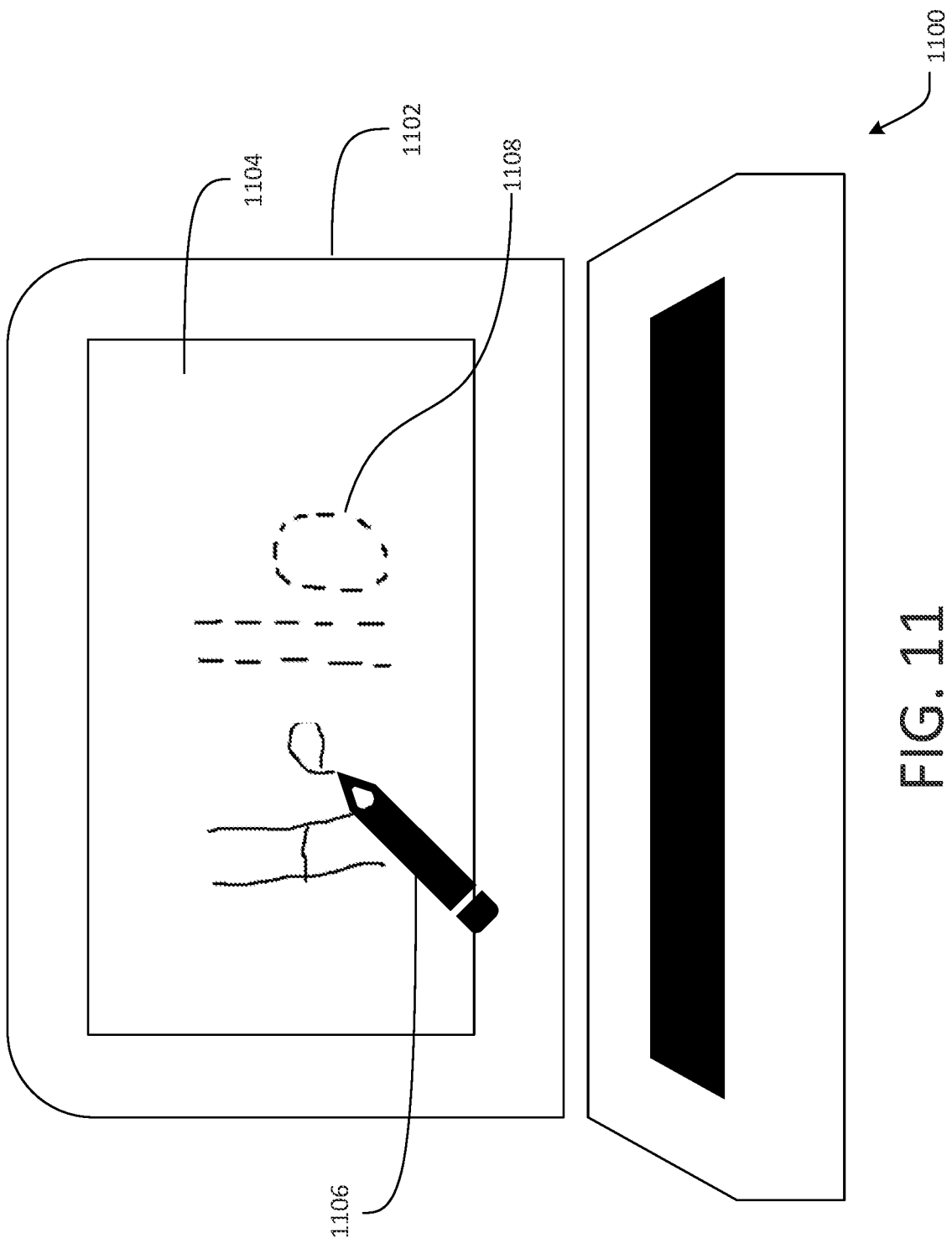
FIG. 11 illustrates an example system for generating an indication of predicted ink strokes, according to aspects described herein.

FIG. 11 illustrates an example system 1100 for generating an indication of predicted ink strokes, according to aspects described herein. The example system 1100 includes a computing device 1102 with a display or display screen 1104, and a writing utensil 1106. The computing device 1102 may be similar to the computing devices 102 discussed earlier herein with respect to FIG. 1. Further, the writing utensil 1106 may be similar to the writing utensil 320 discussed earlier herein with respect to FIGS. 3A-3C.

Ink stroke data may be received by the system 1100. For example, a user may ink strokes onto the display screen 1104 of the computing device 1102, via the writing utensil 1106. A user may place the writing utensil 1106 in contact with the display screen 1104, and perform natural writing motions to generate ink stroke data. Alternatively, the user may perform natural writing motions to generate ink stroke data, while the written utensil 1106 is not in contact with the display screen. Those of ordinary skill in the art will recognize that ink stroke data can be generated on the computing device without using a writing utensil 1106. For example, a user may directly contact the display screen 1104. Alternatively, the user may perform a natural writing motion in proximity to the computing device 1102 that is captured by the computing device 1102 to generate ink stroke data. Alternatively, the ink stroke data may be otherwise provided to the computing device 1102, as described earlier herein with respect to the ink stroke data 110, and/or as may be recognized by those of ordinary skill in the art.

Subsequent to ink stroke data being received by the system 1100, mechanisms described herein may generate an indication 1108 of predicted ink strokes, based on the ink stroke data provided to the system 1100. The generation of the indication 1108 may be performed by the text-based semantic flow, discussed with respect to FIGS. 4-7. Additionally, or alternatively, the generation of the indication 1108 may be performed by the ink-based semantic flow, discussed with respect to FIGS. 8-10. The computing device 1102 may be adapted to display the indication 1108 of the predicted ink strokes, on the display screen 1104 (e.g., as faded ink strokes, as text that is converted into ink, upon selection thereof, as dashed ink strokes, as patterned ink strokes, as colored ink strokes, etc.).

A user may select the indication 1108 of the predicted ink strokes. For example, a user may provide a user-input to the system 1100 to indicate a selection of the predicted ink strokes. The user-input may be, for example, a keyboard input, a mouse input, a touchpad input, a gesture input (e.g., with an object, such as a writing utensil, or with one's hand), a gaze input, button-input, or any other input that may be recognized by those of ordinary skill in the art to indicate a selection of the predicted ink strokes. Once the indication 1108 of the predicted ink strokes is selected, mechanisms disclosed herein may match a format of the predicted ink strokes to that of the already-received ink strokes (e.g., faded ink strokes may be unfaded, text indications may be converted to ink, dashed ink strokes may become solid-lined ink strokes, patterned ink strokes may be un-patterned, colored ink strokes may match a color of the received ink strokes, etc.).

Similarly, a user may provide a user-input to the system 1100 to indicate that they are not selecting (e.g., ignoring, or dismissing) the predicted ink strokes. The user-input may be, for example, a keyboard input, a mouse input, a touchpad input, a gesture input (e.g., with an object, such as a writing utensil, or with one's hand), a gaze input, button-input, or any other input that may be recognized by those of ordinary skill in the art to indicate that a user is not selecting the predicted ink strokes. Upon receiving a user-input indicative of a user not selecting the predicted ink strokes, the indication 1108 of the predicted ink strokes may be removed from the display 1104. Alternatively, in some examples, upon receiving a user-input indicative of a user not selecting the predicted ink strokes, the indication 1108 of the predicted ink strokes may be replaced (e.g., on the display screen 1104) with a new indication of predicted ink strokes, that is different from the indication 1108 of the predicted ink strokes that was not selected.

In some examples, the indication 1108 of the predicted ink strokes may be updated as ink stroke data is received by the system 1100. Therefore, the system 1100 may be a constant feedback loop of receiving ink stroke data, and generating indications of predicted ink stroke data that may be selected, ignored, or dismissed by a user, to aid a user in efficiently inking (e.g., writing using natural writing motions) on a computing device.

Figure 12:
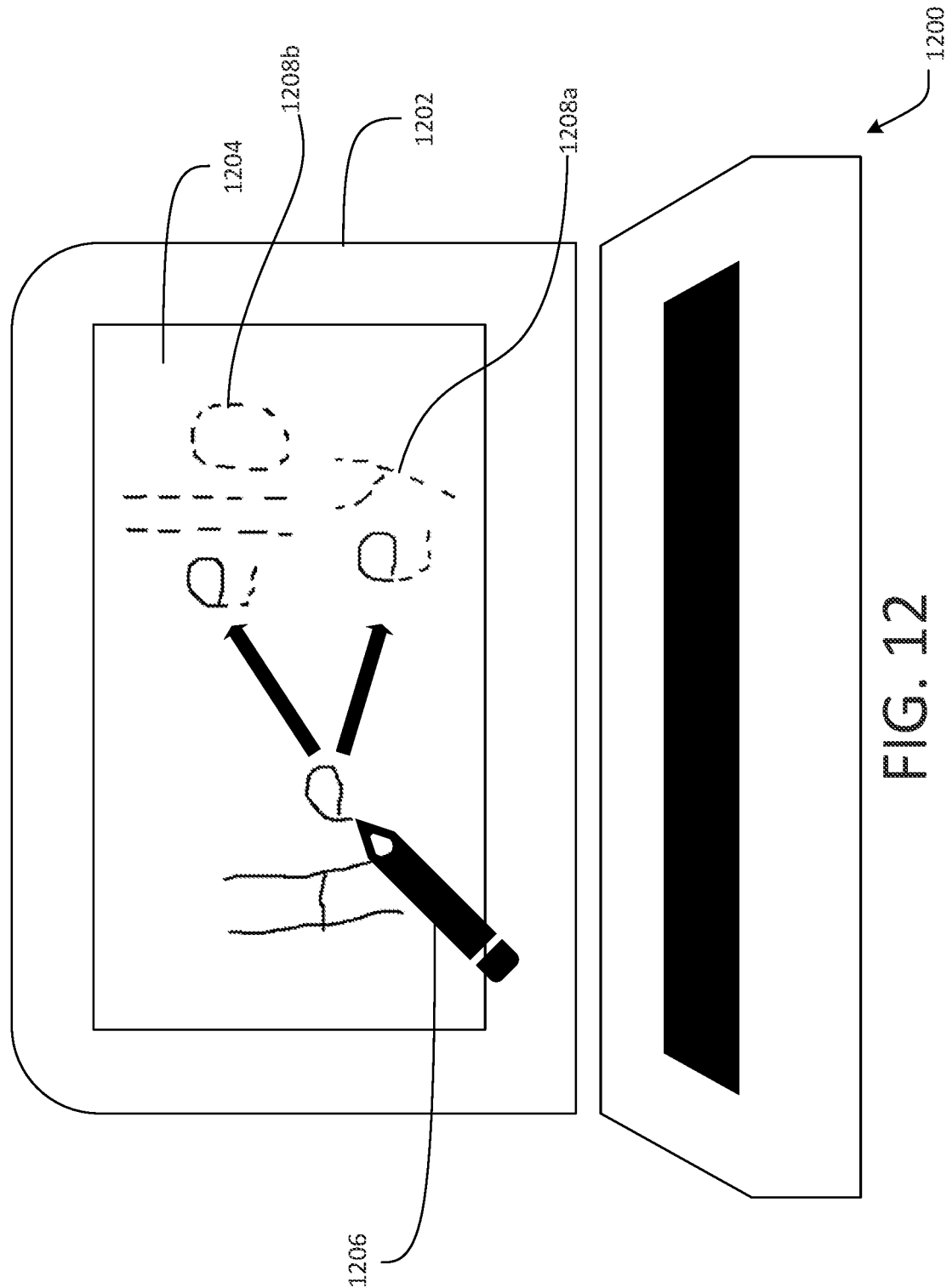
FIG. 12 illustrates an example system for generating a plurality of indications of predicted ink strokes, according to aspects described herein.

FIG. 12 illustrates an example system 1200 for generating a plurality of indications of predicted ink strokes, according to aspects described herein. The example system 1200 includes a computing device 1202 with a display or display screen 1204, and a writing utensil 1206. The computing device 1202 may be similar to the computing devices 102 discussed earlier herein with respect to FIG. 1. Further, the writing utensil 1206 may be similar to the writing utensil 320 discussed earlier herein with respect to FIGS. 3A-3C.

Ink stroke data may be received by the system 1200. For example, a user may ink strokes onto the display screen 1204 of the computing device 1202, via the writing utensil 1206. A user may place the writing utensil 1206 in contact with the display screen 1204, and perform natural writing motions to generate ink stroke data. Alternatively, the user may perform natural writing motions to generate ink stroke data, while the written utensil 1206 is not in contact with the display screen. Those of ordinary skill in the art will recognize that ink stroke data can be generated on the computing device without using a writing utensil 1206. For example, a user may directly contact the display screen 1204. Alternatively, the user may perform a natural writing motion in proximity to the computing device 1202 that is captured by the computing device 1202 to generate ink stroke data. Alternatively, the ink stroke data may be otherwise provided to the computing device 1202, as described earlier herein with respect to the ink stroke data 110, and/or as may be recognized by those of ordinary skill in the art.

Subsequent to ink stroke data being received by the system 1200, mechanisms described herein may generate a plurality of indications 1208 of predicted ink strokes, such as a first indication 1208a and a second indication 1208b, based on the ink stroke data provided to the system 1200. The generation of the indications 1208 (e.g., first indication 1208a, and second indication 1208b) may be performed by the text-based semantic flow, discussed with respect to FIGS. 4-7. Additionally, or alternatively, the generation of the indications 1208 may be performed by the ink-based semantic flow, discussed with respect to FIGS. 8-10. The computing device 1202 may be adapted to display the indication 1208 of the predicted ink strokes, on the display screen 1204 (e.g., as faded ink strokes, as text that is converted into ink, upon selection thereof, as dashed ink strokes, as patterned ink strokes, as colored ink strokes, etc.).

A user may select one of the plurality of indications 1208 of the predicted ink strokes. For example, a user may provide a user-input to the system 1200 to indicate a selection of the predicted ink strokes corresponding to the first indication 1208a. Additionally, or alternatively, a user may provide a user-input to the system 1200 to indicate a selection of the predicted ink strokes corresponding to the second indication 1208b. The user-input may be, for example, a keyboard input, a mouse input, a touchpad input, a gesture input (e.g., with an object, such as a writing utensil, or with one's hand), a gaze input, button-input, or any other input that may be recognized by those of ordinary skill in the art to indicate a selection of the predicted ink strokes. Once one of the plurality of indications 1208 of the predicted ink strokes is selected, mechanisms disclosed herein may match a format of the selected predicted ink strokes to that of the already-received ink strokes (e.g., faded ink strokes may be unfaded, text indications may be converted to ink, dashed ink strokes may become solid-lined ink strokes, patterned ink strokes may be un-patterned, colored ink strokes may match a color of the received ink strokes, etc.).

Similarly, a user may provide a user-input to the system 1200 to indicate that they are not selecting (e.g., ignoring, or dismissing) one or more of the plurality of predicted ink strokes corresponding to the indications 1208. The user-input may be, for example, a keyboard input, a mouse input, a touchpad input, a gesture input (e.g., with an object, such as a writing utensil, or with one's hand), a gaze input, button-input, or any other input that may be recognized by those of ordinary skill in the art to indicate that a user is not selecting the predicted ink strokes. Upon receiving a user-input indicative of a user not selecting one or more of the predicted ink strokes, the corresponding indication from the plurality of indications 1208 of the predicted ink strokes may be removed from the display 1204. Alternatively, in some examples, upon receiving a user-input indicative of a user not selecting one or more of the predicted ink strokes, the corresponding indications from the plurality of indications 1208 of the predicted ink strokes may be replaced (e.g., on the display screen 1204) with one or more new indications of predicted ink strokes, that is different from the one or more indications 1108 of the predicted ink strokes that was not selected.

In some examples, the plurality of indications 1208 of predicted ink strokes are the highest ranked predicted ink strokes, from a plurality of predicted ink strokes, as discussed earlier herein with respect to FIGS. 9 and 10. Predicted ink strokes may be ranked or sorted by which predicted ink strokes most probably match that which would be inked by a user (e.g., if a user writes "he" and intends to write "hello", then "hello" may be ranked relatively higher on a list of predicted ink strokes, than, for example, "helicopter").

In some examples, the plurality of indications 1208 of the predicted ink strokes may be updated as ink stroke data is received by the system 1200. Therefore, the system 1200 may be a constant feedback loop of receiving ink stroke data, and generating a plurality of indications of predicted ink stroke data that may be selected, ignored, or dismissed by a user, to aid a user in efficiently inking (e.g., writing using natural writing motions) on a computing device. In some examples, models that are trained to generate the plurality of indications may be updated, based on selections of one or more of the plurality of indications 1208 that are made by a user. In this respect, a user's selection of one or more of the plurality of indications 1208, such as the first indication 1208*a*, or the second indication 1208*b*, may provide reinforcement learning to a trained model (e.g., a text-based semantic model, and/or an ink-based semantic model, described earlier herein).

Figure 13:
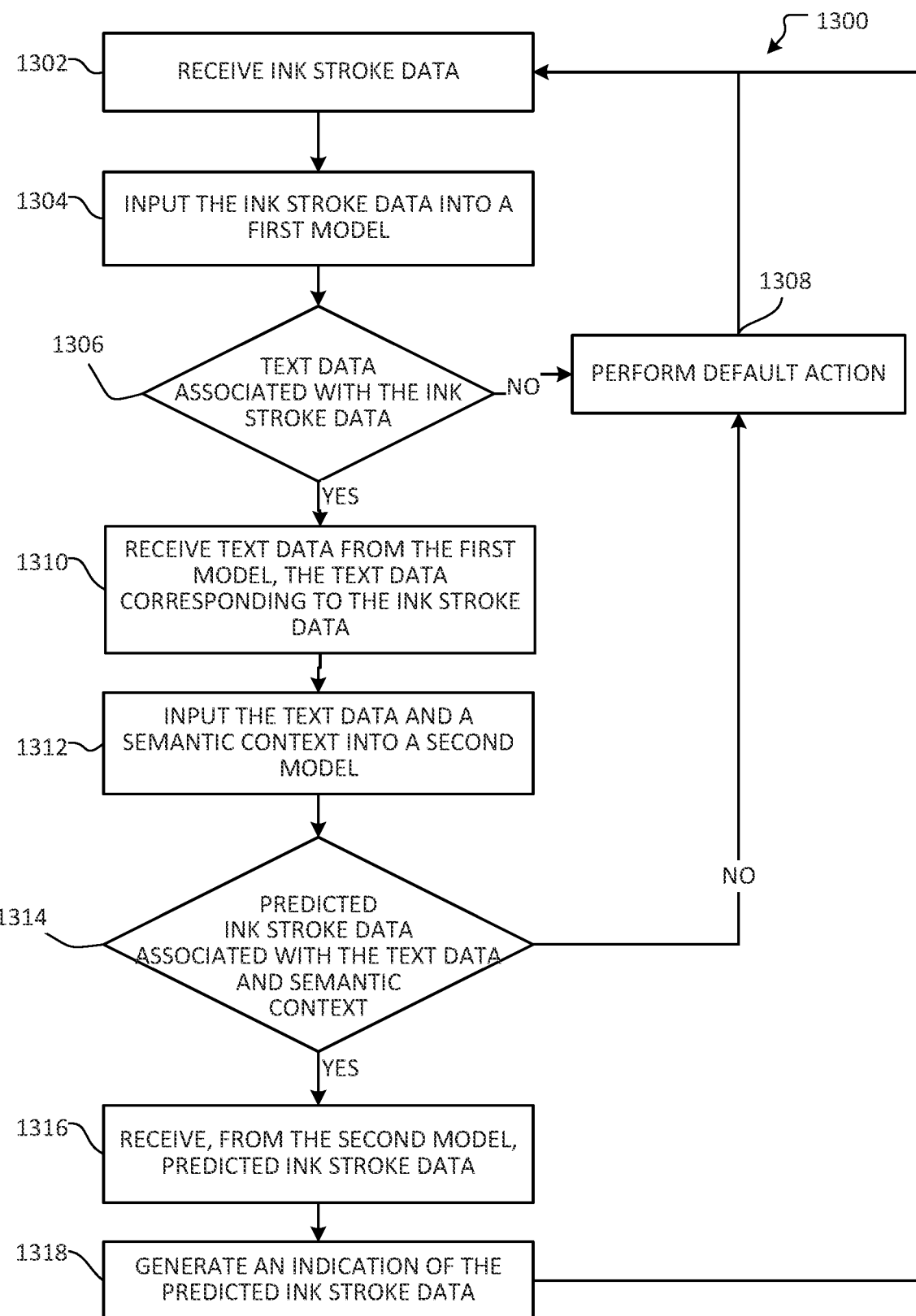
FIG. 13 illustrates an overview of an example method for generating indications of predicted ink strokes, according to aspects described herein.

FIG. 13 illustrates an overview of an example method 1300 for generating indications of predicted ink strokes. In accordance with some examples, aspects of method 1300 are performed by a device, such as computing device 102, server, 104, and/or peripheral device 120 discussed above with respect to FIG. 1.

Method 1300 begins at operation 1302, where ink stroke data (e.g., ink stroke data 110) is received. The ink stroke data may be received from, and/or at, one or more computing devices (e.g., computing device 102). Additionally, or alternatively, the ink stroke data may be received from an ink stroke data source (e.g., ink stroke data source 106), which may be, for example a stylus with which a user is writing, a trackpad on which a user is writing, a computer-executed program that generates ink strokes, etc. The ink stroke data may correspond to a plurality of ink stroke data points, as discussed earlier herein with respect to FIGS. 3A-3C. Furthermore, the ink stroke data can include information correspond to one or more from the group of: writing pressure, hand tilt, penmanship cleanliness, letter spacing, sentence spacing, paragraph, spacing, stroke physics, and writing orientation. The ink stroke data can include a full stroke input that corresponds to one or more alphanumeric characters and/or one or more symbols (e.g., '&', '+', '?', etc.). The ink stroke data can include further information that may be apparent to those of ordinary skill in the art, which may be related to ink strokes drawn by a user.

Still referring to operation 1302, the ink stroke data can be stored (e.g., in memory of the computing device 102). In some examples, only the most recent ink stroke data is stored, such that as ink stroke data is received, older ink stroke data is overwritten (e.g., in memory) by new ink stroke data. Alternatively, in some examples, ink stroke data is stored for a specified duration of time (e.g., the last hour, the last day, the last week, the last month, the last year, or since ink stroke data first began being received). Generally, such an implementation allows for a history of ink stroke data from one or more users to be reviewed for further analysis (e.g., to infer or predict ink strokes in the future).

At operation 1304, the ink stroke data from operation 1302 is input into a first model, such as a first trained model. The ink stroke data may be automatically input into the first trained model, as the ink stroke data is received. The first trained model may be an ink-to-text model, such as the ink-to-text model 400, discussed earlier herein, with respect to FIG. 4. The first trained model may be trained based on a data set. The data set on which the first trained model is trained may include a plurality of pairings of ink stroke data (e.g., inked letters, words, sentences, etc.) and corresponding text data (e.g., letters, words, sentences, etc. that are generated by a text-editor). In some examples, the ink stroke data from operation 1302 may include cursive ink, and the data set may include a plurality of pairings of cursive ink stroke data and corresponding text data, such that the first trained model is trained to convert ink stroke data that is cursive to corresponding text data. Generally, the first trained model can convert ink stroke data to text data, such that further processing can be performed on the text data.

At determination 1306, it is determined whether text data is associated with the ink stroke data from operation 1302. For example, determination 1306 may comprise evaluating the received ink stroke data, based on the first trained model, to determine if there exists an output from the first trained model that corresponds to the ink stroke data. Accordingly, the determination may identify text data as a result of an association between the ink stroke data and training of the first trained model (e.g., based on a data set).

If it is determined that there is not a text data associated with the received ink stroke data, flow branches "NO" to operation 1308, where a default action is performed. For example, the ink stroke data may have an associated pre-configured action. In some other examples, the method 1300 may comprise determining whether the ink stroke data has an associated default action, such that, in some instances, no action may be performed as a result of the received ink stroke data. Method 1300 may terminate at operation 1308. Alternatively, method 1300 may return to operation 1302, from operation 1308, to create a continuous feedback loop of receiving ink stroke data and determining whether there exists text data associated with the received ink stroke data.

If however, it is determined that there is text data associated with the received ink stroke data, flow instead branches "YES" to operation 1310, where text data is received from the first trained model that corresponds to the received ink stroke data. For example, if the ink stroke data corresponds to the word "HELLO", then text data corresponding to the word "HELLO" may be output from the first trained model. Further processing may be performed on the received text data, as outlined further herein below.

Flow advances to operation 1312, where the text data from operation 1310 and a semantic context are input into a second model, such as a second trained model. The semantic context may correspond to the text data to provide an indication of meaning attributed to words, partial-words, or phrases due to content, form, style, or origin of the words, partial-words, or phrases, rather than, or in addition to, the customary linguistic definition of the words, partial-words, or phrases. For example, the second trained model may include a natural language processor that is trained based on semantic context of a text data set (e.g., text from the Internet, text from a data set compiled by one or more users, text from a history of predicting ink strokes using mechanisms described herein, etc.) to predict completion of words, partial-words, phrases, sentences, etc.

The second trained model may include a text prediction model (e.g., the text prediction model 500 discussed earlier herein). The second trained model (e.g., the text prediction model) may be trained based on a data set. For example, the data set may be the Internet, and the second trained model may be trained to predict text based on learning that was performed on as much as all of the text on the Internet. Additionally, or alternatively, the data set may be a data set of text data that is paired with predicted text data, as may be compiled, for example, by one or more users. In some examples, the second trained model receives a semantic context that impacts the predicted text data that is output from the second trained model. Generally, the text prediction model can predict text data (e.g., words, phrases, sentences, etc.) based on received text data that forms a part of the predicted text data.

The second trained model may further include a text-to-ink model (e.g., the text-to-ink model 600 discussed earlier herein). The text-to-ink model may receive text data from the text prediction model. The text-to-ink model may determine predicted ink stroke data that corresponds to the text data. For example, the text-to-ink model may be trained based on a data set. The data set may include a plurality of pairings of ink stroke data (e.g., inked letters, words, sentences, etc.) and corresponding text data (e.g., letters, words, sentences, etc. that are generated by a text-editor). Generally, the text-to-ink model can convert text data to predicted ink stroke data, such that a user can receive an indication of predicted ink strokes.

At determination 1314, it is determined whether predicted ink stroke data is associated with the text data and semantic context from operation 1312. For example, determination 1314 may comprise evaluating the text data and the semantic context, based on the second trained model, to determine if there exists an output from the second trained model that corresponds to the text data and the semantic context. Accordingly, the determination may identify predicted ink stroke data as a result of an association between the text data, the semantic context, and training of the second trained model (e.g., based on a data set).

If it is determined that there is not predicted ink stroke data associated with the text data and semantic context that is input into the second trained model, flow branches "NO" to operation 1308, where a default action is performed. For example, the text data and semantic context may have an associated pre-configured action. In some other examples, the method 1300 may comprise determining whether the text data and/or semantic context have an associated default action, such that, in some instances, no action may be performed as a result of the received text data and semantic context. Method 1300 may terminate at operation 1308. Alternatively, method 1300 may return to operation 1302, from operation 1308, to create a continuous feedback loop of receiving ink stroke data and determining whether there exists predicted ink stroke data associated with a determined text data and semantic context.

If however, it is determined that there is predicted ink stroke data associated with the text data and semantic context, flow instead branches "YES" to operation 1316, where predicted ink stroke data is received from the second trained model that corresponds to the text data and semantic context. The predicted ink stroke data that is received from the second trained model may be generated and/or determined based on a data set on which the second trained model is trained. Additionally, or alternatively, the predicted ink stroke data may be generated based on a plurality of factors, such as those discussed earlier herein, with respect to the ink stroke generation engine 116 of FIGS. 1 and 2. For example, the second trained model may include one or more components of the ink stroke generation engine 116 to generate predicted ink stroke data (e.g., writing pressure model 202, hand tilt model 204, penmanship cleanliness model 206, letter spacing model 208, sentence spacing model 210, paragraph spacing model 212, stroke physics model 214, and/or writing orientation model 216).

Flow advances to operation 1318, where an indication of the predicted ink stroke data is generated. The indication may be a visual indication that is provided on a display screen of a computing device (see e.g., FIGS. 13 and 14). Additionally, or alternatively, the indication may be an audio indication corresponding to letters, words, phrases, and/or sentences that correspond to the predicted ink stroke data. Further, in some examples, a plurality of indications of predicted ink stroke data may be generated. Each of the plurality of indications of predicted ink stroke data may correspond to a different predicted ink stroke, from the plurality Method 1300 may terminate at operation 1312. Alternatively, method 1300 may return to operation 1302, from operation 1312, to provide a continuous feedback loop of receiving ink stroke data and generating an indication of one or more predicted ink strokes. Generally, methods disclosed herein allow a user to write relatively more efficiently while using inking applications.

Figure 14:
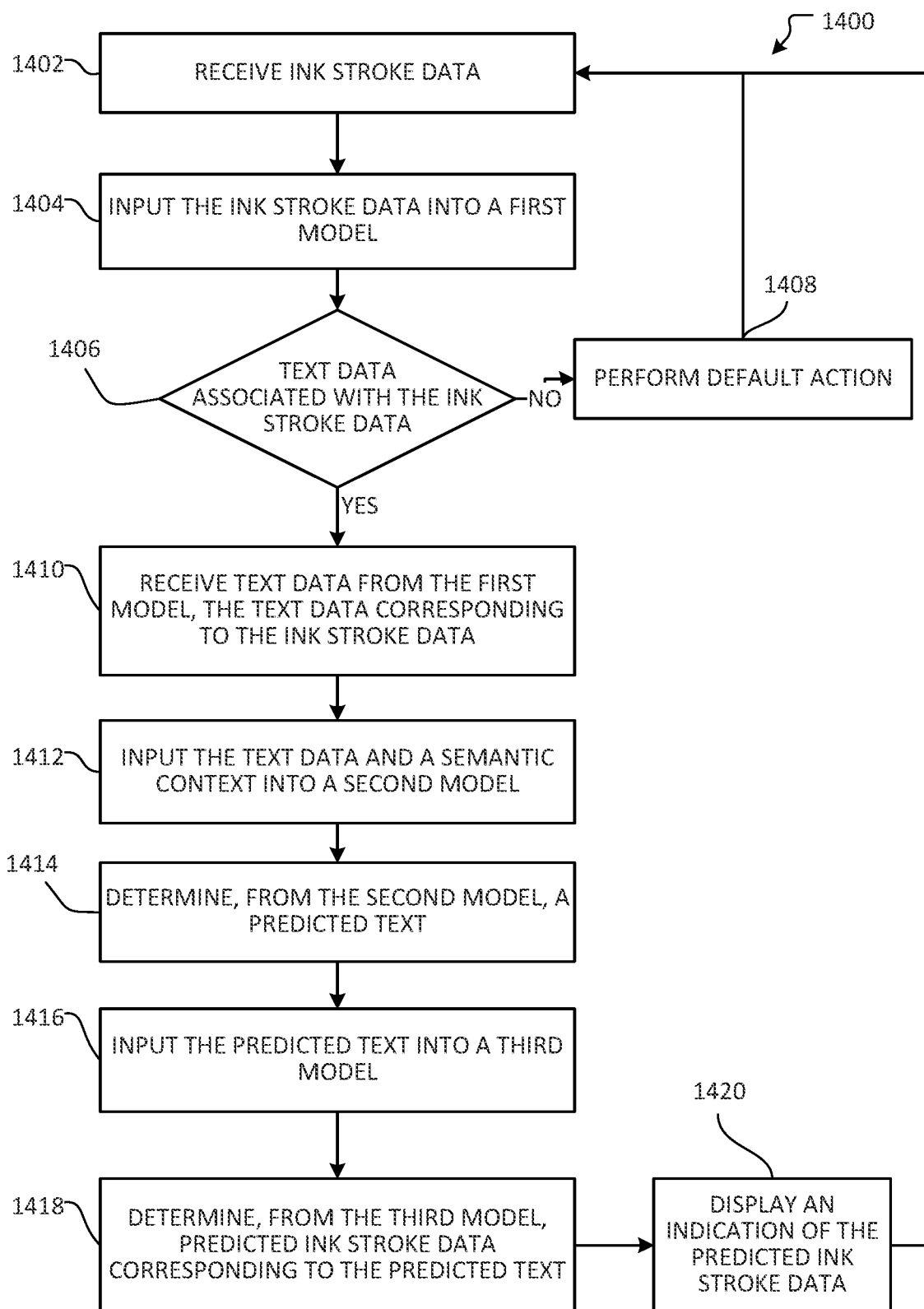
FIG. 14 illustrates an overview of an example method for generating indications of predicted ink strokes, according to aspects described herein.

FIG. 14 illustrates an overview of an example method 1400 for generating indications of predicted ink strokes. In accordance with some examples, aspects of method 1400 are performed by a device, such as computing device 102, server, 104, and/or peripheral device 120 discussed above with respect to FIG. 1.

Method 1400 begins at operation 1402, where ink stroke data (e.g., ink stroke data 110) is received. The ink stroke data may be received from, and/or at, one or more computing devices (e.g., computing device 102). Additionally, or alternatively, the ink stroke data may be received from an ink stroke data source (e.g., ink stroke data source 106), which may be, for example a stylus with which a user is writing, a trackpad on which a user is writing, a computer-executed program that generates ink strokes, etc. The ink stroke data may correspond to a plurality of ink stroke data points, as discussed earlier herein with respect to FIGS. 3A-3C. Furthermore, the ink stroke data can include information correspond to one or more from the group of: writing pressure, hand tilt, penmanship cleanliness, letter spacing, sentence spacing, paragraph, spacing, stroke physics, and writing orientation. The ink stroke data can include a full stroke input that corresponds to one or more alphanumeric characters and/or one or more symbols (e.g., '&', '+', '?', etc.). The ink stroke data can include further information that may be apparent to those of ordinary skill in the art, which may be related to ink strokes drawn by a user.

Still referring to operation 1402, the ink stroke data can be stored (e.g., in memory of the computing device 102). In some examples, only the most recent ink stroke data is stored, such that as ink stroke data is received, older ink stroke data is overwritten (e.g., in memory) by new ink stroke data. Alternatively, in some examples, ink stroke data is stored for a specified duration of time (e.g., the last hour, the last day, the last week, the last month, the last year, or since ink stroke data first began being received). Generally, such an implementation allows for a history of ink stroke data from one or more users to be reviewed for further analysis (e.g., to infer or predict ink strokes in the future).

At operation 1404, the ink stroke data from operation 1402 is input into a first model, such as a first trained model and/or first trained machine-learning model. The ink stroke data may be automatically input into the first trained model, as the ink stroke data is received. The first trained machine-learning model may be an ink-to-text model, such as the ink-to-text model 400, discussed earlier herein, with respect to FIG. 4. The first trained model may be trained based on a data set. The data set on which the first trained model is trained may include a plurality of pairings of ink stroke data (e.g., inked letters, words, sentences, etc.) and corresponding text data (e.g., letters, words, sentences, etc. that are generated by a text-editor). In some examples, the ink stroke data from operation 1402 may include cursive ink, and the data set may include a plurality of pairings of cursive ink stroke data and corresponding text data, such that the first trained model is trained to convert ink stroke data that is cursive to corresponding text data. Generally, the first trained model can convert ink stroke data to text data, such that further processing can be performed on the text data.

At determination 1406, it is determined whether text data is associated with the ink stroke data from operation 1402. For example, determination 1406 may comprise evaluating the received ink stroke data, based on the first trained model, to determine if there exists an output from the first trained model that corresponds to the ink stroke data. Accordingly, the determination may identify text data as a result of an association between the ink stroke data and training of the first trained model (e.g., based on training performed with a data set).

If it is determined that there is not text data associated with the received ink stroke data, flow branches "NO" to operation 1408, where a default action is performed. For example, the ink stroke data may have an associated pre-configured action. In some other examples, the method 1400 may comprise determining whether the ink stroke data has an associated default action, such that, in some instances, no action may be performed as a result of the received ink stroke data. Method 1400 may terminate at operation 1408. Alternatively, method 1400 may return to operation 1402, from operation 1408, to create a continuous feedback loop of receiving ink stroke data and determining whether there exists text data associated with the received ink stroke data.

If however, it is determined that there is text data associated with the received ink stroke data, flow instead branches "YES" to operation 1410, where text data is received from the first trained model that corresponds to the received ink stroke data. For example, if the ink stroke data corresponds to the word "HELLO", then text data corresponding to the word "HELLO" may be output from the first trained model. Further processing may be performed on the received text data, as outlined further herein below.

Flow advances to operation 1412, where the text data from operation 1410 and a semantic context are input into a second model. The second model may be a second trained model, such as a second trained machine-learning model. The semantic context may correspond to the text data, from operation 1410, to provide an indication of meaning attributed to words, partial-words, or phrases due to content, form, style, or origin of the words, partial-words, or phrases, rather than, or in addition to, the customary linguistic definition of the words, partial-words, or phrases. For example, the second trained model may include, or be, a natural language processor that is trained based on semantic context of a text data set (e.g., text from the Internet, text from a data set compiled by one or more users, text from a history of determining predicted ink strokes using mechanisms described herein, etc.) to predict completion of words, partial-words, phrases, sentences, etc.

Flow advances to operation 1414, where, from the section trained model of operation 1412, a predicted text is determined. The second trained model may include, or be, a text prediction model (e.g., the text prediction model 500 discussed earlier herein). The second trained model (e.g., the text prediction model) may be trained based on a data set. For example, the data set may be the Internet, and the second trained model may be trained to predict text based on learning that was performed on as much as all of the text on the Internet. Additionally, or alternatively, the data set may be a data set of text data that is paired with predicted text data, as may be compiled, for example, by one or more users. In some examples, the second trained model receives a semantic context that impacts the predicted text data that is output from the second trained model. Generally, the text prediction model can predict text data (e.g., words, phrases, sentences, etc.) based on received text data that forms a part of the predicted text data, as well as semantic context corresponding to the received text data.

Flow advances to operation 1416, where the predicted text is input into a third model. The third model may be a machine-learning model. Additionally, or alternatively, the third model may include, or be, a text-to-ink model (e.g., the text-to-ink model 600 discussed earlier herein). The text-to-ink model may receive predicted text data from the second trained model of operations 1412 and 1414. The text-to-ink model may determine predicted ink stroke data that corresponds to the text data. For example, the text-to-ink model may be trained based on a data set. The data set may include a plurality of pairings of ink stroke data (e.g., inked letters, words, sentences, etc.) and corresponding text data (e.g., letters, words, sentences, etc. that are generated by a text-editor). Generally, the text-to-ink model can convert text data to predicted ink stroke data, such that a user can receive an indication of predicted ink strokes.

At operation 1418 predicted ink stroke data is determined, from the third trained model, that corresponds to the predicted text of operation 1414. The predicted ink stroke data may be generated based on a data set on which the third trained model is trained. Additionally, or alternatively, the predicted ink stroke data may be generated based on a plurality of factors, such as those discussed earlier herein, with respect to the ink stroke generation engine 116 of FIGS. 1 and 2. For example, the third trained model may include one or more components of the ink stroke generation engine 116 to generate predicted ink stroke data (e.g., writing pressure model 202, hand tilt model 204, penmanship cleanliness model 206, letter spacing model 208, sentence spacing model 210, paragraph spacing model 212, stroke physics model 214, and/or writing orientation model 216).

Flow advances to operation 1420, where an indication of the predicted ink stroke data is displayed. In some examples, the displaying of the indication of the predicted ink stroke data may include generating the predicted ink stroke data. The indication of the predicted ink stroke data may be a visual indication that is provided on a display screen of a computing device (see e.g., FIGS. 13 and 14). Additionally, or alternatively, the indication may be an audio indication corresponding to letters, words, phrases, and/or sentences that correspond to the predicted ink stroke data. Further, in some examples, a plurality of indications of predicted ink stroke data may be generated.

Method 1400 may terminate at operation 1412. Alternatively, method 1400 may return to operation 1402, from operation 1412, to provide a continuous feedback loop of receiving ink stroke data and displaying an indication of one or more predicted ink strokes. Generally, methods disclosed herein allow a user to write relatively more efficiently while using inking applications.

Figure 15:
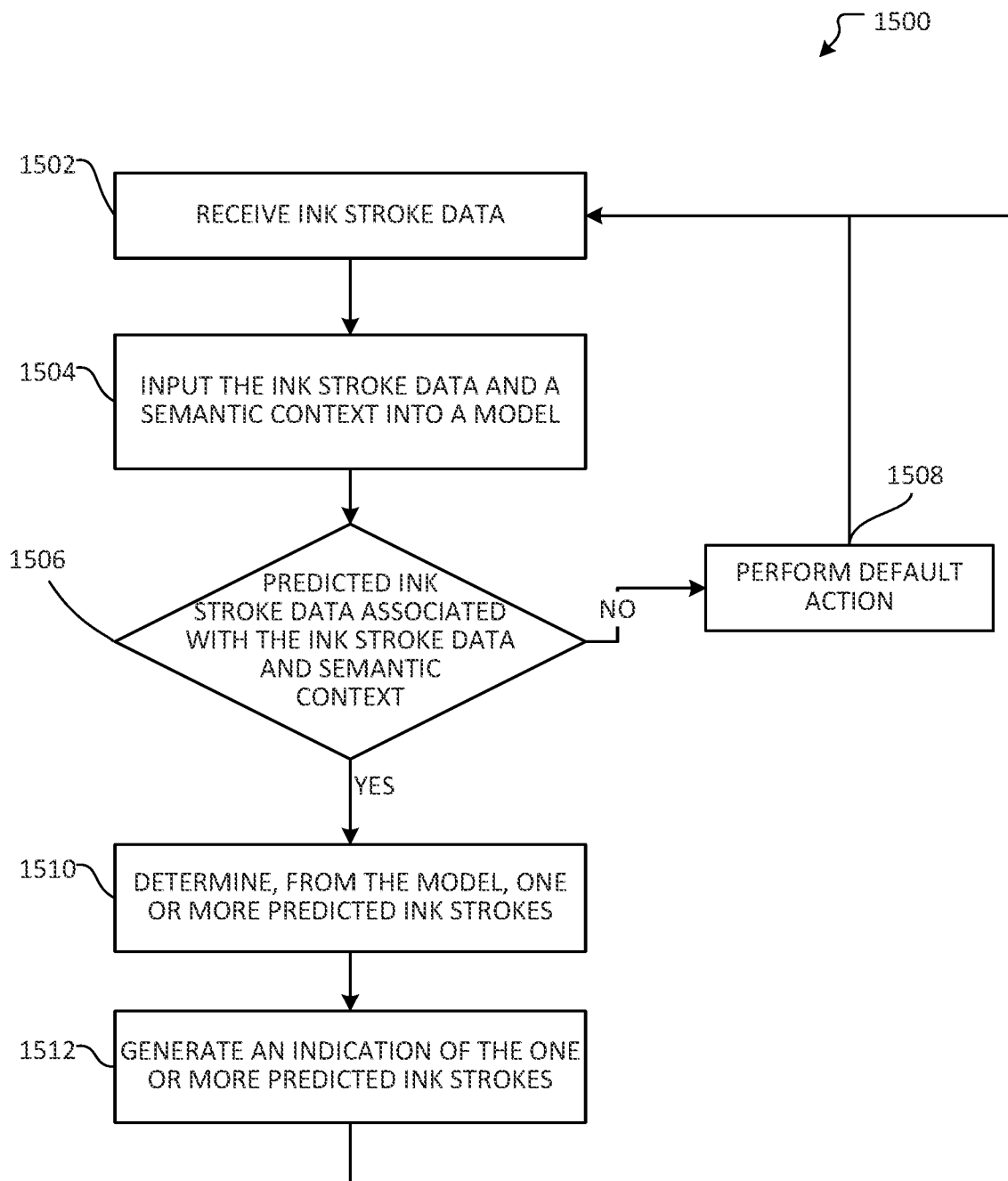
FIG. 15 illustrates an overview of an example method for generating indications of predicted ink strokes.

FIG. 15 illustrates an overview of an example method 1500 for generating indications of predicted ink strokes. In accordance with some examples, aspects of method 1500 are performed by a device, such as computing device 102, server, 104, and/or peripheral device 120 discussed above with respect to FIG. 1.

Method 1500 begins at operation 1502, where ink stroke data (e.g., ink stroke data 110) is received. The ink stroke data may be received from, and/or at, one or more computing devices (e.g., computing device 102). Additionally, or alternatively, the ink stroke data may be received from an ink stroke data source (e.g., ink stroke data source 106), which may be, for example a stylus with which a user is writing, a trackpad on which a user is writing, a computer-executed program that generates ink strokes, etc. The ink stroke data may correspond to a plurality of ink stroke data points, as discussed earlier herein with respect to FIGS. 3A-3C. Furthermore, the ink stroke data can include information correspond to one or more from the group of: writing pressure, hand tilt, penmanship cleanliness, letter spacing, sentence spacing, paragraph, spacing, stroke physics, and writing orientation. The received ink stroke data may include full ink strokes or full strokes that correspond to one or more alphanumeric characters and/or one or more symbols (e.g., '&', '+', '?', etc.). Additionally, or alternatively, the received ink stroke data may include partial strokes that may correspond to no alphanumeric characters, or a plurality of alphanumeric characters, such that an ink-to-text converter may be unable to determine a text value for the partial stroke. The ink stroke data can include further information that may be apparent to those of ordinary skill in the art, which may be related to ink strokes drawn by a user.

Still referring to operation 1502, the ink stroke data can be stored (e.g., in memory of the computing device 102). In some examples, only the most recent ink stroke data is stored, such that as ink stroke data is received, older ink stroke data is overwritten (e.g., in memory) by new ink stroke data. Alternatively, in some examples, ink stroke data is stored for a specified duration of time (e.g., the last hour, the last day, the last week, the last month, the last year, or since ink stroke data first began being received). Generally, such an implementation allows for a history of ink stroke data from one or more users to be reviewed for further analysis (e.g., to infer or predict ink strokes in the future).

At operation 1504, the ink stroke data from operation 1502 and a corresponding semantic context are input into a model, such as a trained model. The ink stroke data and semantic context may be automatically input into the trained model, as the ink stroke data is received. The trained model may be a trained machine-learning model (e.g., a neural network). Further, the trained model may be an ink prediction model, such as the ink prediction model 800, discussed earlier herein with respect to FIG. 8. The trained model may be trained based on a data set. The data set on which the trained model is trained may include a plurality of pairings of ink stroke data and semantic context with one or more real ink strokes, as described earlier herein with respect to flow 1000. Additionally, or alternatively, the trained model may be trained based on a method of generating predicted ink strokes that is text-based, such as methods 1300 and/or 1400. Such an example training process for generating predicted ink strokes that are ink-based, based on generated predicted ink strokes that are text-based, is discussed with respect to flow 900.

At determination 1506, it is determined whether predicted ink stroke data is associated with the ink stroke data and the semantic context. For example, determination 1506 may comprise evaluating the received ink stroke data and the semantic context, based on the trained model, to determine if there exists an output from the trained model that corresponds to the ink stroke data. Accordingly, the determination may predicted ink stroke data as a result of an association between the ink stroke data, the semantic context, and training of the trained model.

If it is determined that there is not predicted ink stroke data associated with the received ink stroke data and semantic context, flow branches "NO" to operation 1508, where a default action is performed. For example, the ink stroke data may have an associated pre-configured action. In some other examples, the method 1500 may comprise determining whether the ink stroke data has an associated default action, such that, in some instances, no action may be performed as a result of the input ink stroke data and semantic context. Method 1500 may terminate at operation 1508. Alternatively, method 1500 may return to operation 1502, from operation 1508, to create a continuous feedback loop of receiving ink stroke data, inputting the ink stroke data and a semantic context into a trained model, and determining whether there exists predicted ink stroke data associated with the input ink stroke data and semantic context.

If however, it is determined that there is predicted ink stroke data associated with the input ink stroke data and semantic context, flow instead branches "YES" to operation 1510, where one or more predicted ink strokes are determined, from the trained model. The one or more predicted ink strokes may comprise a plurality of predicted ink strokes. The one or more predicted ink strokes correspond to the predicted ink stroke data associated with the input ink stroke data and semantic context. For example, if the ink stroke data corresponds to the letters "H" and "e", then text data corresponding to the word "Hello", and/or "Hey", and/or "Helicopter" may be output from the trained model. Further processing may be performed on the determined predicted ink strokes, as described further herein.

Flow advances to operation 1512, where an indication of the one or more predicted ink stroke is generated. In examples where the one or more predicted ink strokes are a plurality of ink strokes, a plurality of indications may be generated that each correspond to a different predicted ink stroke from the plurality of predicted ink strokes. In some examples, the generating of the indication of the one or more predicted ink strokes may include displaying the one or more predicted ink strokes. The indication of the one or more predicted ink strokes may be a visual indication that is provided on a display screen of a computing device (see e.g., FIGS. 13 and 14). Additionally, or alternatively, the indication may be an audio indication corresponding to letters, words, phrases, and/or sentences that correspond to the one or more predicted ink strokes. Further, in some examples, a plurality of indications of predicted ink strokes may be generated.

Method 1500 may terminate at operation 1512. Alternatively, method 1500 may return to operation 1502, from operation 1512, to provide a continuous feedback loop of receiving ink stroke data and generating an indication of one or more predicted ink strokes. Generally, methods disclosed herein allow a user to write relatively more efficiently while using inking applications.

Figure 16:
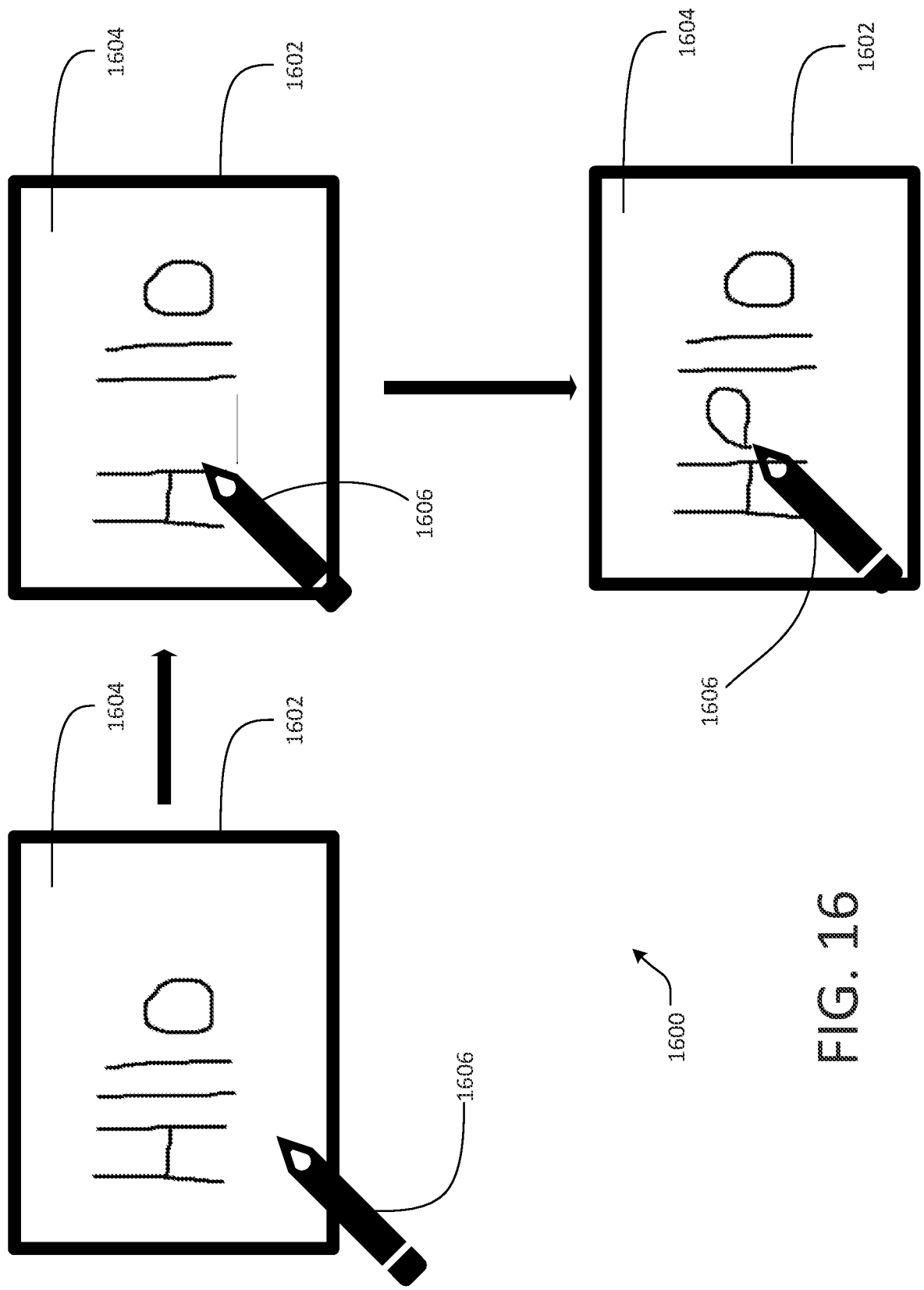
FIG. 16 illustrates an example system for formatting ink, according to aspects described herein.

FIG. 16 illustrates an example system 1600 for formatting ink, according to aspects described herein. The example system 1600 includes a computing device 1602 with a display or display screen 1604, and a writing utensil 1606. The computing device 1602 may be similar to the computing devices 102 discussed earlier herein with respect to FIG. 1. Further, the writing utensil 1606 may be similar to the writing utensil 320 discussed earlier herein with respect to FIGS. 3A-3C.

Ink stroke data may be received by the system 1600. For example, a user may ink strokes onto the display screen 1604 of the computing device 1602, via the writing utensil 1606. A user may place the writing utensil 1606 in contact with the display screen 1604, and perform natural writing motions to generate ink stroke data. Alternatively, the user may perform natural writing motions to generate ink stroke data, while the written utensil 1606 is not in contact with the display screen. Those of ordinary skill in the art will recognize that ink stroke data can be generated on the computing device 1602 without using a writing utensil 1606. For example, a user may directly contact the display screen 1604. Alternatively, the user may perform a natural writing motion in proximity to the computing device 1602 that is captured by the computing device 1602 to generate ink stroke data. Alternatively, the ink stroke data may be otherwise provided to the computing device 1602, as described earlier herein with respect to the ink stroke data 110, and/or as may be recognized by those of ordinary skill in the art.

Subsequent to ink stroke data being received by the system 1600, a user-command may be provided to the system. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art. In the example of FIG. 16, the user-command corresponds to a gesture input with the writing device 1606. For example, a user may hold the writing utensil 1606 (e.g., a tip of the writing utensil 1606) at a location on the display screen 1604 of the computing device 1602, and may be determined that the user desires to ink at the location at which the writing utensil 1606 is located. However, there may not be enough space between letters that have already been inked. Accordingly, mechanisms disclosed herein may determine an action, based on the user-command (e.g., holding the writing utensil 1606 at a location for a longer duration than a specified threshold of time), such as, for example, increasing a spacing between the letters.

In some examples, space between ink strokes (e.g., a first letter and a second letter) may be generated automatically as user is writing, such that they may continue to write, without changing a size of their handwriting, and with enough space to generate new ink strokes. Further, in some examples, ink data (e.g., letters, numbers, symbols, words, sentences, etc.) may be copy and pasted and/or cut and pasted between ink strokes that have already been generated (e.g., a first letter and a second letter). In such examples, it may be necessary to generate enough space between the already generated ink strokes to allow for the pasted ink to fit naturally, as if the pasted text had been written with the already generated ink stroke that the pasted ink is disposed therebetween.

Furthermore, mechanisms disclosed herein may consider a semantic context when determining the action. For example, since "Hllo" is not currently a word in the English language, semantic context may indicate that the user may intend to write the word "Hello". Accordingly, when a user provides a user-command corresponding to the space between a first letter and a second letter (e.g., the "H" and the "l"), mechanisms disclosed herein may determine an action based on the user-command, as well as the semantic context. In some examples, predicted ink strokes may be generated in addition to the performed action, such as, for example, to add letters or words that may be missing for proper spelling and/or grammar.

Figure 17:
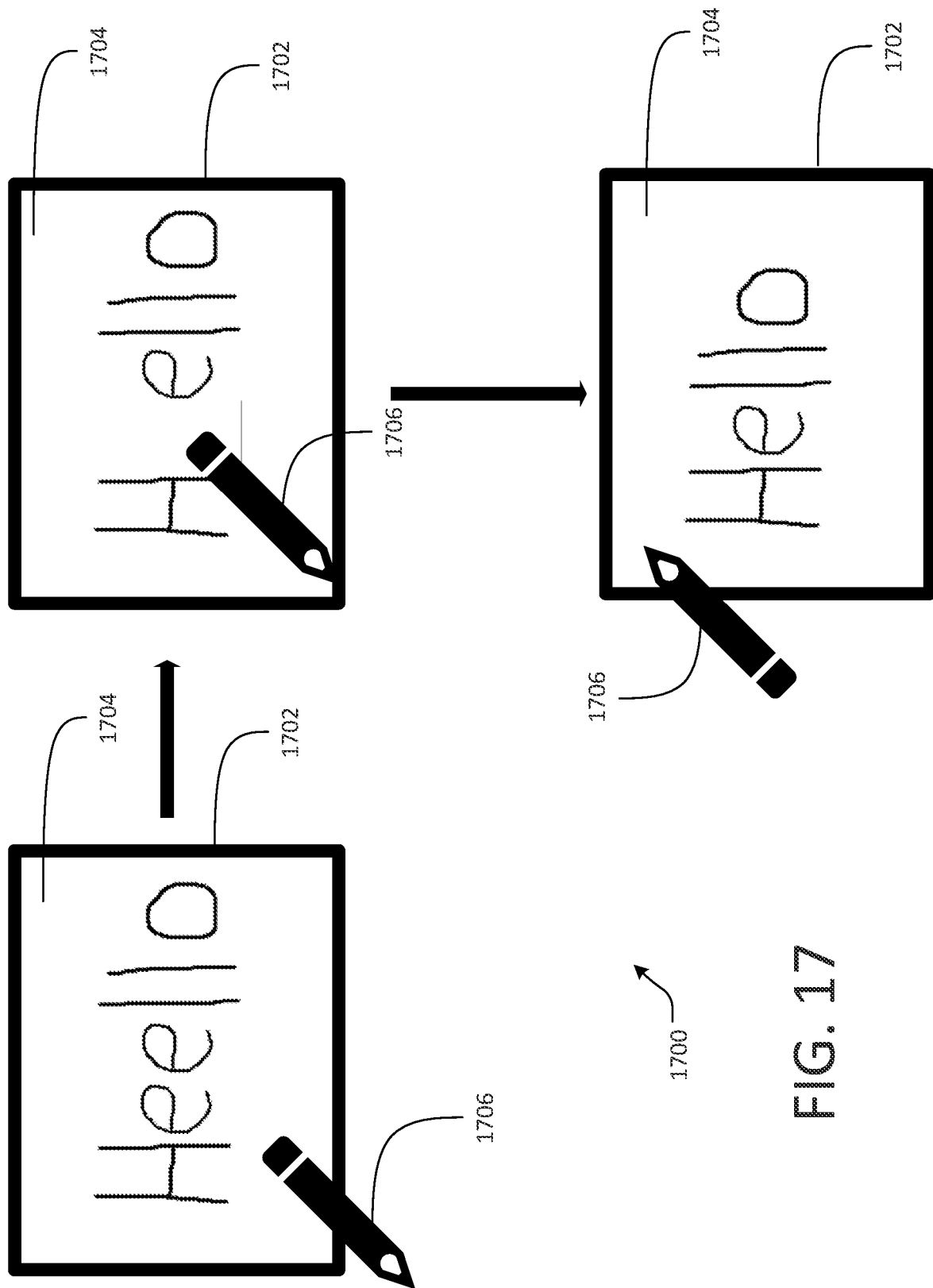
FIG. 17 illustrates an example system for formatting ink, according to aspects described herein.

FIG. 17 illustrates an example system 1700 for formatting ink, according to aspects described herein. The example system 1700 includes a computing device 1702 with a display or display screen 1704, and a writing utensil 1706. The computing device 1702 may be similar to the computing devices 102 discussed earlier herein with respect to FIG. 1. Further, the writing utensil 1706 may be similar to the writing utensil 320 discussed earlier herein with respect to FIGS. 3A-3C.

Ink stroke data may be received by the system 1700. For example, a user may ink strokes onto the display screen 1704 of the computing device 1702, via the writing utensil 1706. A user may place the writing utensil 1706 in contact with the display screen 1704, and perform natural writing motions to generate ink stroke data. Alternatively, the user may perform natural writing motions to generate ink stroke data, while the written utensil 1706 is not in contact with the display screen. Those of ordinary skill in the art will recognize that ink stroke data can be generated on the computing device 1702 without using a writing utensil 1706. For example, a user may directly contact the display screen 1704. Alternatively, the user may perform a natural writing motion in proximity to the computing device 1702 that is captured by the computing device 1702 to generate ink stroke data. Alternatively, the ink stroke data may be otherwise provided to the computing device 1702, as described earlier herein with respect to the ink stroke data 110, and/or as may be recognized by those of ordinary skill in the art.

Subsequent to ink stroke data being received by the system 1700, a user-command may be provided to the system. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art. In the example of FIG. 17, the user-command corresponds to a gesture input with the writing device 1706. For example, a user may hold the writing utensil 1706 (e.g., an eraser-side or side opposite of the tip) at a location on the display screen 1704 of the computing device 1702, and may be determined that the user desires to remove ink (e.g., one or more letters) at the location at which the writing utensil 1706 is located. However, there may be too much space between letters that have already been inked. Accordingly, mechanisms disclosed herein may determine an action, based on the user-command (e.g., holding the writing utensil 1606 at a location for a longer duration than a specified threshold of time), such as, for example, decreasing a spacing between the letters. It should be recognized that in examples where a user is inking with cursive, letters may be connected via cursive ink strokes. Therefore, it is contemplated that entire words may be removed based on the user-command.

Furthermore, mechanisms disclosed herein may consider a semantic context when determining the action. For example, since "Heello" is not currently a word in the English language, semantic context may indicate that the user may intend to write the word "Hello". Accordingly, when a user provides a user-command corresponding to the ink strokes for a first letter (e.g., the first "e"), mechanisms disclosed herein may determine the action based on the user-command, as well as the semantic context. Namely, since "Heello" is misspelled and the user provides a user-command corresponding to the erroneously duplicative "e", an action indicative of removing the erroneously duplicative "e" may also be dependent on semantic context.

Figure 18:
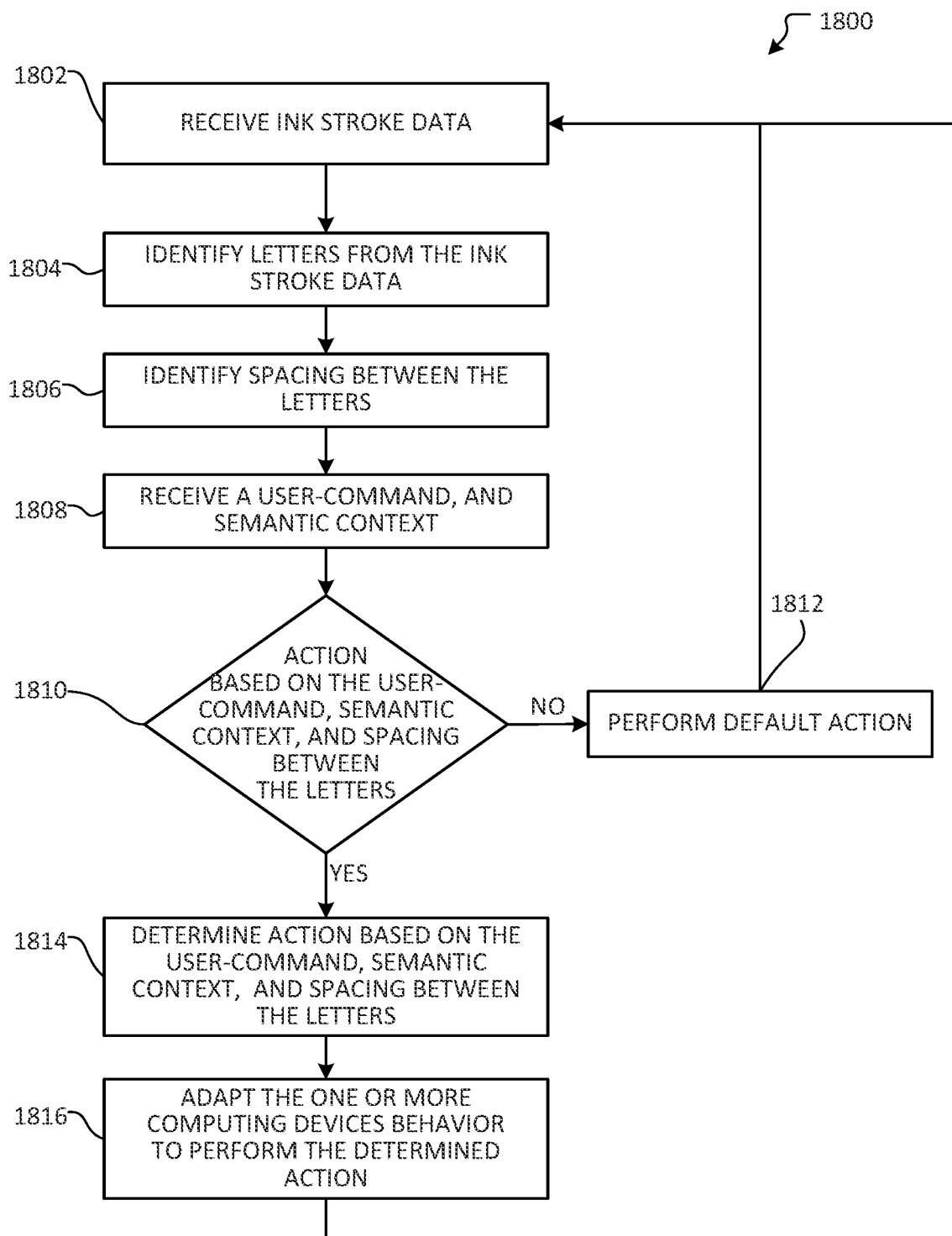
FIG. 18 illustrates an overview of an example method for formatting ink.

FIG. 18 illustrates an overview of an example method 1800 for formatting ink. In accordance with some examples, aspects of method 1800 are performed by a device, such as computing device 102, server, 104, and/or peripheral device 120 discussed above with respect to FIG. 1.

Method 1800 begins at operation 1802, where ink stroke data (e.g., ink stroke data 110) is received. The ink stroke data may be received from, and/or at, one or more computing devices (e.g., computing device 102). Additionally, or alternatively, the ink stroke data may be received from an ink stroke data source (e.g., ink stroke data source 106), which may be, for example a stylus with which a user is writing, a trackpad on which a user is writing, a computer-executed program that generates ink strokes, etc. The ink stroke data may correspond to a plurality of ink stroke data points, as discussed earlier herein with respect to FIGS. 3A-3C. Furthermore, the ink stroke data can include information correspond to one or more from the group of: writing pressure, hand tilt, penmanship cleanliness, letter spacing, sentence spacing, paragraph, spacing, stroke physics, and writing orientation. The ink stroke data can include further information that may be apparent to those of ordinary skill in the art, which may be related to ink strokes drawn by a user.

Still referring to operation 1802, the ink stroke data can be stored (e.g., in memory of the computing device 102). In some examples, only the most recent ink stroke data is stored, such that as ink stroke data is received, older ink stroke data is overwritten (e.g., in memory) by new ink stroke data. Alternatively, in some examples, ink stroke data is stored for a specified duration of time (e.g., the last hour, the last day, the last week, the last month, the last year, or since ink stroke data first began being received). Generally, such an implementation allows for a history of ink stroke data from one or more users to be reviewed for further analysis (e.g., to infer or predict ink strokes in the future).

At operation 1804, letters are identified from the ink stroke data. In some examples, the letters may be identified and/or analyzed by converting ink to text (e.g., text-based semantics). Alternatively, in some examples, the letters may be identified and/or analyzed based on spacing between ink strokes (e.g., ink-based semantics). For example, if a space exists between a first set of one or more ink strokes and a second set of one or more ink strokes, then it may be determined that the first set of one or more ink strokes is a first letter, and the second set of one or more ink strokes is a second letter. A similar analysis may be performed to recognize words. For example, it may be determined that the first set of one or more ink strokes is a first word, and the second set of one or more ink strokes is a second word.

At operation 1806, spacing between the letters is identified. As discussed earlier herein, with respect to FIGS. 3A-3C, ink strokes may include a plurality of ink stroke data points through which one or more ink strokes are formed. Each of the plurality of ink stroke data points may include coordinate data on a coordinate plane. Therefore, spacing between letters may be determined based on a distance between the ink stroke data points, as calculated across the coordinate plane. In some examples, the spacing may be a minimum distance between a first letter (e.g., a first set of one or more ink strokes) and a second letter (e.g., a second set of one or more ink strokes).

At operation 1808, a user-command is received. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art.

Referring specifically to FIG. 16, the user-command corresponds to a gesture input with the writing device 1606. For example, a user may hold the writing utensil 1606 (e.g., the tip of the writing utensil 1606) at a location on the display screen 1604 of the computing device 1602, and it may be determined that the user desires to add ink (e.g., one or more letters) at the location at which the writing utensil 1606 is located. Therefore, the user command may correspond to selecting a location for new ink stroke data.

Referring specifically to FIG. 17, the user-command corresponds to a gesture input with the writing device 1706. For example, a user may hold the writing utensil 1706 (e.g., an eraser-side or side opposite of the tip) at a location on the display screen 1704 of the computing device 1702, and may be determined that the user desires to remove ink (e.g., one or more letters) at the location at which the writing utensil 1706 is located. Therefore, the user command may correspond to deleting ink stroke data.

Still referring to operation 1808, semantic context may further be received. For example, the semantic context may be text-based semantic context in which identified letters are analyzed to determine if there may exist an action to be performed related to the semantic context. The action may be, for example, increasing space between letters to add one or more letters, and/or one or more words. Additionally, or alternatively, the action may be, for example, decreasing space between letters to remove one or more letters, and/or one or more words.

In some examples, the semantic context may be ink-based semantic context in which patterns of ink stroke data points are analyzed to determine if there may exist an action to be performed related to the semantic context. The action may be, for example, increasing space between letters to add one or more letters, and/or one or more words. Additionally, or alternatively, the action may be, for example, decreasing space between letters to remove one or more letters, and/or one or more words.

At determination 1810, it is determined whether there is an action based on the user command, semantic context, and spacing between the letters. For example, determination 1810 may comprise evaluating the received ink stroke data, semantic context, and spacing between the letters to determine if there exists a corresponding action, such as, for example, increasing spacing between letters and/or decreasing spacing between letters.

If it is determined that there is not an action associated with the user-command, semantic context, and spacing between the letters, flow branches "NO" to operation 1812, where a default action is performed. For example, the user command and/or semantic context and/or spacing between the letters may have an associated pre-configured action. In some other examples, the method 1800 may comprise determining whether the user command and/or semantic context and/or spacing between the letters have an associated default action, such that, in some instances, no action may be performed as a result of the user command and/or semantic context and/or spacing between the letters. Method 1800 may terminate at operation 1812. Alternatively, method 1800 may return to operation 1802, from operation 1812, to create a continuous feedback loop of receiving ink stroke data, identifying letters, identifying spacing between the letters, receiving a user command and semantic context, and determining whether there exists an action associated with the user command, semantic context, and spacing between the letters.

If however, it is determined that there is an action based on the user command, semantic context, and spacing between the letters, flow instead branches "YES" to operation 1814, where an action is determined, based on the user command, semantic context, and spacing between the letters. Such actions are discussed earlier herein with respect to FIGS. 16 and 17. For example, in some instances, the action may include changing spacing between two or more letters, such as two adjacent letters. The change in spacing may include an increase in spacing between two or more letters (or words, in instances where the adjacent letters are the last letter of a first words and the first letter of a second word that follows the first word). Additionally, or alternatively, the action may include decreasing spacing between two or more letters (or words, for example, in instances where the letters are the last letter of a first word and the first letter of a second word that follows the first word).

Flow advances to operation 1816 where one or more computing devices behavior is adapted to perform the determined action. For examples, the received ink stroked data of operation 1802 may be updated such that each of the ink stroke data points corresponding to one or more letters are translated (e.g., moved) a determined distance. The translation of the one or more letters may be shown on a display screen of the one or more computing devices.

Method 1800 may terminate at operation 1816. Alternatively, method 1800 may return to operation 1802, from operation 1816, to provide a continuous feedback loop of receiving ink stroke data and adapting behavior of one or more computing devices to perform a determined action. Generally, methods disclosed herein allow a user to write relatively more efficiently while using inking applications, as well as formatting inked data relatively easily.

Figure 19:
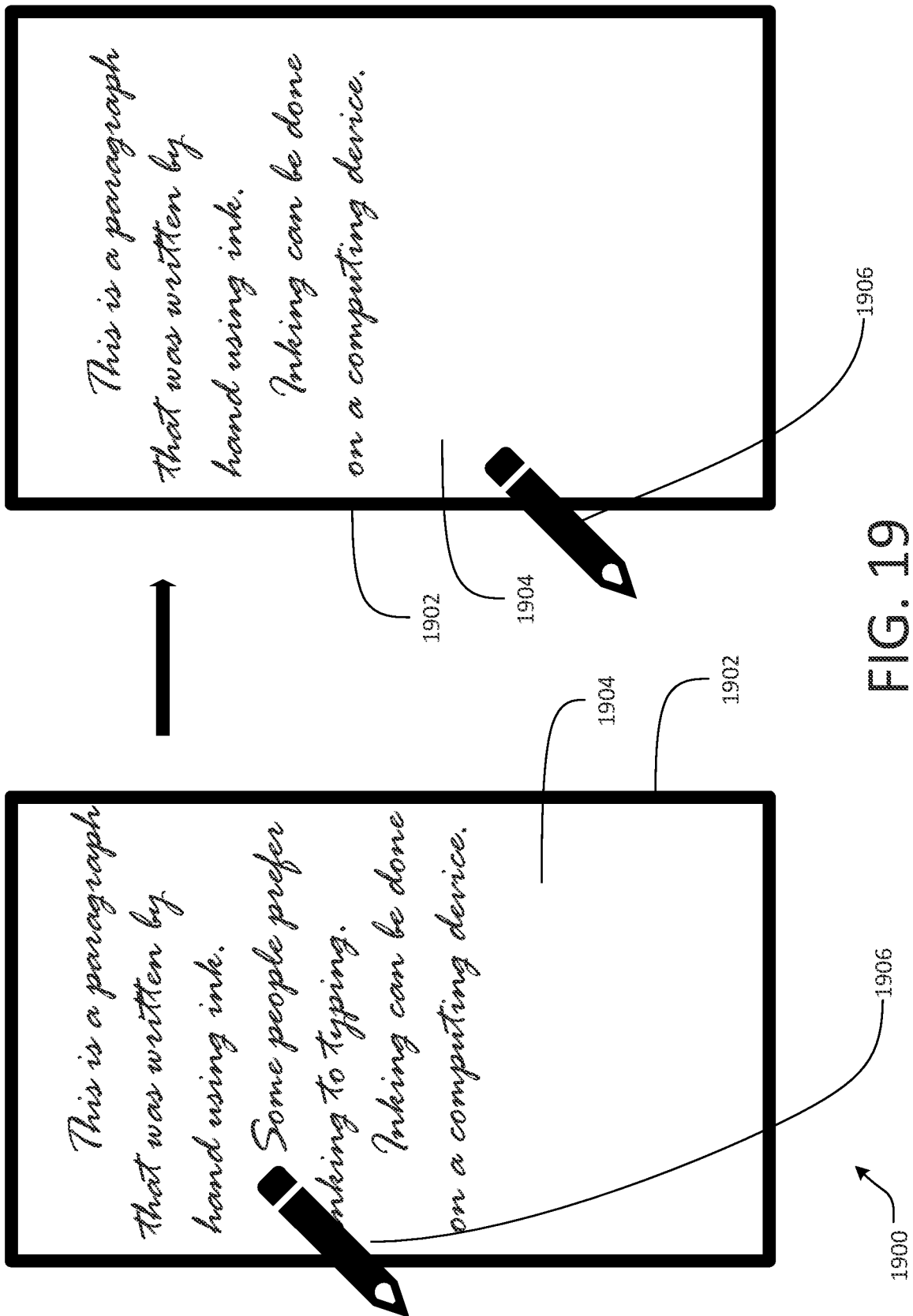
FIG. 19 illustrates an example system for formatting ink, according to aspects described herein.

FIG. 19 illustrates an example system 1900 for formatting ink, according to aspects described herein. The example system 1900 includes a computing device 1902 with a display or display screen 1904, and a writing utensil 1906. The computing device 1902 may be similar to the computing devices 102 discussed earlier herein with respect to FIG. 1. Further, the writing utensil 1906 may be similar to the writing utensil 320 discussed earlier herein with respect to FIGS. 3A-3C.

Ink stroke data may be received by the system 1900. For example, a user may ink strokes onto the display screen 1904 of the computing device 1902, via the writing utensil 1906. A user may place the writing utensil 1906 in contact with the display screen 1904, and perform natural writing motions to generate ink stroke data. Alternatively, the user may perform natural writing motions to generate ink stroke data, while the written utensil 1906 is not in contact with the display screen. Those of ordinary skill in the art will recognize that ink stroke data can be generated on the computing device 1902 without using a writing utensil 1906. For example, a user may directly contact the display screen 1904. Alternatively, the user may perform a natural writing motion in proximity to the computing device 1902 that is captured by the computing device 1902 to generate ink stroke data. Alternatively, the ink stroke data may be otherwise provided to the computing device 1902, as described earlier herein with respect to the ink stroke data 110, and/or as may be recognized by those of ordinary skill in the art.

Subsequent to ink stroke data being received by the system 1900, a user-command may be provided to the system. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art. In the example of FIG. 19, the user-command corresponds to a gesture input with the writing device 1906. For example, a user may hold the writing utensil 1906 (e.g., an eraser-side or side opposite of the tip) at a location on the display screen 1904 of the computing device 1902, and it may be determined that the user desires to remove ink (e.g., one or more paragraphs) at the location at which the writing utensil 1906 is located. However, there may be too much space between paragraphs that have already been inked. Accordingly, mechanisms disclosed herein may determine an action, based on the user-command (e.g., holding the writing utensil 1906 at a location for a longer duration than a specified threshold of time), such as, for example, decreasing a spacing between paragraphs.

Furthermore, mechanisms disclosed herein may consider a semantic context when determining the action. For example, paragraphs may be determined based on a logical language flow of one or more sentences, as determined based on the semantic context. Accordingly, when a user provides a user-command corresponding to the ink strokes of, for example, a sentence, mechanisms disclosed herein may determine the action based on the user-command, as well as the semantic context (e.g., there may be one or more sentences that are determined to constitute a paragraph, based on the semantic context). Namely, a user may provide a user-command corresponding to a letter, word, or sentence in a paragraph, indicative of removing the paragraph.

Figure 20:
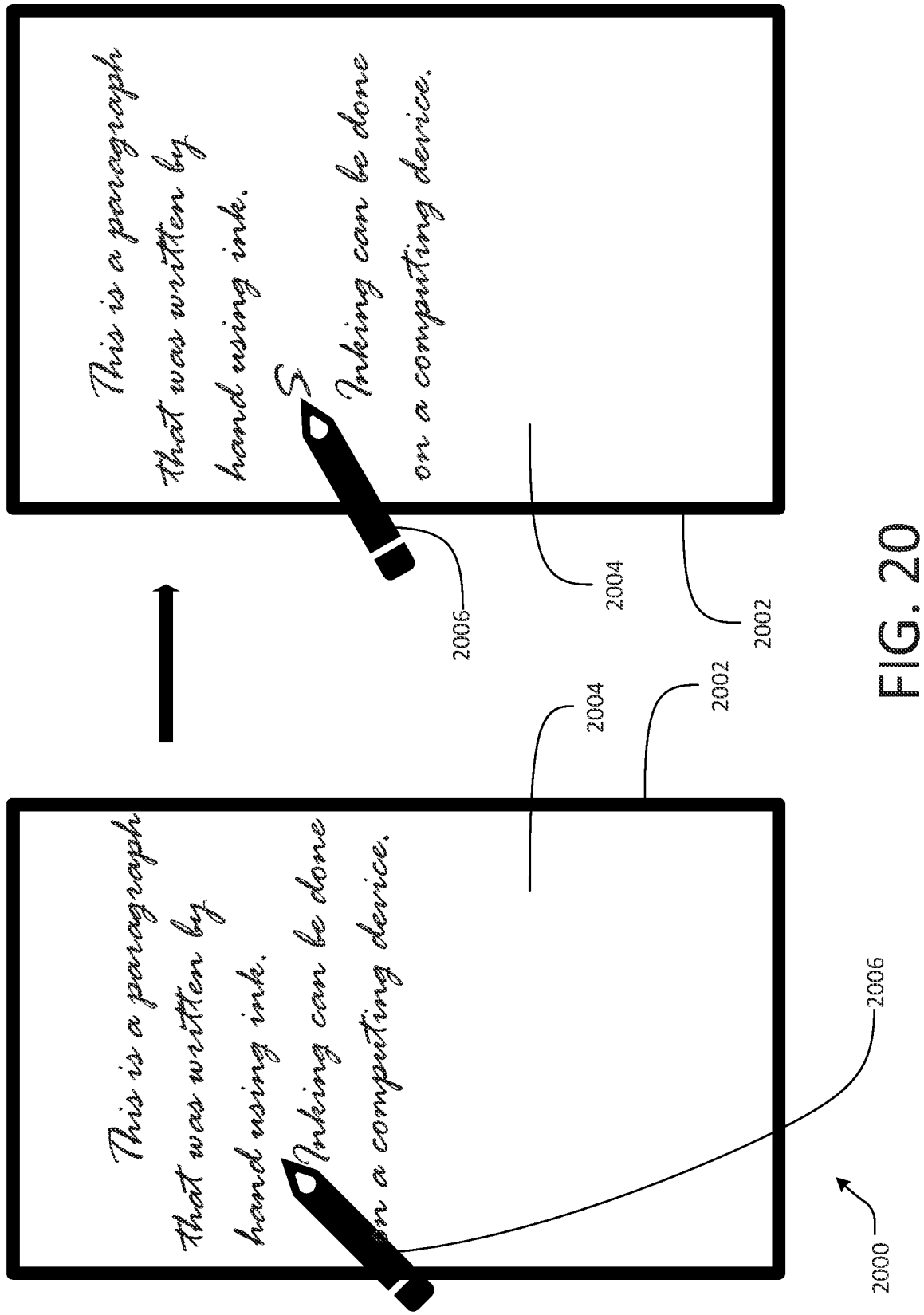
FIG. 20 illustrates an example system for formatting ink, according to aspects described herein.

FIG. 20 illustrates an example system 2000 for formatting ink, according to aspects described herein. The example system 2000 includes a computing device 2002 with a display or display screen 2004, and a writing utensil 2006. The computing device 2002 may be similar to the computing devices 102 discussed earlier herein with respect to FIG. 1. Further, the writing utensil 2006 may be similar to the writing utensil 320 discussed earlier herein with respect to FIGS. 3A-3C.

Ink stroke data may be received by the system 2000. For example, a user may ink strokes onto the display screen 2004 of the computing device 2002, via the writing utensil 2006. A user may place the writing utensil 2006 in contact with the display screen 2004, and perform natural writing motions to generate ink stroke data. Alternatively, the user may perform natural writing motions to generate ink stroke data, while the written utensil 2006 is not in contact with the display screen. Those of ordinary skill in the art will recognize that ink stroke data can be generated on the computing device 2002 without using a writing utensil 2006. For example, a user may directly contact the display screen 2004. Alternatively, the user may perform a natural writing motion in proximity to the computing device 2002 that is captured by the computing device 2002 to generate ink stroke data. Alternatively, the ink stroke data may be otherwise provided to the computing device 2002, as described earlier herein with respect to the ink stroke data 110, and/or as may be recognized by those of ordinary skill in the art.

Subsequent to ink stroke data being received by the system 2000, a user-command may be provided to the system. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art. In the example of FIG. 20, the user-command corresponds to a gesture input with the writing device 2006. For example, a user may hold the writing utensil 2006 (e.g., a tip of the writing utensil) at a location on the display screen 2004 of the computing device 2002, and it may be determined that the user desires to add ink (e.g., one or more paragraphs) at the location at which the writing utensil 2006 is located. However, there may be too little space between paragraphs that have already been inked. Accordingly, mechanisms disclosed herein may determine an action, based on the user-command (e.g., holding the writing utensil 1606 at a location for a longer duration than a specified threshold of time), such as, for example, increasing a spacing between paragraphs, such that one or more paragraphs (e.g., comprised of one or more sentences) can fit. The increase in spacing may be based on a predicted size of predicted ink strokes generated by a user (e.g., based on aspects described earlier herein).

Furthermore, mechanisms disclosed herein may consider a semantic context when determining the action. For example, paragraphs may be determined based on a logical language flow of one or more sentences, as determined based on the semantic context. Accordingly, when a user provides a user-command corresponding to the ink strokes of, for example, a sentence, mechanisms disclosed herein may determine the action based on the user-command, as well as the semantic context (e.g., there may be one or more sentences that are determined to constitute a paragraph, based on the semantic context). Namely, a region in which spacing is increased may be based, at least in part, on semantic context indicative of where a new paragraph may be added.

Figure 21:
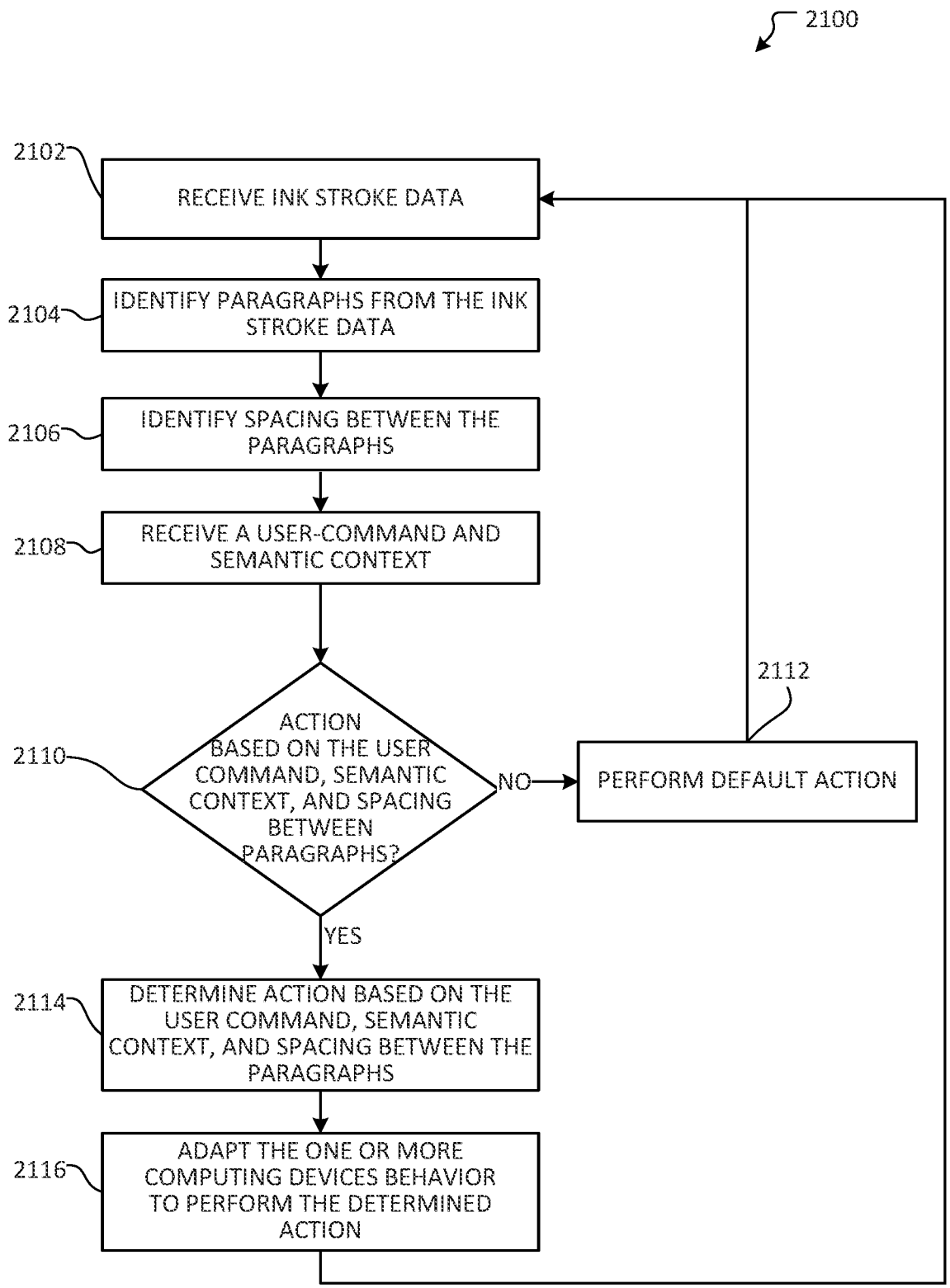
FIG. 21 illustrates an overview of an example method for formatting ink.

FIG. 21 illustrates an overview of an example method 2100 for formatting ink. In accordance with some examples, aspects of method 2100 are performed by a device, such as computing device 102, server, 104, and/or peripheral device 120 discussed above with respect to FIG. 1.

Method 2100 begins at operation 2102, where ink stroke data (e.g., ink stroke data 110) is received. The ink stroke data may be received from, and/or at, one or more computing devices (e.g., computing device 102). Additionally, or alternatively, the ink stroke data may be received from an ink stroke data source (e.g., ink stroke data source 106), which may be, for example a stylus with which a user is writing, a trackpad on which a user is writing, a computer-executed program that generates ink strokes, etc. The ink stroke data may correspond to a plurality of ink stroke data points, as discussed earlier herein with respect to FIGS. 3A-3C. Furthermore, the ink stroke data can include information correspond to one or more from the group of: writing pressure, hand tilt, penmanship cleanliness, letter spacing, sentence spacing, paragraph, spacing, stroke physics, and writing orientation. The ink stroke data can include further information that may be apparent to those of ordinary skill in the art, which may be related to ink strokes drawn by a user.

Still referring to operation 2102, the ink stroke data can be stored (e.g., in memory of the computing device 102). In some examples, only the most recent ink stroke data is stored, such that as ink stroke data is received, older ink stroke data is overwritten (e.g., in memory) by new ink stroke data. Alternatively, in some examples, ink stroke data is stored for a specified duration of time (e.g., the last hour, the last day, the last week, the last month, the last year, or since ink stroke data first began being received). Generally, such an implementation allows for a history of ink stroke data from one or more users to be reviewed for further analysis (e.g., to infer or predict ink strokes in the future).

At operation 2104, paragraphs are identified from the ink stroke data. In some examples, the paragraphs may be identified and/or analyzed by converting ink to text (e.g., text-based semantics). Alternatively, in some examples, the paragraphs may be identified and/or analyzed based on patterns within or between ink strokes (e.g., ink-based semantics). The paragraphs may further be identified based on semantic context (e.g., an understanding of natural language attributed to or analyzed from the ink strokes).

At operation 2106, spacing between the paragraphs is identified. As discussed earlier herein, with respect to FIGS. 3A-3C, ink strokes may include a plurality of ink stroke data points through which one or more ink strokes are formed. Each of the plurality of ink stroke data points may include coordinate data on a coordinate plane. Therefore, spacing between paragraphs may be determined based on a distance between the ink stroke data points, as calculated across the coordinate plane. In some examples, the spacing may be a minimum distance between the bottoms of letters that form a last sentence in a first paragraph, and the top of letters that form a first sentence in a second paragraph that follows the first paragraph.

At operation 2108, a user-command is received. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art. Referring specifically to FIG. 19, the user-command corresponds to a gesture input with the writing device 1906. For example, a user may hold the writing utensil 1906 (e.g., an eraser-side or side opposite of the tip) at a location on the display screen 1904 of the computing device 1902, and it may be determined that the user desires to remove a paragraph at the location at which the writing utensil 1907 is located. As another example, referring to FIG. 20, a user may hold the writing utensil 2006 (e.g., a tip of the writing utensil 2006) at a location on the display screen 2004 of the computing device 2002, and it may be determined that the user desires to insert a paragraph at the location at which the writing utensil 1907 is located.

Still referring to operation 2108, semantic context may further be received. For example, the semantic context may be text-based semantic context in which identified paragraphs are analyzed to determine if there may exist an action to be performed related to the semantic context. The action may be, for example, increasing space between paragraphs to add one or more new paragraphs. Additionally, or alternatively, the action may be, for example, removing one or more paragraphs and decreasing space between paragraphs to eliminate excess spacing.

In some examples, the semantic context may be ink-based semantic context in which patterns of ink stroke data points are analyzed to determine if there may exist an action to be performed related to the semantic context. The action may be, for example, changing spacing between one or more paragraphs. The change in spacing may be increasing space between paragraphs to add one or more paragraphs. Additionally, or alternatively, the action may be, for example, removing one or more paragraphs and decreasing space between paragraphs that were adjacent to the removed paragraph.

At determination 2110, it is determined whether there is an action based on the user command, semantic context, and spacing between the paragraphs. For example, determination 2110 may comprise evaluating the received ink stroke data, semantic context, and spacing between the paragraphs to determine if there exists a corresponding action, such as, for example, increasing spacing between paragraphs and/or decreasing spacing between paragraphs.

If it is determined that there is not an action associated with the user-command, semantic context, and spacing between the paragraphs, flow branches "NO" to operation 2112, where a default action is performed. For example, the user command and/or semantic context and/or spacing between the paragraphs may have an associated pre-configured action. In some other examples, the method 2100 may comprise determining whether the user command and/or semantic context and/or spacing between the paragraphs have an associated default action, such that, in some instances, no action may be performed as a result of the user command and/or semantic context and/or spacing between the paragraphs. Method 2100 may terminate at operation 2112. Alternatively, method 2100 may return to operation 2102, from operation 2112, to create a continuous feedback loop of receiving ink stroke data, identifying paragraphs, identifying spacing between the paragraphs, receiving a user command and semantic context, and determining whether there exists an action associated with the user command, semantic context, and spacing between the paragraphs.

If however, it is determined that there is an action based on the user command, semantic context, and spacing between the paragraphs, flow instead branches "YES" to operation 2114, where an action is determined, based on the user command, semantic context, and spacing between the paragraphs. Such actions are discussed earlier herein with respect to FIGS. 19 and 20. For example, in some instances, the action may include increasing spacing between paragraphs to insert a new paragraph. Additionally, or alternatively, the action may include removing a paragraph, and decreasing spacing paragraphs that were adjacent to the removed paragraph.

Flow advances to operation 2116 where one or more computing devices behavior is adapted to perform the determined action. For examples, the received ink stroked data of operation 2102 may be updated such that each of the ink stroke data points corresponding to one or more paragraphs are translated (e.g., moved) a determined distance. The translation of the one or more paragraphs may be shown on a display screen of the one or more computing devices.

Method 2100 may terminate at operation 2116. Alternatively, method 2100 may return to operation 2102, from operation 2116, to provide a continuous feedback loop of receiving ink stroke data and adapting behavior of one or more computing devices to perform a determined action. Generally, methods disclosed herein allow a user to write relatively more efficiently while using inking applications, as well as formatting ink relatively easily.

Figure 22:
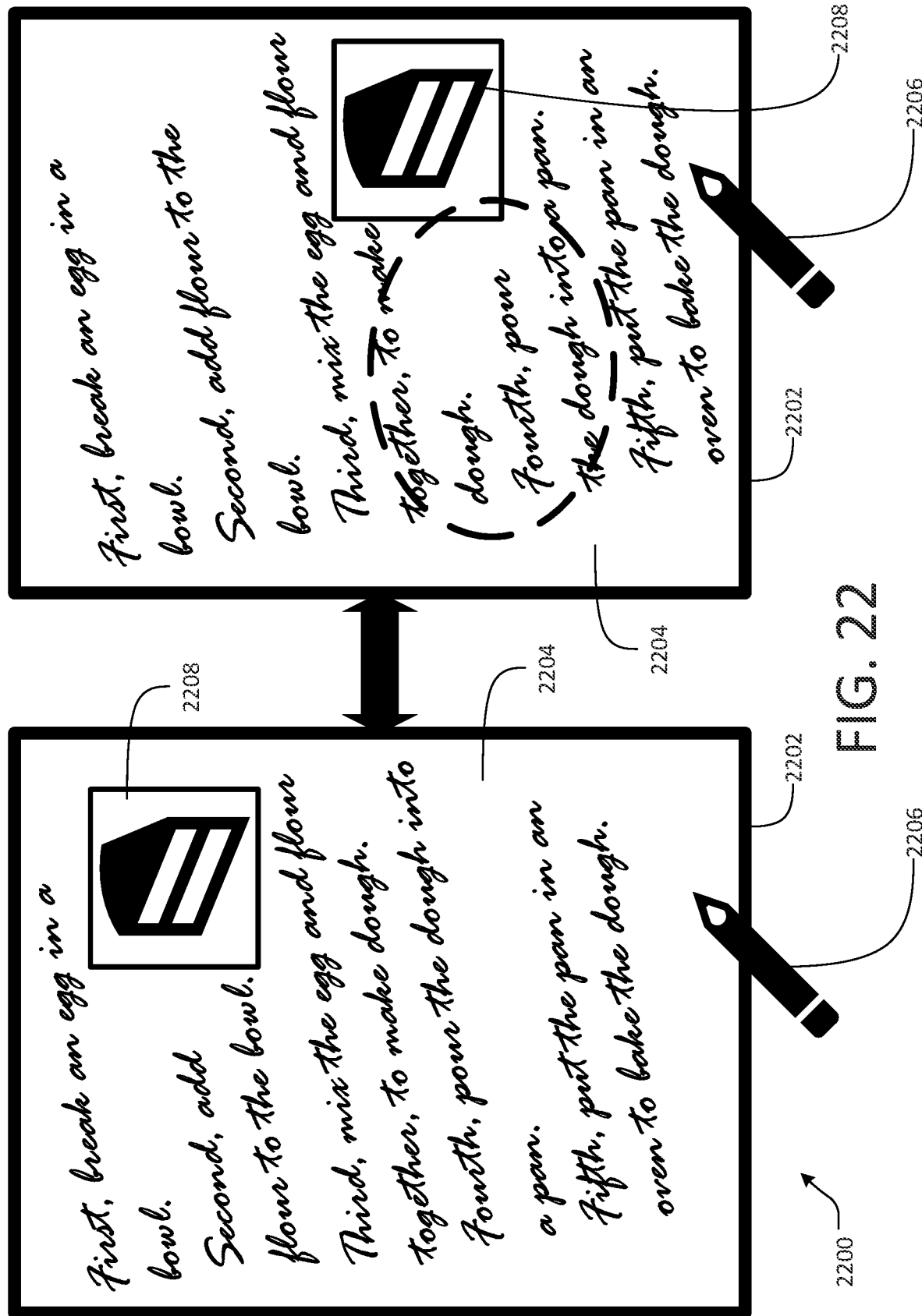
FIG. 22 illustrates an example system for formatting ink, according to aspects described herein.

FIG. 22 illustrates an example system 2200 for formatting ink, according to aspects described herein. The example system 2200 includes a computing device 2202 with a display or display screen 2204, and a writing utensil 2206. The display screen 2204 includes one or more elements 2208 displayed thereon. The computing device 2202 may be similar to the computing devices 102 discussed earlier herein with respect to FIG. 1. Further, the writing utensil 2206 may be similar to the writing utensil 320 discussed earlier herein with respect to FIGS. 3A-3C. The one or more elements 2208 may be pictures, tables, images, animated graphics, text (e.g., words, sentences, paragraphs), shapes, or any other kind of elements recognized by those of ordinary skill in the art that may be displayed on a computing device and/or translated (e.g., moved) across an inking application.

Ink stroke data may be received by the system 2200. For example, a user may ink strokes onto the display screen 2204 of the computing device 2202, via the writing utensil 2206. A user may place the writing utensil 2206 in contact with the display screen 2204, and perform natural writing motions to generate ink stroke data. Alternatively, the user may perform natural writing motions to generate ink stroke data, while the written utensil 2206 is not in contact with the display screen. Those of ordinary skill in the art will recognize that ink stroke data can be generated on the computing device 2202 without using a writing utensil 2206. For example, a user may directly contact the display screen 2204. Alternatively, the user may perform a natural writing motion in proximity to the computing device 2202 that is captured by the computing device 2202 to generate ink stroke data. Alternatively, the ink stroke data may be otherwise provided to the computing device 2202, as described earlier herein with respect to the ink stroke data 110, and/or as may be recognized by those of ordinary skill in the art.

Subsequent to ink stroke data being received by the system 2200, a user-command may be provided to the system. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art. In the example of FIG. 22, the user-command corresponds to translating the one or more elements 2208 from a first location to a second location on the display screen 2204. Ink stroke data may have to be translated, based on the translation of the one or more elements 2208, such that the ink stroke data is still visible. However, when translating ink stroke data, it may be beneficial to preserve a logical language flow (e.g., semantic context) of the ink stroke data.

Accordingly, mechanisms disclosed herein may consider a semantic context when determining the action. For example, referring to the illustrated example of FIG. 22, the display screen 2204 displays ink stroke data outlining a recipe for baking cake. The recipe includes a list of steps, namely, a first step, a second step, a third step, a fourth step, and a fifth step. When the element 2208 is in a first location, the steps of the recipe are outlined in a logical language flow. Such a logical language flow may want to be preserved when the element 2208 is moved to a second location.

As shown in the dashed oval of FIG. 22, the fourth step of the recipe on the display screen 2204 is within a separate paragraph from the third step of the recipe. Those of ordinary skill in the art may recognize that the fourth step of the recipe could begin (e.g., the first word could fit) in the same paragraph as the third step of the recipe. However, such a decision may eliminate the logical language flow of the recipe comprising four steps in a list, each of which may be found in their own respective paragraph. Therefore, mechanisms disclosed herein for reflowing ink stroke data around one or more elements (e.g., the elements 2208) may be beneficial for formatting ink stroke data, while considering semantic context of the ink stroke data to preserve a logical language flow of the ink stroke data.

Generally, FIG. 22 shows an example of ink being reflowed (e.g., translated around on a page, such that groups of ink are translated and/or spacing between ink strokes are increased and/or decreased) based on translation of one or more elements. In some examples, the one or more elements and/or the ink being reflowed may snap into a location to preserve consistent spacing between the one or more elements and the ink (e.g., a width of a border of empty space around the one or more elements may remain consistent). Additionally, or alternatively, the ink being reflowed may snap into a location to preserve consistent spacing between strokes of ink (e.g., consistent spacing between letters, words, paragraphs, etc.).

Figure 23:
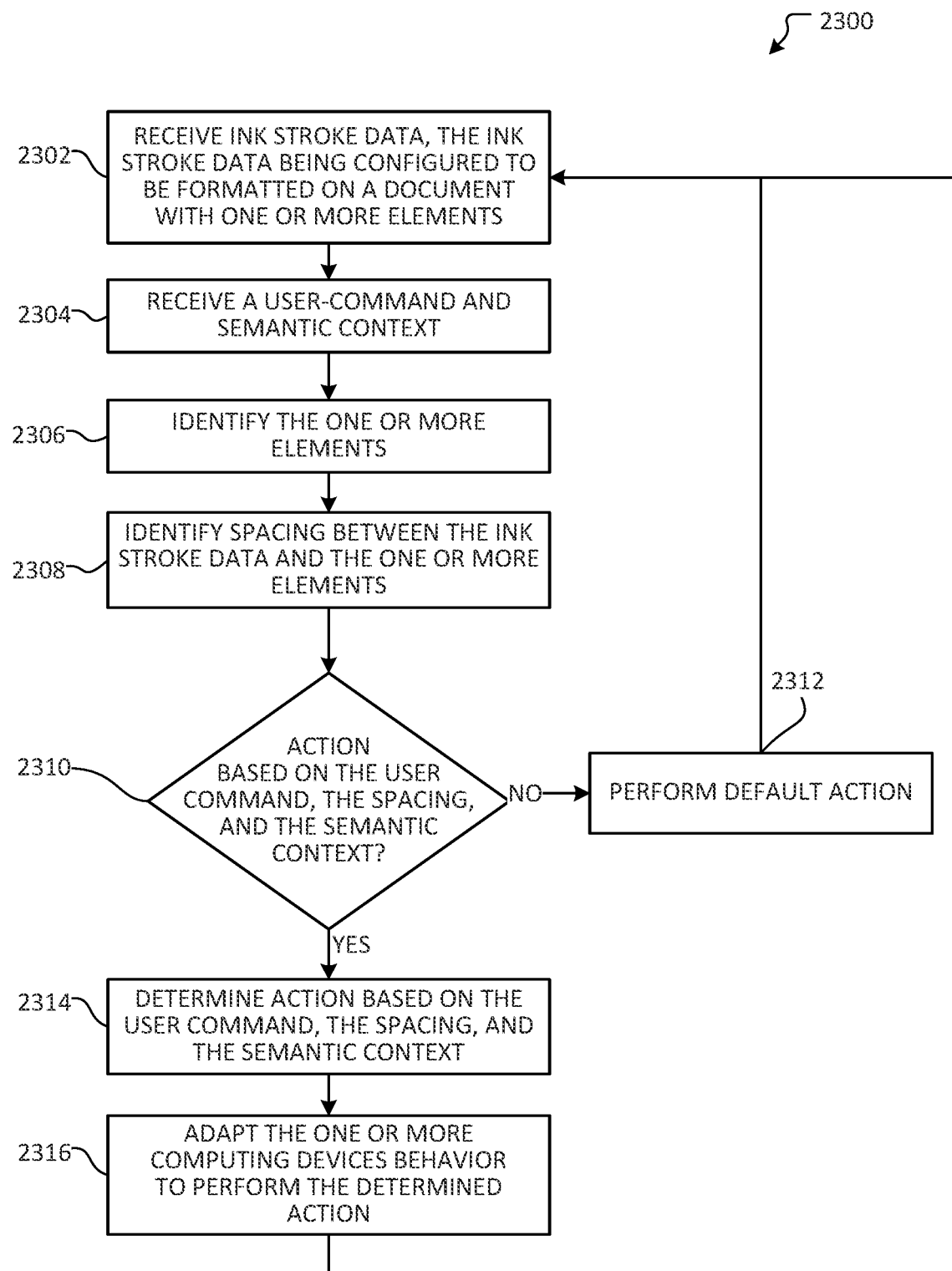
FIG. 23 illustrates an overview of an example method for formatting ink.

FIG. 23 illustrates an overview of an example method 2300 for formatting ink. In accordance with some examples, aspects of method 2300 are performed by a device, such as computing device 102, server, 104, and/or peripheral device 120 discussed above with respect to FIG. 1.

Method 2300 begins at operation 2302, where ink stroke data (e.g., ink stroke data 110) is received. The ink stroke data is configured to be formatted on a document or application with one or more elements (e.g., elements 2208). The ink stroke data may be received from, and/or at, one or more computing devices (e.g., computing device 102). Additionally, or alternatively, the ink stroke data may be received from an ink stroke data source (e.g., ink stroke data source 106), which may be, for example a stylus with which a user is writing, a trackpad on which a user is writing, a computer-executed program that generates ink strokes, etc. The ink stroke data may correspond to a plurality of ink stroke data points, as discussed earlier herein with respect to FIGS. 3A-3C. Furthermore, the ink stroke data can include information correspond to one or more from the group of: writing pressure, hand tilt, penmanship cleanliness, letter spacing, sentence spacing, paragraph, spacing, stroke physics, and writing orientation. The ink stroke data can include further information that may be apparent to those of ordinary skill in the art, which may be related to ink strokes drawn by a user.

Still referring to operation 2302, the ink stroke data can be stored (e.g., in memory of the computing device 102). In some examples, only the most recent ink stroke data is stored, such that as ink stroke data is received, older ink stroke data is overwritten (e.g., in memory) by new ink stroke data. Alternatively, in some examples, ink stroke data is stored for a specified duration of time (e.g., the last hour, the last day, the last week, the last month, the last year, or since ink stroke data first began being received). Generally, such an implementation allows for a history of ink stroke data from one or more users to be reviewed for further analysis (e.g., to infer or predict ink strokes in the future).

At operation 2304, a user-command is received. The user-command may be, for example, a keyboard input, a mouse input, a touchpad input, a gesture input (e.g., with an object, such as a writing utensil, or with one's hand), a gaze input, button-input, or any other input that may be recognized by those of ordinary skill in the art. Referring specifically to FIG. 22, the user-command corresponds to translating the one or more elements 2208 across the display screen 2204.

Still referring to operation 2304, semantic context may further be received. For example, the semantic context may be text-based semantic context in which ink stroke data is converted to text and meaning interpreted from the text. Additionally, or alternatively, the semantic context may be ink-based semantic context in which patterns are recognized between ink stroke data points that form ink strokes, and meaning is interpreted therefrom.

At operation 2306, the one or more elements are identified. The one or more elements may be pictures, tables, images, animated graphics, text, shapes, or any other kind of elements recognized by those of ordinary skill in the art that may be displayed on a computing device and/or translated (e.g., moved) across an inking application. The identification of the one or more elements may include determining a location of each of the one or more elements on a coordinate plane (e.g., the coordinate plane of FIGS. 3B and 3C).

At operation 2308, spacing between the ink stroke data and the one or more elements is identified. As discussed earlier herein, with respect to FIGS. 3A-3C, ink strokes may include a plurality of ink stroke data points through which one or more ink strokes are formed. Each of the plurality of ink stroke data points may include coordinate data on a coordinate plane. Therefore, spacing between ink stroke data and the one or more elements may be determined based on a distance between the ink stroke data points and the one or more elements, as calculated across the coordinate plane. In some examples, the spacing may be a distance between an outermost ink stroke data point and an outermost point of each of the one or more elements, thereby determining a minimum distance between the ink stroke data and each of the one or more elements.

At determination 2310, it is determined whether there is an action based on the user command, semantic context, and spacing. For example, determination 2110 may comprise evaluating the received ink stroke data, semantic context, and spacing between the ink stroke data and the one or more elements to determine if there exists a corresponding action, such as, for example, reflowing ink around the one or more elements.

If it is determined that there is not an action associated with the user-command, semantic context, and spacing, flow branches "NO" to operation 2312, where a default action is performed. For example, the user command and/or semantic context and/or spacing may have an associated pre-configured action. In some other examples, the method 2300 may comprise determining whether the user command and/or semantic context and/or spacing have an associated default action, such that, in some instances, no action may be performed as a result of the user command and/or semantic context and/or spacing. Method 2300 may terminate at operation 2312. Alternatively, method 2300 may return to operation 2302, from operation 2312, to create a continuous feedback loop of receiving ink stroke data, receiving a user-command and semantic context, identifying one or more elements, identifying spacing between the ink stroke data and the one or more elements, and determining whether there exists an action associated with the user command, semantic context, and spacing.

If however, it is determined that there is an action based on the user command, semantic context, and spacing, flow instead branches "YES" to operation 2314, where an action is determined, based on the user command, semantic context, and spacing. Such actions are discussed earlier herein with respect to FIG. 22. For example, in some instances, the action may include translating one or more elements (e.g., elements 2208) from a first location to a second location, and reflowing ink stroke data around each of the one or more elements. The action may further include reflowing ink stroke data around each of the one or more elements while preserving a logical flow of language corresponding to the ink stroke data, based on semantic context.

Flow advances to operation 2316 where one or more computing devices behavior is adapted to perform the determined action. For examples, the received ink stroke data of operation 2302 may be translated across a page or document or application, based on the movement of one or more elements (e.g., the ink stroke data may be reflowed around the one or more elements). An indication of the action may be displayed on a screen of one or more computing devices. For example, the translation of the one or more elements may be shown on a display screen of the one or more computing devices. Further the translation or reflow of the ink stroke data may be shown on a display screen of the one or more computing devices.

Method 2300 may terminate at operation 2316. Alternatively, method 2300 may return to operation 2302, from operation 2316, to provide a continuous feedback loop of receiving ink stroke data and adapting behavior of one or more computing devices to perform a determined action. Generally, methods disclosed herein allow a user to write relatively more efficiently while using inking applications, as well as formatting ink relatively easily.

FIGS. 24-27 and the associated descriptions provide a discussion of a variety of operating environments in which aspects of the disclosure may be practiced. However, the devices and systems illustrated and discussed with respect to FIGS. 24-27 are for purposes of example and illustration and are not limiting of a vast number of computing device configurations that may be utilized for practicing aspects of the disclosure, described herein.

Figure 24:
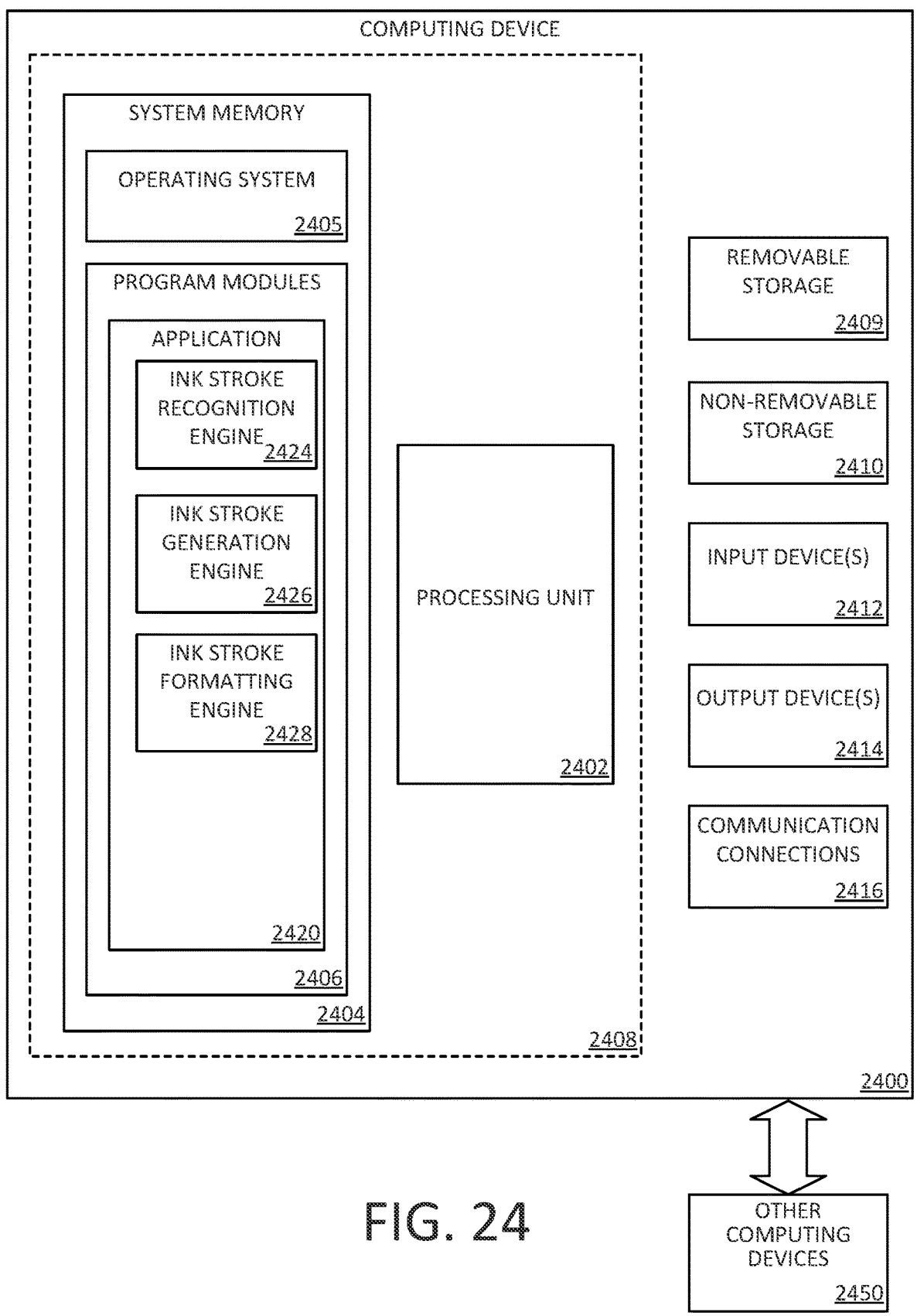
FIG. 24 is a block diagram illustrating physical components of a computing device with which aspects of the disclosure may be practiced.

FIG. 24 is a block diagram illustrating physical components (e.g., hardware) of a computing device 2400 with which aspects of the disclosure may be practiced. The computing device components described below may be suitable for the computing devices described above, including devices 102, 302, 1102, 1202, 1602, 1702, 1902, 2002, and 2202 discussed with respect to FIGS. 1, 3, 11, 12, 16, 17, 19, and 20, respectively. In a basic configuration, the computing device 2400 may include at least one processing unit 2402 and a system memory 2404. Depending on the configuration and type of computing device, the system memory 2404 may comprise, but is not limited to, volatile storage (e.g., random access memory), non-volatile storage (e.g., read-only memory), flash memory, or any combination of such memories.

The system memory 2404 may include an operating system 2405 and one or more program modules 2406 suitable for running software application 2420, such as one or more components supported by the systems described herein. As examples, system memory 2404 may store ink stroke recognition engine or component 2424, ink stroke generation engine or component 2426, and ink stroke formatting engine or component 2428. The operating system 2405, for example, may be suitable for controlling the operation of the computing device 2400.

Furthermore, embodiments of the disclosure may be practiced in conjunction with a graphics library, other operating systems, or any other application program and is not limited to any particular application or system. This basic configuration is illustrated in FIG. 24 by those components within a dashed line 2408. The computing device 2400 may have additional features or functionality. For example, the computing device 2400 may also include additional data storage devices (removable and/or non-removable) such as, for example, magnetic disks, optical disks, or tape. Such additional storage is illustrated in FIG. 24 by a removable storage device 2409 and a non-removable storage device 2410.

As stated above, a number of program modules and data files may be stored in the system memory 2404. While executing on the processing unit 2402, the program modules 2406 (e.g., application 2420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 24 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 2400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 2400 may also have one or more input device(s) 2412 such as a keyboard, a mouse, a pen, a sound or voice input device, a touch or swipe input device, etc. The output device(s) 2414 such as a display, speakers, a printer, etc. may also be included. The aforementioned devices are examples and others may be used. The computing device 2400 may include one or more communication connections 2416 allowing communications with other computing devices 2450. Examples of suitable communication connections 2416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 2404, the removable storage device 2409, and the non-removable storage device 2410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2400. Any such computer storage media may be part of the computing device 2400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 25A:
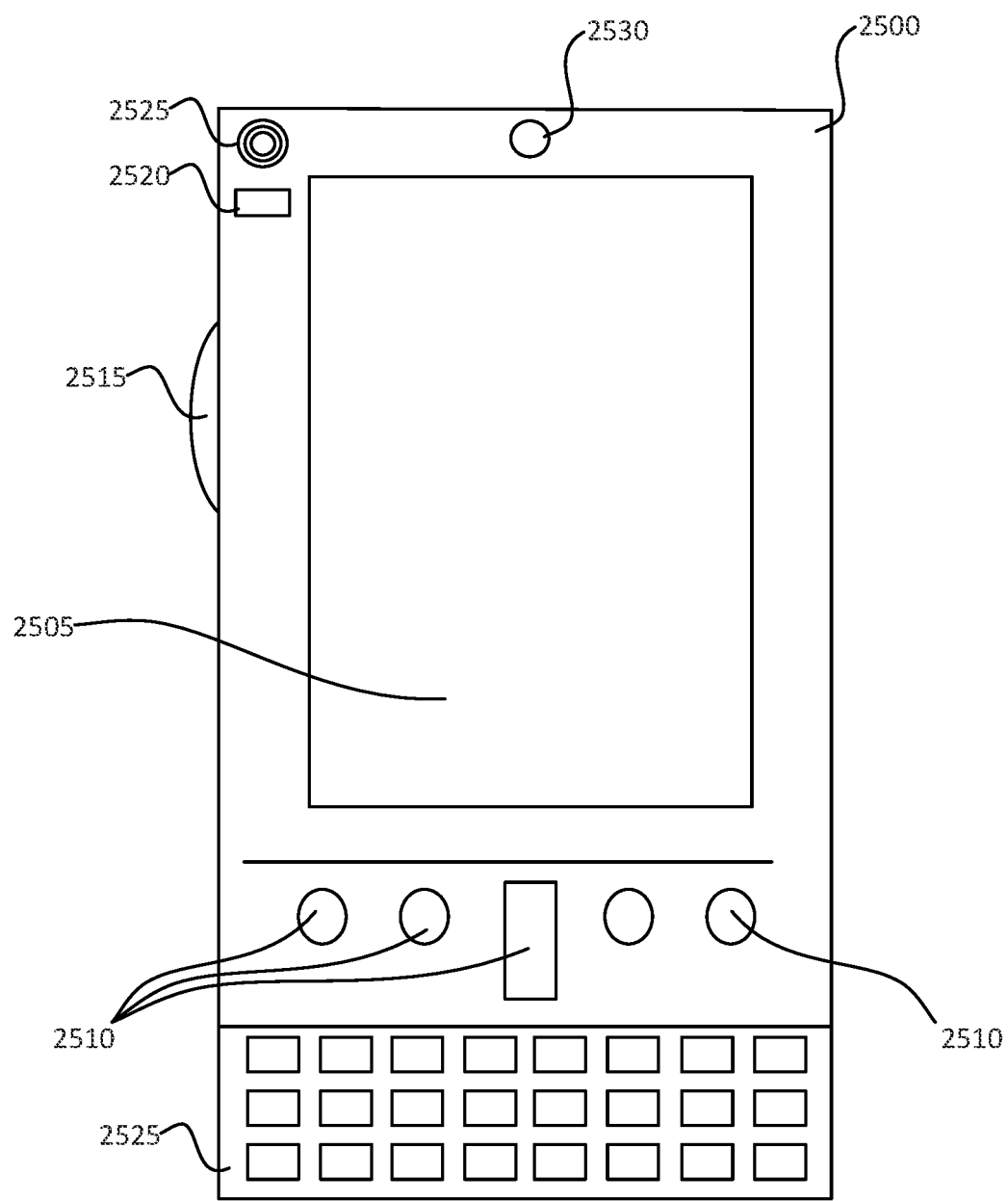
FIG. 25A illustrates a mobile computing device with which embodiments of the disclosure may be practiced.
Figure 25B:
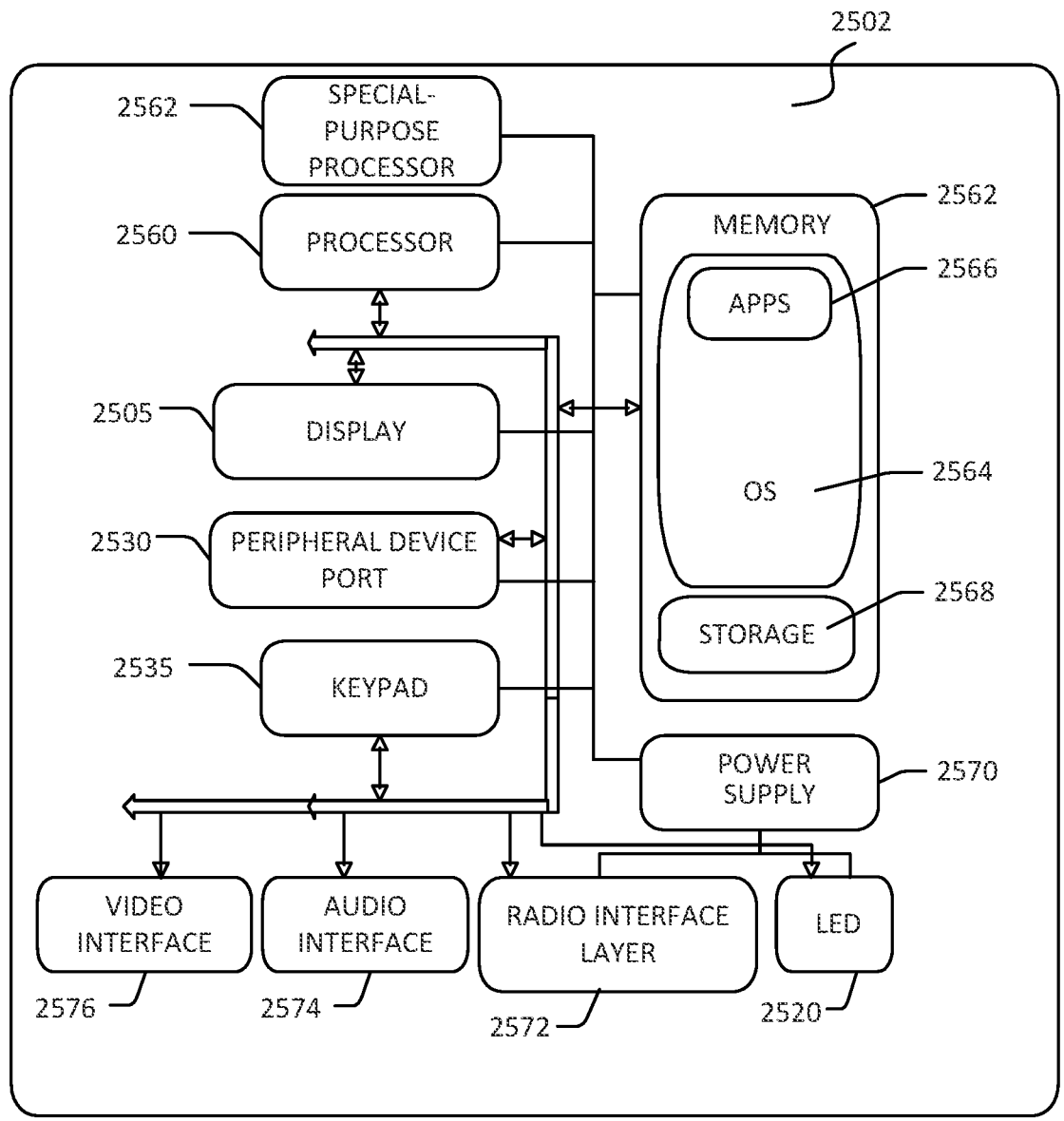
FIG. 25B is a block diagram illustrate the architecture of one aspect of a mobile computing device.

FIGS. 25A and 25B illustrate a mobile computing device 2500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 25A, one aspect of a mobile computing device 2500 for implementing the aspects is illustrated. In a basic configuration, the mobile computing device 2500 is a handheld computer having both input elements and output elements.

The mobile computing device 2500 typically includes a display 2505 and one or more input buttons 2510 that allow the user to enter information into the mobile computing device 2500. The display 2505 of the mobile computing device 2500 may also function as an input device (e.g., a touch screen display).

If included, an optional side input element 2515 allows further user input. The side input element 2515 may be a rotary switch, a button, or any other type of manual input element. In alternative aspects, mobile computing device 2500 may incorporate more or less input elements. For example, the display 2505 may not be a touch screen in some embodiments.

In yet another alternative embodiment, the mobile computing device 2500 is a portable phone system, such as a cellular phone. The mobile computing device 2500 may also include an optional keypad 2535. Optional keypad 2535 may be a physical keypad or a "soft" keypad generated on the touch screen display.

In various embodiments, the output elements include the display 2505 for showing a graphical user interface (GUI), a visual indicator 2520 (e.g., a light emitting diode), and/or an audio transducer 2525 (e.g., a speaker). In some aspects, the mobile computing device 2500 incorporates a vibration transducer for providing the user with tactile feedback. In yet another aspect, the mobile computing device 2500 incorporates input and/or output ports, such as an audio input (e.g., a microphone jack), an audio output (e.g., a headphone jack), and a video output (e.g., a HDMI port) for sending signals to or receiving signals from an external device.

FIG. 25B is a block diagram illustrating the architecture of one aspect of a mobile computing device. That is, the mobile computing device 2500 can incorporate a system (e.g., an architecture) 2502 to implement some aspects. In one embodiment, the system 2502 is implemented as a "smart phone" capable of running one or more applications (e.g., browser, e-mail, calendaring, contact managers, messaging clients, games, and media clients/players). In some aspects, the system 2502 is integrated as a computing device, such as an integrated personal digital assistant (PDA) and wireless phone.

One or more application programs 2566 may be loaded into the memory 2562 and run on or in association with the operating system 2564. Examples of the application programs include phone dialer programs, e-mail programs, personal information management (PIM) programs, word processing programs, spreadsheet programs, Internet browser programs, messaging programs, and so forth. The system 2502 also includes a non-volatile storage area 2568 within the memory 2562. The non-volatile storage area 2568 may be used to store persistent information that should not be lost if the system 2502 is powered down. The application programs 2566 may use and store information in the non-volatile storage area 2568, such as e-mail or other messages used by an e-mail application, and the like. A synchronization application (not shown) also resides on the system 2502 and is programmed to interact with a corresponding synchronization application resident on a host computer to keep the information stored in the non-volatile storage area 2568 synchronized with corresponding information stored at the host computer. As should be appreciated, other applications may be loaded into the memory 2562 and run on the mobile computing device 2500 described herein (e.g., a signal identification component, a gaze tracker component, a shared computing component, etc.).

The system 2502 has a power supply 2570, which may be implemented as one or more batteries. The power supply 2570 might further include an external power source, such as an AC adapter or a powered docking cradle that supplements or recharges the batteries.

The system 2502 may also include a radio interface layer 2572 that performs the function of transmitting and receiving radio frequency communications. The radio interface layer 2572 facilitates wireless connectivity between the system 2502 and the "outside world," via a communications carrier or service provider. Transmissions to and from the radio interface layer 2572 are conducted under control of the operating system 2564. In other words, communications received by the radio interface layer 2572 may be disseminated to the application programs 2566 via the operating system 2564, and vice versa.

The visual indicator 2520 may be used to provide visual notifications, and/or an audio interface 2574 may be used for producing audible notifications via the audio transducer 2525. In the illustrated embodiment, the visual indicator 2520 is a light emitting diode (LED) and the audio transducer 2525 is a speaker. These devices may be directly coupled to the power supply 2570 so that when activated, they remain on for a duration dictated by the notification mechanism even though the processor 2560 and other components might shut down for conserving battery power. The LED may be programmed to remain on indefinitely until the user takes action to indicate the powered-on status of the device. The audio interface 2574 is used to provide audible signals to and receive audible signals from the user. For example, in addition to being coupled to the audio transducer 2525, the audio interface 2574 may also be coupled to a microphone to receive audible input, such as to facilitate a telephone conversation. In accordance with embodiments of the present disclosure, the microphone may also serve as an audio sensor to facilitate control of notifications, as will be described below. The system 2502 may further include a video interface 2576 that enables an operation of an on-board camera 2530 to record still images, video stream, and the like.

A mobile computing device 2500 implementing the system 2502 may have additional features or functionality. For example, the mobile computing device 2500 may also include additional data storage devices (removable and/or non-removable) such as, magnetic disks, optical disks, or tape. Such additional storage is illustrated in FIG. 25B by the non-volatile storage area 2568.

Data/information generated or captured by the mobile computing device 2500 and stored via the system 2502 may be stored locally on the mobile computing device 2500, as described above, or the data may be stored on any number of storage media that may be accessed by the device via the radio interface layer 2572 or via a wired connection between the mobile computing device 2500 and a separate computing device associated with the mobile computing device 2500, for example, a server computer in a distributed computing network, such as the Internet. As should be appreciated such data/information may be accessed via the mobile computing device 2500 via the radio interface layer 2572 or via a distributed computing network. Similarly, such data/information may be readily transferred between computing devices for storage and use according to well-known data/information transfer and storage means, including electronic mail and collaborative data/information sharing systems.

Figure 26:
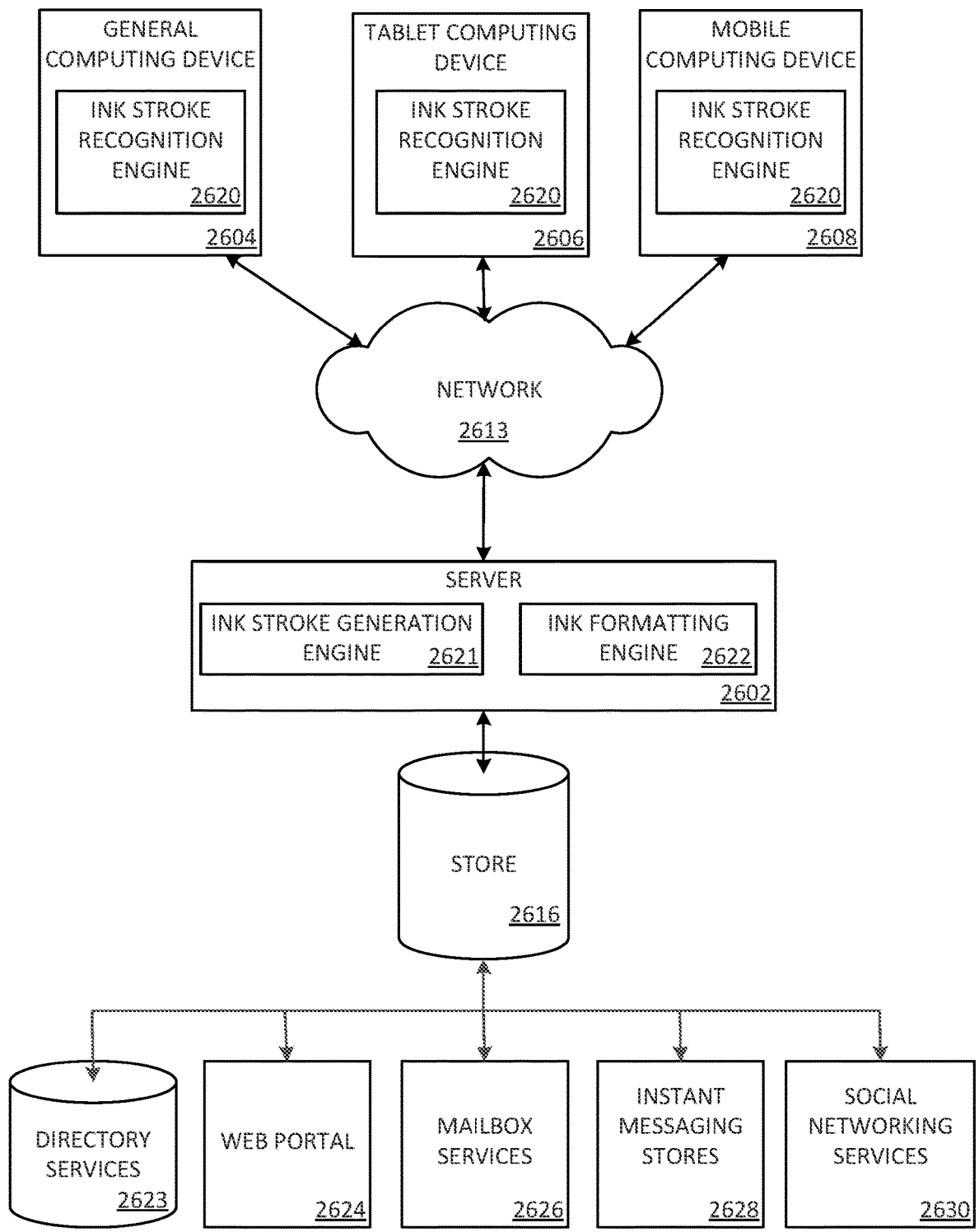
FIG. 26 illustrates one aspect of the architecture of a system for processing data received at a computing system from a remote source.

FIG. 26 illustrates one aspect of the architecture of a system for processing data received at a computing system from a remote source, such as a personal computer 2604, tablet computing device 2606, or mobile computing device 2608, as described above. Content displayed at server device 2602 may be stored in different communication channels or other storage types. For example, various documents may be stored using a directory service 2623, a web portal 2624, a mailbox service 2626, an instant messaging store 2628, or a social networking site 2630.

An ink stroke recognition engine or component 2620 may be employed by a client that communicates with server device 2602, and/or ink stroke generation engine or component 2621 may be employed by server device 2602, and/or ink formatting engine or component 2622 may be employed by server device 2602. The server device 2602 may provide data to and from a client computing device such as a personal computer 2604, a tablet computing device 2606 and/or a mobile computing device 2608 (e.g., a smart phone) through a network 2615. By way of example, the computer system described above may be embodied in a personal computer 2604, a tablet computing device 2606 and/or a mobile computing device 2608 (e.g., a smart phone). Any of these embodiments of the computing devices may obtain content from the store 2616, in addition to receiving graphical data useable to be either pre-processed at a graphic-originating system, or post-processed at a receiving computing system.

Figure 27:
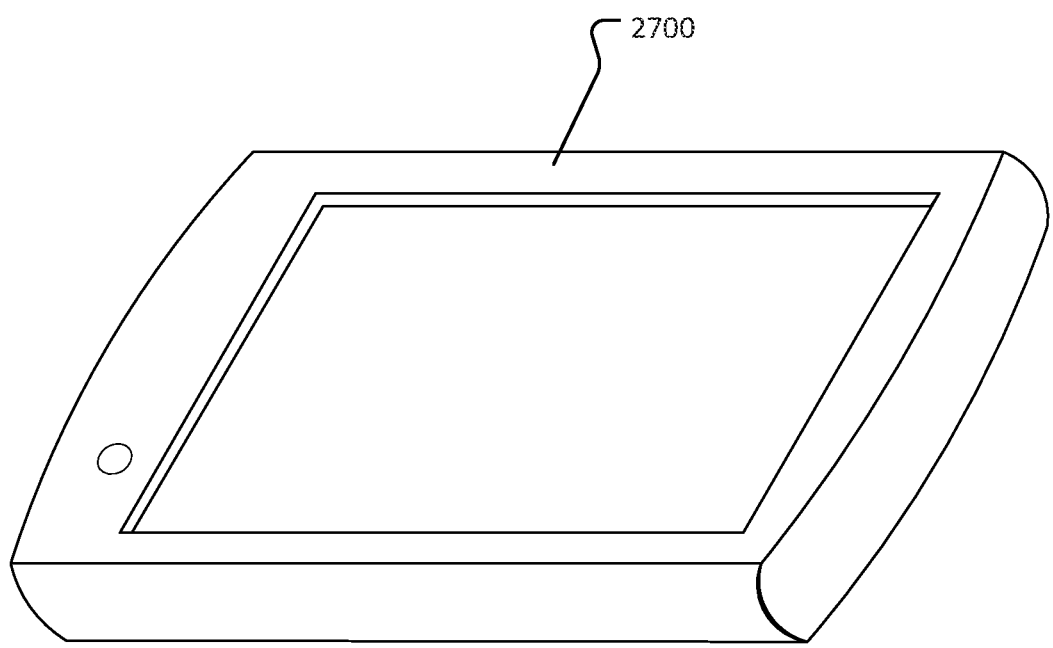
FIG. 27 illustrates an exemplary tablet computing device that may execute one or more aspects disclosed herein.

FIG. 27 illustrates an exemplary tablet computing device 2700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for formatting ink comprising:
at least one processor;
memory storing instructions that, when executed by the at least one processor, causes the system to perform a set of operations, the set of operations comprising:
receiving ink stroke data;
identifying letters from the ink stroke data;
identifying spacing between the letters;
receiving a user command, and semantic context, the semantic context corresponding to an intended meaning from the identified letters from the ink stroke data;
determining a current meaning from the identified letters from the ink stroke data differs from the intended meaning from the identified letters from the ink stroke data based on the semantic context;
calculating an amount to change the spacing between two letters of the identified letters to allow for an addition to or deletion of the ink stroke data, at a location corresponding to the user command, to correct the current meaning of the identified letters to be the intended meaning of the identified letters; and
automatically changing the spacing between the two letters of the identified letters by the calculated amount, thereby allowing the current meaning of the identified letters to be corrected with the intended meaning of the identified letters.

2. The system of claim 1, wherein the user command is one of a keyboard input, a mouse input, a touchpad input, and a gesture input.

3. The system of claim 1, wherein the changing the spacing comprises increasing spacing between the two letters of the identified letters from the ink stroke data.

4. The system of claim 1, wherein the user command corresponds to deleting ink stroke data.

5. The system of claim 4, wherein the changing the spacing comprises decreasing spacing between the two letters of the identified letters from the ink stroke data.

6. The system of claim 1, wherein the ink stroke data forms information corresponding a user's handwriting, and wherein the amount of change in the spacing between the two letters is how much space is needed to allow for the addition of ink stroke data in the user's own handwriting, to correct the current meaning of the identified letters to be the intended meaning of the identified letters.

7. The system of claim 6, wherein the information corresponding to the user's handwriting includes a penmanship cleanliness and a hand tilt of the user.

8. The system of claim 1, wherein the identified letters form a phrase, wherein the intended meaning from the identified letters is the intended meaning of the phrase formed by the identified letters, and wherein the intended meaning is the intended meaning of the phrase formed by the identified letters.

9. The system of claim 1, wherein the set of operations further comprise:

copying a plurality of letters from the identified letters from the ink stroke data; and pasting the plurality of copied letters between the two letters, thereby allowing the pasted plurality of letters to fit naturally between the two letters as if the pasted plurality of letters had been originally written alongside the two letters they are disposed therebetween.

10. A method for formatting ink comprising:

receiving ink stroke data;

identifying letters from the ink stroke data;

identifying spacing between the letters;

receiving a user command, and semantic context, the semantic context corresponding to an intended meaning from the identified letters from the ink stroke data;

determining a current meaning from the identified letters from the ink stroke data differs from the intended meaning from the identified letters from the ink stroke data based on the semantic context;

calculating an amount to change the spacing between two letters of the identified letters to allow for an addition to or deletion of the ink stroke data, at a location corresponding to the user command, to correct the current meaning of the identified letters to be the intended meaning of the identified letters; and automatically changing the spacing between the two letters of the identified letters by the calculated amount, thereby allowing the current meaning of the identified letters to be corrected with the intended meaning of the identified letters.

11. The method of claim 10, wherein the user command is one of a keyboard input, a mouse input, a touchpad input, and a gesture input.

12. The method of claim 10, wherein the changing the spacing comprises increasing spacing between the two letters of the identified letters from the ink stroke data.

13. The method of claim 10, wherein the user command corresponds to deleting ink stroke data.

14. The method of claim 13, wherein the changing the spacing comprises decreasing spacing between the two letters of the identified letters from the ink stroke data.

15. The method of claim 10, wherein the ink stroke data forms information corresponding a user's handwriting, and wherein the amount of change in the spacing between the two letters is how much space is needed to allow for the addition of ink stroke data in the user's own handwriting, to correct the current meaning of the identified letters to be the intended meaning of the identified letters.

16. The method of claim 15, wherein the information corresponding to the user's handwriting includes a penmanship cleanliness and a hand tilt of the user.

17. The method of claim 10, wherein the identified letters form a phrase, wherein the intended meaning from the identified letters is the intended meaning of the phrase formed by the identified letters, and wherein the intended meaning is the intended meaning of the phrase formed by the identified letters.

18. The method of claim 10, further comprising:

copying a plurality of letters from the identified letters from the ink stroke data; and pasting the plurality of copied letters between the two letters, thereby allowing the pasted plurality of letters to fit naturally between the two letters as if the pasted plurality of letters had been originally written alongside the two letters they are disposed therebetween.

19. A method for formatting ink comprising:

receiving ink stroke data, the ink stroke data forming information corresponding a user's handwriting, and the information corresponding to the user's handwriting including a penmanship cleanliness of the user;

identifying letters from the ink stroke data;

identifying spacing between the letters;

receiving a selection of a location for new ink stroke data, and semantic context, the semantic context corresponding to an intended meaning from the identified letters from the ink stroke data;

determining a current meaning from the identified letters from the ink stroke data differs from the intended meaning from the identified letters from the ink stroke data based on the semantic context;

calculating an amount to change the spacing between two letters of the identified letters to allow for an addition to the ink stroke data at the location selected for the new ink stroke data, wherein the amount to change the spacing between the two letters includes how much space is needed to allow for the addition to the ink stroke data in the user's own handwriting, to correct the current meaning of the identified letters to be the intended meaning of the identified letters; and automatically changing the spacing between the two letters of the identified letters by the calculated amount.

20. The method of claim 16, wherein the identified letters form a phrase, wherein the intended meaning from the identified letters is the intended meaning of the phrase formed by the identified letters, and wherein the intended meaning is the intended meaning of the phrase formed by the identified letters.

* * * * *